(12) United States Patent
Kohara et al.

(10) Patent No.: US 6,883,938 B1
(45) Date of Patent: Apr. 26, 2005

(54) LIGHTING EQUIPMENT

(75) Inventors: Teiji Kohara, Kanagawa-ken (JP); Yuichiro Konishi, Tokyo (JP); Junko Maruyama, Kanagawa-ken (JP)

(73) Assignee: Nippon Zeon Co., Ltd., Tokyo (JP)

( * ) Notice: Subject to any disclaimer, the term of this patent is extended or adjusted under 35 U.S.C. 154(b) by 0 days.

(21) Appl. No.: 09/622,694

(22) PCT Filed: Feb. 22, 1999

(86) PCT No.: PCT/JP99/00779

§ 371 (c)(1),
(2), (4) Date: Aug. 21, 2000

(87) PCT Pub. No.: WO99/42758

PCT Pub. Date: Aug. 26, 1999

(30) Foreign Application Priority Data

| Feb. 20, 1998 | (JP) | 10-056103 |
| Mar. 23, 1998 | (JP) | 10-044037 |
| Mar. 23, 1998 | (JP) | 10-093992 |
| Mar. 24, 1998 | (JP) | 10-095270 |
| Mar. 27, 1998 | (JP) | 10-100653 |
| Apr. 7, 1998 | (JP) | 10-111407 |
| May 29, 1998 | (JP) | 10-166331 |
| May 29, 1998 | (JP) | 10-166343 |
| Jun. 19, 1998 | (JP) | 10-172705 |
| Jul. 30, 1998 | (JP) | 10-230169 |

(51) Int. Cl.[7] ............................ P21V 7/22; C03F 283/14
(52) U.S. Cl. .................. 362/296; 362/327; 428/461
(58) Field of Search ............................ 362/296, 327; 428/912.2, 461, 462, 467

(56) References Cited

U.S. PATENT DOCUMENTS

| 4,115,619 A | * | 9/1978 | Kurfman | 428/336 |
| 4,612,216 A | * | 9/1986 | Kurfman | 427/250 |
| 4,772,496 A | * | 9/1988 | Maeda et al. | 428/35 |
| 6,177,181 B1 | * | 1/2001 | Hamada et al. | 428/304.4 |
| 6,472,082 B1 | * | 10/2002 | Kodemura | 428/457 |

FOREIGN PATENT DOCUMENTS

| JP | 64-44849 | 3/1987 |
| JP | 4-24215 | 2/1992 |
| JP | 4-82101 | 3/1992 |
| JP | 4-136801 | 12/1992 |
| JP | 6-312467 | 11/1994 |
| JP | 7-53865 | 2/1995 |
| JP | 8-77801 | 3/1996 |
| JP | 8-106806 | 4/1996 |
| JP | 8-216778 | 8/1996 |
| JP | 8-306206 | 11/1996 |

* cited by examiner

*Primary Examiner*—Stephen Husar
*Assistant Examiner*—Anabel Ton
(74) *Attorney, Agent, or Firm*—Armstrong, Kratz, Quintos, Hanson & Brooks, LLP

(57) ABSTRACT

A lighting equipment comprising a reflector having a substrate comprised of a thermoplastic resin containing an alicyclic structure on which is formed a reflecting layer having a reflectance of at least 70%. The reflecting layer of the reflector is preferably comprised of a metal. The reflecting layer preferably has a thickness of 5 to 10,000 nm. The amount of the repeating units containing polar groups in the thermoplastic resin containing an alicyclic structure is preferably not more than 50 wt %. The thermoplastic resin containing an alicyclic structure preferably has a melt flow rate of 4 to 100 g/10 min.

29 Claims, 4 Drawing Sheets

LIGHTING EQUIPMENT

TECHNICAL FIELD OF THE INVENTION

The present invention relates to a lighting equipment used for a four-wheeled vehicle or two-wheeled vehicle or other vehicle, a studio lighting equipment, a flashlight, and other lighting equipments including a reflector (including extension reflector), lens (outer lens or inner lens), lamp cover (outer lens), lamp cap, light guide, and other parts.

BACKGROUND ART

This type of lighting equipment, for example, a vehicular lighting equipment, is mainly comprised of a lighting equipment body formed into the shape of a container with an open front, a lamp unit having a light source (lamp) attached to the lighting equipment body, and a lamp cover (or outer lens) attached to the front opening of the lighting equipment body.

The lamp unit is sometimes provided with a main reflector for condensing or diffusing light from the light source to obtain desired light distribution characteristics.

Further, in a vehicular lighting equipment, a large space is formed between the lamp unit and the lighting equipment body, so if viewing the lighting equipment from the outside, there is the problem in appearance that it is possible to see all the way back to the rear aiming mechanism. Therefore, to make the entire light chamber appear mirror-like so as to improve the appearance, sometimes an extension reflector given a mirror finish is provided from the area surrounding the reflector of the lamp unit to the front opening of the lighting equipment body.

As a conventional reflector, there is known one comprised of a metal or glass mirror superior in reflection characteristics. With a metal reflector, however, the weight is heavy, the handling is difficult, and it is difficult to work the metal into a complicated shape such as a vehicular extension reflector. With a glass reflector, further, the weight is heavy, the reflector easily breaks, and it is difficult to form the glass into a complicated shape.

Therefore, recently, reflectors have been proposed which are obtained by using a synthetic resin as the substrate of the reflector and coating the surface of the substrate with a reflecting layer. In particular, German Offenlegung 19,540,414 discloses a reflector, though not for a vehicular application, which is obtained by coating the surface of a substrate comprised of an addition copolymer of a norbornene and ethylene with a dielectric film.

The reflector disclosed in that publication, however, had the problem of low reflection characteristics of light since a dielectric film was coated on the surface of the substrate.

Further, Japanese Unexamined Patent Publication (Kokai) No. 7-242754 describes that a resin comprised of a resin composition containing a thermoplastic norbornene-based resin, polyallylene sulfide, and inorganic filler with a specific heat deformation temperature can also be used for vehicular reflector applications.

This publication, however, only discloses that a thermoplastic norbornene-based resin can also be used for a reflector application. It is not certain if sufficient reflection characteristics are exhibited when actually used as a reflector.

Further, Japanese Unexamined Patent Publication (Kokai) No. 6-313056 describes that a molded article obtained by forming an organic siloxane-based hard coat layer via a primer layer on the surface of a molded article comprised of a norbornene-based ring-opening polymer can also be used for a vehicular lens application.

This publication, however, merely discloses that a molded article comprised of a norbornene-based ring-opening polymer can also be used for a lens application. It is not certain if there is an effect of prevention of white turbidity in a high temperature, high humidity environment when actually used for a lens.

DISCLOSURE OF THE INVENTION

A first object of the present invention is to provide a "reflector" which is light in weight and superior in surface smoothness, heat resistance, moldability, mechanical strength characteristics, and reflection characteristics and a "lighting equipment" using the same.

A second object of the present invention is to provide a "reflector" which is superior in surface smoothness and heat resistance and enables the molding of a thin, large-sized article and a "lighting equipment" using the same.

A third object of the present invention is to provide a "reflector" which is superior in surface smoothness and heat resistance, superior in durability under high temperature and high humidity, enables the molding of a thin, large-sized article, and is able to be used not only as an extension reflector of a vehicular lighting equipment, but also as a main reflector of a lamp unit and a "lighting equipment" using the same.

A fourth object of the present invention is to provide a "reflector" which is superior in impact resistance, superior in surface smoothness and heat resistance, and enables the molding of a thin, large-sized article and a "lighting equipment" using the same.

A fifth object of the present invention is to provide a "reflector" which is resistant to breakage etc., easy to screw in, superior in surface smoothness, superior in reflection characteristics of light, and enables the molding of a thin, large-sized article and a "lighting equipment" using the same.

A sixth object of the present invention is to provide a "reflector" which is superior in surface smoothness and reflection characteristics of light, superior in heat resistance, and enables the molding of a thin, large-sized article and a "lighting equipment" using the same.

A seventh object of the present invention is to provide a "lens" which is superior in transparency, low hygroscopicity, heat resistance, mechanical strength, etc., enables thinning and the formation of a fine surface structure, and is superior in prevention of white turbidity under a high temperature, high humidity environment and a "lighting equipment" using the same.

An eighth object of the present invention is to provide a "lamp cover" which features little deterioration of the plastic member comprising the lighting equipment even when using a lamp emitting high intensity light by a low power consumption as a light source and a "lighting equipment" using the same.

A ninth object of the present invention is to provide a "lamp cap" which is superior in transparency and heat resistance and also long-term heat stability and light resistance and further is thin and small in size and a "lighting equipment" using the same.

A 10th object of the present invention is to provide a "light guide" which is superior in transparency, moldability, and resistance to hygroscopic deformation, excellent in both impact resistance and light resistance, and therefore well balanced and a "lighting equipment" using the same.

(1) The "reflector" according to the present invention is characterized by comprising a substrate comprised of a thermoplastic resin containing an alicyclic structure on which is formed a reflecting layer with a reflectance of at least 70%.

The reflectance of the reflector is usually at least 70%, but preferably is at least 75%, more preferably is at least 80%. The upper limit is preferably 100%.

Further, the "reflector" according to the present invention is characterized by comprising a substrate comprised of a thermoplastic resin containing an alicyclic structure on which is formed a metal film.

The substrate is preferably comprised of a resin composition including a thermoplastic resin containing an alicyclic structure and at least one compounding agent selected from the group comprising a partial ether compound of a polyhydric alcohol and or a partial ester compound of a polyhydric alcohol, a soft polymer, a filler, and a compound incompatible with the thermoplastic resin having an alicyclic structure.

The substrate is preferably comprised of a resin composition comprised of a thermoplastic resin composition containing an alicyclic structure into which is blended a soft polymer having a glass transition temperature of not more than 30° C. In this case, the glass transition temperature of the soft polymer is normally not more than 30° C., but is preferably not more than 15° C., more preferably not more than 0° C., and preferably at least −100° C., more preferably at least −50° C.

The substrate is preferably comprised of a resin composition comprised of a thermoplastic resin composition containing an alicyclic structure in which is blended a crystalline polymer.

The substrate is preferably comprised of at least one type of thermoplastic resin containing an alicyclic structure selected from the group comprising a ring-opening polymer of a norbornene-based monomer, a hydrogenate of a ring-opening polymer of a norbornene-based monomer, and an addition polymer including addition type repeating units of an at least three-ring-based monomer.

The reflecting layer formed on the reflector of the present invention is preferably comprised of a metal. The metal is not particularly limited, but is preferably aluminum or silver.

The reflecting layer formed on the reflector of the present invention preferably has a thickness of 5 to 10,000 nm, more preferably has a thickness of 10 to 2,000 nm, most preferably has a thickness of 30 to 2,000 nm.

The reflecting layer formed on the reflector of the present invention preferably is formed by vapor deposition. As the vapor deposition, for example, vacuum deposition, sputtering, ion plating, etc. may be mentioned.

The amount of repeating units containing polar-groups in the thermoplastic resin containing an alicyclic structure is preferably small. More specifically, the ratio of the repeating units comprising the thermoplastic resin containing an alicyclic structure is preferably not more than 50 wt %, more preferably not more than 30 wt %, still more preferably not more than 10 wt %. Further, most preferably, the amount of repeating units containing polar groups is 0 wt %, that is, it is most preferable that there be no repeating units containing polar groups.

The thermoplastic resin containing an alicyclic structure preferably has a melt flow rate, measured by JIS-K6719 at a temperature of 280° C. and a load of 2.16 kgf, of 4 to 100 g/10 min, preferably 10 to 50 g/10 min, more preferably 15 to 50 g/10 min.

The thermoplastic resin containing an alicyclic structure preferably has repeating units comprised of ring structures other than norbornene rings.

The "reflector" in the present invention is for condensing or diffusing light from a light source of a lamp unit to obtain desired light distribution characteristics. The application is not limited. It may be used for vehicular lighting equipments, studio lamps, flashlights, and other lighting equipments and is particularly suitable as a reflector of vehicular lighting equipments. In particular, the reflector in the case of vehicular use is not limited to the main reflector arranged near the light source and is used in the sense including also an extension reflector and members connected or linked with these (for example, sleeves, lens holders, etc.) The "extension reflector" referred to here means a member of the lighting equipment provided around the lamp in the light chamber formed by the body of the vehicular lighting equipment and the cover (or outer lens), given a mirror finish on at least one main surface, and used for the purpose of making the inside of the light chamber as a whole appear mirror-like when viewing the lighting equipment from the outside and thereby improving the appearance and/or for the purpose of stopping light from leaking from one lamp to an adjoining lamp side and thereby improving the visibility of the field illuminated by the lamps. Extension reflectors of vehicular lighting equipments are often used for headlights and taillights, but the present invention is not particularly limited to these. The extension reflectors may be used for the above other types of lighting equipments as well.

Note that the reflector (including extension reflector) may be integrally formed with the later mentioned lens (in particular inner lens).

(2) The "lens" according to the present invention is characterized by comprising a thermoplastic resin containing an alicyclic structure and at least one type of compounding agent selected from the group comprising a partial ether compound of a polyhydric alcohol and or a partial ester compound of a polyhydric alcohol, a soft polymer, a filler, and a compound incompatible with the thermoplastic resin having an alicyclic structure.

The type of the lighting equipment for which the "lens" referred to in the present invention is used is not particularly limited and may be for example a lens used for converging or diffusing light emitted from a light source or reflection mirror in a predetermined direction to raise the luminance in a desired direction in a headlight, auxiliary headlight, side marker light, license plate light, taillight, parking light, stoplight, backup light, turn signal light, auxiliary turn signal light, hazard light, and other vehicular lighting equipments. For example, a lamp cover provided with patterns for converging or diffusing light on an inside surface or outside surface of a vehicular lighting equipment, an inner lens provided between the lamp and lamp cover, etc. may be mentioned, preferably an inner lens.

The lens of the present invention may be made thin or formed with fine surface structures, is superior in transparency, low hygroscopicity, heat resistance, and mechanical strength and further is superior in prevention of white turbidity under a high temperature, high humidity environment, so can be suitably used as a lens for the various types of lighting equipments of cars, motorcycles, trucks, buses, trains, and other general vehicles.

(3) The "lamp cover" according to the present invention is a lamp cover provided in front of the light source and allowing passage of the light of the light source and is characterized by being comprised of a thermoplastic resin containing an alicyclic structure.

The "lamp cover" referred to in the present invention means broadly covers which protect a light source and allow light from the light source to pass therethrough for emission to the outside.

(4) The "lamp cap" according to the present invention is a lamp cap covering part or all of the light source and is characterized by being comprised of a thermoplastic resin containing an alicyclic structure.

The "lamp cap" referred to in the present invention means caps used for covering lamps which cover the entire surface of the lamps or which cover part of the lamps.

The lamp cap of the present invention may also be used for covering the lamp of a turn signal light mounted at the front side of a vehicle and for coloring the light emitted from the lamp when passing it. Therefore, the lamp cap may be colored to an extent not impairing the transparency (for example, yellow or orange). The lamp cap of the present invention may be used for various types of lighting equipments and is not particularly limited in application, but for example vehicular lighting equipments may be given as an example. Note that the lamp cap is not limited to vehicular use and may also be used for flashlights and other general lighting equipments.

(5) The "light guide" according to the present invention is a light guide for a lighting equipment provided in a light chamber of the lighting equipment and having an incident face to which is introduced at least one type of light selected from the group of light from a light source and light from a light source reflected by a reflector and an emission face emitting the incident light introduced from the incident face to the outside, characterized by being comprised of a thermoplastic resin containing an alicyclic structure having a glass transition temperature of at least 90° C.

The glass transition temperature of the thermoplastic resin containing an alicyclic structure in the light guide of the present invention is normally at least 90° C., but is preferably at least 120° C., more preferably at least 140° C., and preferably not more than 300° C., more preferably not more than 250° C.

The "light guide" referred to in the present invention is a component of a lighting equipment which is for example provided in the light chamber formed by a body and cover (or outer lens) of a vehicular lighting equipment and has an incident face to which light from a light source is introduced and an emission face for emitting the incident light to the outside and is used for the purpose of increasing the light receiving area of the lighting equipment or making the lighting equipment thinner.

The shape of the "light guide" referred to in the present invention is not particularly limited and includes not only simple shapes such as sheets and rods, but also suitable shapes corresponding to the shape of the lighting equipment.

Light guides of vehicular lighting equipments are frequently used for taillights or stoplights, but the present invention is not particularly limited to these and may be applied to the various types of lighting equipments mentioned above as well.

(6) The "lighting equipment" according to the present invention is characterized by having one of the reflectors described in the above (1) (for example, a reflector comprising a substrate comprised of a thermoplastic resin containing an alicyclic structure on which is formed a reflecting layer having a reflectance of at least 70%).

The lighting equipment of the present invention preferably further has a lens for condensing light of a light source reflected by the reflector. The lens in this case is preferably comprised of a resin composition containing a thermoplastic resin containing an alicyclic structure and at least one compounding agent selected from the group comprising a partial ether compound of a polyhydric alcohol and or a partial ester compound of a polyhydric alcohol, a soft polymer, a filler, and a compound incompatible with the thermoplastic resin having an alicyclic structure.

The lighting equipment of the present invention preferably further has a lamp cover which allows passage of light of the light source reflected by the reflector. The lamp cover in this case is preferably comprised of a thermoplastic resin containing an alicyclic structure.

The lighting equipment of the present invention preferably further has a lamp cap covering part of all of the light source. The lamp cap in this case preferably is comprised of a thermoplastic resin containing an alicyclic structure.

The lighting equipment of the present invention preferably further has a light guide having an incident face to which is introduced at least one type of light selected from light from a light source and light from a light source reflected by a reflector and an emission face emitting the incident light introduced from the incident face to the outside. The light guide in this case is preferably comprised of a thermoplastic resin containing an alicyclic structure having a glass transition temperature of at least 90° C., preferably at least 120° C., more preferably at least 140° C. and preferably not more than 300° C., more preferably not more than 250° C.

In the "lighting equipment" according to the present invention, the best mode is a lighting equipment having a reflector, a lens for condensing light of a light source reflected by the reflector, a lamp cover allowing the passage of light of the light source reflected by the reflector, a lamp cap covering part or all of the light source, and a light guide having an incident face to which is introduced at least one type of light selected from light from a light source and light from a light source reflected by a reflector and an emission face emitting the incident light introduced from the incident face to the outside, wherein the "reflector" has any of the configurations described in the above (1) (for example, a reflector comprising a substrate comprised of a thermoplastic resin containing an alicyclic structure on which is formed a reflecting layer having a reflectance of at least 70%), the lens is comprised of a resin composition containing a thermoplastic resin containing an alicyclic structure and at least one compounding agent selected from the group comprising a partial ether compound of a polyhydric alcohol and or a partial ester compound of a polyhydric alcohol, a soft polymer, a filler, and a compound incompatible with the thermoplastic resin having an alicyclic structure, the lamp cover is comprised of a thermoplastic resin containing an alicyclic structure, the lamp cap is comprised of a thermoplastic resin containing an alicyclic structure, and the light guide is comprised of a thermoplastic resin containing an alicyclic structure having a glass transition temperature of at least 90° C., preferably at least 120° C., more preferably at least 140° C. and preferably not more than 300° C., more preferably not more than 250° C.

The "lighting equipment" referred to in the present invention means for example a lighting equipment used for a vehicular light; studio lamp; flashlight; or other applications. The lighting equipment of the present invention is comprised of at least one member selected from the group comprising a reflector provided close to a light source (including an extension reflector), inner lens, lamp cover (outer lens), light guide, and lamp cap.

The "vehicle" means a two-wheeled vehicle, three-wheeled vehicle, four wheeled vehicle, and other automobiles, bicycles, rolling stock, forklifts, tractors, and other industrial vehicles and other vehicles in the broad sense.

The "vehicular lighting equipment" means a lighting equipment for illumination or identification or display mounted on these various types of vehicles. It is not particularly limited, but may include a turn signal light (so-called "winker"), side marker light, taillight, stoplight, headlight, high mount stoplight, cornering light, backup light, etc.

Mode of Operation (1) The "reflector" according to the present invention is comprised of a substrate comprised of a thermoplastic resin containing an alicyclic structure on which is formed a reflecting layer having a reflectance of at least 70% and is light in weight and superior in surface smoothness, heat resistance, moldability, and reflection characteristics. Further, by making the substrate comprising the reflector of the present invention a thermoplastic resin containing an alicyclic structure, the heat resistance of the reflector is improved, peeling of the reflecting layer is made harder, and therefore the reflectance no longer falls over a long period of time.

(2) The "reflector" according to the present invention is comprised of a substrate comprised of a thermoplastic resin containing an alicyclic structure having a metal film on it and is light in weight and superior in surface smoothness, heat resistance, moldability, and reflection characteristics. Further, since the substrate comprising the reflector of the present invention is comprised of a thermoplastic resin containing an alicyclic structure, the heat resistance of the reflector is improved, peeling of the reflecting layer is made harder, and therefore the reflectance no longer falls over a long period of time.

(3) By configuring the substrate of the reflector from a resin composition containing a thermoplastic resin containing an alicyclic structure, when vapor depositing for example aluminum to give at least the main surface of the substrate a mirror finish, it is possible to obtain a sufficiently satisfactory surface smoothness even without forming an under coating film. The superiority in the surface smoothness is believed to be caused by the fact that the thermoplastic resin containing an alicyclic structure according to the present invention is an amorphous resin. Further, by configuring the substrate comprising the reflector of the present invention from a thermoplastic resin containing an alicyclic structure, a substrate superior in heat resistance is obtained. Further, since the resin can be molded without breaking down even at a high temperature and is superior in fluidity when melted, it is possible to easily mold even a thin, large-sized, complicated shape without molding imperfections. Therefore, this is preferably used for a reflector of a vehicular lighting equipment which is complicated, large-sized, and desirably light in weight.

Further, by configuring the substrate of the reflector from a resin composition including a thermoplastic resin containing an alicyclic structure and at least one compounding agent selected from the group comprising a partial ether compound of a polyhydric alcohol and/or a partial ester compound of a polyhydric alcohol, a soft polymer, a filler, and a compound incompatible with the thermoplastic resin having an alicyclic structure, the reflector of the present invention is superior in durability under a high temperature and high humidity and can be suitably used as not only an extension reflector, but also a main reflector of a lamp unit.

(4) By configuring the substrate of the reflector from a resin composition comprised of a thermoplastic resin containing an alicyclic structure to which is blended a soft polymer having a glass transition temperature of not more than 30° C., no cracks or crazing will occur even when screwing in the reflector when assembling it to the vehicle. Therefore, it is preferably used for a reflector of a vehicular lighting equipment which is complicated, large-sized, and desirably light in weight. Further, by blending in a soft polymer having a glass transition temperature of at least −100° C., the effect of prevention of cracks and crazing can be expected.

(5) By configuring the substrate of the reflector from a resin composition comprised of a thermoplastic resin containing an alicyclic structure to which is blended a crystalline polymer, the heat resistance of the obtained reflector is particularly improved and there is no heat deformation even under harsh usage conditions. Therefore, it is possible to preferably use the reflector for not only an extension reflector, but also the main reflector of a lamp unit.

(6) By configuring the substrate of the reflector from at least one type of thermoplastic resin containing an alicyclic structure selected from the group comprising a ring-opening polymer of a norbornene-based monomer, a hydrogenate of a ring-opening polymer of a norbornene-based monomer, and an addition polymer including addition type repeating units of an at least three-ring norbornene-based monomer, the reflector of the present invention obtained is remarkably improved in impact resistance compared with a reflector comprised of an addition copolymer of a norbornene and ethylene. This is because in an addition copolymer, the greater the ring structures, the better the heat resistance and the greater the ethylene, the better the impact resistance. Therefore, when obtaining a polymer having the same heat resistance, one with a three-ring structure can be increased in the amount of ethylene compared with one of a two-ring structure and therefore can improve the impact resistance of the reflector. Further, an addition polymer has a rigid main chain portion compared with a ring-opening polymer and is therefore hard and brittle in structure. Therefore, if the amount of the norbornene rings in the addition polymer is increased to give a certain extent of heat resistance, the result becomes easier to break than a ring-opening polymer.

(7) When the reflecting layer of the reflector of the present invention is too thin, the smoothness of the layer surface after forming the reflecting layer falls (surface shape of molded article is easily transferred), so the reflectance falls undesirably. Further, when the reflecting layer is too thick, for example, cracks undesirably occur in the reflecting layer in a heat resistance test for example. That is, by making the thickness of the reflecting layer of the reflector from 5 to 10,000 nm, the reflectance and the durability of the reflecting layer are well balanced.

Further, by preferably reducing the repeating units containing polar groups in the thermoplastic resin containing an alicyclic structure comprising the substrate of the reflector of the present invention, specifically by making the ratio of content of the repeating units containing polar groups preferably not more than 50 wt %, more preferably not more than 30 wt %, still more preferably not more than 10 wt %, it is possible to hold the hygroscopicity of the resin at below a constant value. Therefore, in particular when subjecting a molded article formed with the reflecting layer to a high temperature, high humidity environment test, it is possible to prevent the reduction of the adhesion of the reflecting layer. Further, when the reflecting layer is a metal film, the reduction in the reflectance due to the oxidation of the metal reflecting layer is remarkably reduced. Further, using a resin with 0 wt % of repeating units containing polar groups, that is, a resin not having repeating units containing polar groups, is most preferred in the point that prevention of a fall in the adhesion of the reflecting layer can be expected in the above high temperature, high humidity environment test.

Further, if the melt flow index of the thermoplastic resin containing the alicyclic structure comprising the substrate of the reflector of the present invention is too low, since the temperature for heating the molding material at the time of molding will become higher, working will sometimes become difficult. Further, if the melt flow rate of the thermoplastic resin containing an alicyclic structure is too high, burrs and other molding imperfections will sometimes occur at the time of molding. That is, by making the melt flow rate of the thermoplastic resin containing an alicyclic structure in the range of 4 to 100 g/10 min, a substrate superior in surface smoothness is obtained. If the surface smoothness of the substrate is improved, the reflectance at the time of forming a reflecting layer will be improved.

Further, by using as the thermoplastic resin containing an alicyclic structure comprising the substrate of the reflector of the present invention one having repeating units comprised of ring structures other than norbornene rings, the heat resistance is improved, it is possible to reduce the heat deformation at the time of forming the reflecting layer or using the reflector, and there is a remarkable contribution to the prevention of peeling of the reflecting layer.

Further, by forming the reflector (including extension reflector) and lens integrally, not only does the step of assembling a separate optical lens part to the reflector become unnecessary, but also the lens formed by the thermoplastic resin containing an alicyclic structure according to the present invention is superior in optical characteristics such as having a small birefringence and small deformation in the face of environmental changes and is excellent in moldability and superior in surface accuracy. Therefore, by using this for a projection type lighting equipment, it is possible to achieve an improvement of the optical characteristics simultaneously with a reduction in the number of parts.

(8) The "lens" according to the present invention is comprised of a resin composition including a thermoplastic resin containing an alicyclic structure and at least one compounding agent selected from the group comprising a partial ether compound of a polyhydric alcohol and/or a partial ester compound of a polyhydric alcohol, a soft polymer, a filler, and a compound incompatible with the thermoplastic resin having an alicyclic structure, so is free from any reduction in various characteristics such as the transparency, low hygroscopicity, heat resistance, and mechanical strength and is superior in prevention of white turbidity under a high temperature, high humidity environment.

(9) The "lamp cover" according to the present invention is comprised of a thermoplastic resin containing an alicyclic structure, so is superior in light transmittance and has little reduction of luminance when the light from the light source passes through the lamp cover. Therefore, it is particularly suited for a lamp cover for a lighting equipment. Further, the thermoplastic resin containing an alicyclic structure comprising the lamp cover allows ready passage of infrared light, so there is little temperature rise in the lamp cover. Further, the thermoplastic resin containing an alicyclic structure comprising the lamp cover is itself superior in heat resistance, so there is also little heat deformation.

Further, since the lamp cover according to the present invention is comprised of the thermoplastic resin containing an alicyclic structure, it is superior in heat resistance and free from heat deformation, warping, change in appearance, etc. even under a high temperature environment.

In particular, one characteristic of the thermoplastic resin containing an alicyclic structure comprising the lamp cover according to the present invention is the characteristic of a high transmittance of ultraviolet light, so there is little deterioration of the resin and low reduction in the impact resistance, light reflectance, and light transmittance even if using a lamp emitting high intensity light with a low power consumption, but emitting light containing a large amount of ultraviolet light such as a HID (high intensity discharge) lamp as a light source.

By making the lamp cover according to the present invention using a resin composition comprised of a thermoplastic resin containing an alicyclic structure containing a UV absorbent, the resistance to ultraviolet light is further improved.

Further, the thermoplastic resin containing an alicyclic structure comprising a lamp cover according to the present invention is superior in heat resistance and can be molded without breaking down even at a high temperature and is superior in fluidity when melted as well, so can be easily molded even into a thin, large sized, and complicated shape lamp cover without molding imperfections. Therefore, it is preferably used for a lamp cover for a lighting equipment which is complicated, large in size, and desirably light in weight.

(10) The "lamp cap" according to the present invention is comprised of a thermoplastic resin containing an alicyclic structure, so is superior in transparency and heat resistance, is superior in light resistance and long term stability against heat, that is, will not yellow or otherwise change along with time. Further, the resin will not break down or hydrolyze due to heat at the time of molding, so the resin will not bubble and is superior in transparency as a molded article. Further, it is superior in fluidity when melted, so can easily be molded into a thin article without causing molding imperfections. Therefore, it is preferable for use for a lamp cap of a vehicular lighting equipment for which reduction of the size of the lighting equipment as a whole is desirable.

(11) The "light guide" according to the present invention is comprised of a thermoplastic resin containing an alicyclic structure having a glass transition temperature of at least 90° C., so is superior in transparency, has a small birefringence, and has a small hygroscopic deformation under a high temperature, high humidity environment, and is superior in impact resistance and light resistance. Further, the thermoplastic resin containing an alicyclic structure having a glass transition temperature of at least 90° C. comprising the light guide according to the present invention is superior in heat resistance and therefore can be molded without breaking down even at a high temperature and further is superior in fluidity when melted, so can be easily molded into a light guide with a high accuracy without molding imperfections even with a thin, large sized, and complicated shape. Therefore, it is superior in transparency, resistance to hygroscopic deformation, impact resistance, and light resistance, and is preferable for use for a light guide of a vehicle lighting equipment which is complicated in shape, large in size, and desirably light in weight. Further, by use of a thermoplastic resin containing an alicyclic structure having a glass transition temperature of not more than 300° C., the above effects can be expected.

Thermoplastic Resin Containing Alicyclic Structure

The thermoplastic resin containing an alicyclic structure used in the present invention is one having an alicyclic structure in the main chain and/or side chains. It preferably contains the alicyclic structure in the main chain from the viewpoint of the mechanical strength, heat resistance, etc.

As the alicyclic structure, there are a saturated cyclic hydrocarbon (cycloalkane) structure, unsaturated cyclic hydrocarbon (cycloalkene) structure, etc. From the viewpoint of the mechanical strength, heat resistance, etc., a cycloalkane structure or cycloalkene structure is preferable. Among these, one having a cycloalkane structure is most preferable.

The number of carbon atoms comprising the alicyclic structure is not particularly limited, but is normally 4 to 30, preferably 5 to 20, more preferably 5 to 15, at which time the heat resistance and moldability characteristics are well balanced.

The percentage of the repeating units having alicyclic structures contained in the thermoplastic resin may be suitably selected in accordance with the object of use, but normally is at least 30 wt %, preferably at least 50 wt %, more preferably at least 70 wt %, most preferably at least 90 wt %. If the percentage of the repeating units having an alicyclic structure in the thermoplastic resin containing an alicyclic structure is excessively small, the heat resistance is inferior.

Further, the percentage of the repeating units comprised of ring structures other than norbornene structures in the alicyclic structures in the thermoplastic resin containing an alicyclic structure used in the present invention may be suitably selected in accordance with the object of use, but is normally at least 10 wt %, preferably at least 20 wt %, more preferably at least 30 wt %. The larger the percentage of repeating units comprised of ring structures other than norbornene structures, the better the light resistance and the more yellowing of the molded article etc. can be prevented.

Note that the balance other than the repeating units having alicyclic structures in the thermoplastic resin containing an alicyclic structure is not particularly limited and is suitably selected in accordance with the object of use.

As specific examples of the thermoplastic resin containing an alicyclic structure, for example, (1) a norbornene-based polymer, (2) a monocyclic cyclic olefin-based polymer, (3) a cyclic conjugated diene-based polymer, (4) a vinyl alicyclic hydrocarbon polymer, and hydrogenates of the same may be mentioned. Among these, a norbornene-based polymer and its hydrogenate, a cyclic conjugated diene-based polymer and its hydrogenate, etc. are preferable. A norbornene-based polymer and its hydrogenate are more preferable.

(1) Norbornene-Based Polymers

The norbornene-based polymer is not particularly limited. For example, the polymers disclosed in Japanese Unexamined Patent Publication (Kokai) No. 3-14882, Japanese Unexamined Patent Publication (Kokai) No. 3-122137, etc. may be used. Specifically, a ring-opening polymer of a norbornene-based monomer and its hydrogenate, an addition polymer of a norbornene-based monomer, an addition polymer of a norbornene-based monomer and vinyl compound, etc. may be mentioned. Among these, a ring-opening polymer hydrogenate of a norbornene-based monomer, an addition polymer of norbornene-based monomers, an addition polymer of a norbornene-based monomer and a copolymerizable vinyl compound, etc. are preferable. A ring-opening polymer hydrogenate of a norbornene-based monomer is particularly preferable.

As a norbornene-based monomer, a bicyclic norbornene-based monomer having a norbornene (bicyclic) structure, a tricyclic norbornene-based monomer, a tetracyclic norbornene-based monomer, a pentacyclic norbornene-based monomer, or a hexacyclic or higher norbornene-based monomer may be mentioned.

As a bicyclic norbornene-based monomer, for example, bicyclo[2.2.1]hept-2-ene (common name norbornene), 5-methyl-bicyclo[2.2.1]hept-2-ene, 5,5-dimethyl-bicyclo [2.2.1]hept-2-ene, 5-ethyl-bicyclo[2.2.1]hept-2-ene, 5-butyl-bicyclo[2.2.1]hept-2-ene, 5-ethylidene-bicyclo [2.2.1]hept-2-ene, 5-hexyl-bicyclo[2.2.1]hept-2-ene, 5-octyl-bicyclo[2.2.1]hept-2-ene, 5-octadecyl-bicyclo [2.2.1]hept-2-ene, 5-ethylidene-bicyclo[2.2.1]hept-2-ene, 5-methylidene-bicyclo[2.2.1]hept-2-ene, 5-vinyl-bicyclo [2.2.1]hept-2-ene, 5-propenyl-bicyclo[2.2.1]hept-2-ene, 5-methoxy-carbonyl-bicyclo[2.2.1]hept-2-ene, 5-cyano-bicyclo[2.2.1]hept-2-ene, 5-methyl-5-methoxycarbonylbicyclo[2.2.1]hept-2-ene, 5-methoxycarbonylbicyclo[2.2.1]hept-2-ene, 5-ethoxycarbonylbicyclo[2.2.1]hept-2-ene, 5-methyl-5-methoxycarbonylbicyclo[2.2.1]hept-2-ene, 5-methyl-5-ethoxycarbonylbicyclo[2.2.1]hept-2-ene, bicyclo[2.2.1] hept-5-enyl-2-methylpropionate, bicyclo[2.2.1]hept-2-enyl-2-methyloctanate, bicyclo[2.2.1]hept-2-en-5,6-dicarboxylate anhydride, 5-hydroxymethylbicyclo[2.2.1] hept-2-ene, 5,6-di(hydroxymethyl)bicyclo[2.2.1]hept-2-ene, 5-hydroxy-i-propylbicyclo[2.2.1]hept-2-ene, 5,5-dicarboxybicyclo[2.2.1]hept-2-ene, 5-cyanobicyclo[2.2.1] hept-2-ene, bicyclo[2.2.1]hept-2-en-5,6-dicarboxylate imide, etc. may be mentioned.

As the tricyclic norbornene-based monomer, for example, tricyclo[4.3.0.1$^{2,5}$]deca-3,7-diene (common name dicyclopentadiene), tricyclo[4.3.0.1$^{2,5}$]deca-3-ene; tricyclo [4.4.0.1$^{2,5}$]undeca-3,7-diene or tricyclo[4.4.0.1$^{2,5}$]undeca-3, 8-diene or their partial hydrogenates (or adduct of cyclopentadiene and cyclohexene); 5-cyclopentyl-bicyclo[2.2.1] hept-2-ene, 5-cyclohexyl-bicyclo[2.2.1]hept-2-ene, 5-cyclohexenylbicyclo[2.2.1]hept-2-ene, 5-phenyl-bicyclo [2.2.1]hept-2-ene, etc. may be mentioned.

As the tetracyclic norbornene-based monomer, for example, tetracyclo[4.4.0.1$^{2,5}$.1$^{7,10}$]dodeca-3-ene (common name tetracyclododecene), 8-methyltetracyclo-[4.4.0.1$^{2,}$ $_5$.1$^{7,10}$]dodeca-3-ene, 8-ethyltetracyclo-[4.4.0.1$^{2,5}$.1$^{7,10}$] dodeca-3-ene, 8-methylidenetetracyclo-[4.4.0.1$^{2,5}$.1$^{7,10}$] dodeca-3-ene, 8-ethylidenetetracyclo-[4.4.0.1$^{2,5}$.1$^{7,10}$] dodeca-3-ene, 8-vinyltetracyclo-[4.4.0.1$^{2,5}$.1$^{7,10}$]dodeca-3-ene, 8-propenyltetracyclo-[4.4.0.1$^{2,5}$.1$^{7,10}$]dodeca-3-ene, 8-methoxycarbonyl-tetracyclo[4.4.0.1$^{2,5}$.1$^{7,10}$]dodeca-3-ene, 8-methyl-8-methoxycarbonyltetracyclo[4.4.0.1$^{2,5}$.1$^{7,}$ $_{10}$]dodeca-3-ene, 8-hydroxymethyltetracyclo[4.4.0.1$^{2,5}$.1$^{7,}$ $_{10}$]dodeca-3-ene, 8-carboxytetracyclo[4.4.0.1$^{2,5}$.1$^{7,10}$] dodeca-3-ene, and other tetracyclododecene-based monomers, tetracyclo[7.4.0.1$^{10,13}$.0$^{2,7}$]trideca-2,4,6,11-tetraene (also called 1,4-methano-1,4,4a,9a-tetrahydrofluorene), tetracyclo[8.4.0.1$^{11,14}$.0$^{3,8}$]-tetradeca-3, 5,7,12-tetraene (also called 1,4-methano-1,4,4a,5,10,10a-hexahydroanthracene), etc. may be mentioned.

As the pentacyclic norbornene-based monomer, for example, 8-cyclopentyl-tetracyclo[4.4.0.1$^{2,5}$.1$^{7,10}$]-dodeca-3-ene, 8-cyclohexyl-tetracyclo[4.4.0.1$^{2,5}$.1$^{7,10}$]-dodeca-3-ene, 8-cyclohexenyl-tetracyclo-[4.4.0.1$^{2,5}$.1$^{7,10}$]-dodeca-3-ene, pentacyclo-[6.5.1.1$^{3,6}$.0$^{2,7}$.0$^{9,13}$]pentadeca-3,10-diene, pentacyclo[7.4.0.1$^{3,6}$.1$^{10,13}$.0$^{2,7}$]pentadeca-4,11-diene, etc. may be mentioned.

As the hexacyclic and higher norbornene-based monomer, for example, 8-phenyl-cyclopentyl-tetracyclo [4.4.0.1$^{2,5}$.1$^{7,10}$]-dodeca-3-ene, a tetramer of cyclopentadiene, etc. may be mentioned.

These norbornene-based monomers may be used alone or in combinations of two or more types.

As the copolymerizable vinyl compound, for example, ethylene, propylene, 1-butene, 1-pentene, 1-hexene, 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, 1-octene, 1-decene, 1-dodecene, 1-tetradecene, 1-hexadecene, 1-octadecene, 1-eicosene, and other $C_2$ to $C_{20}$ ethylene or α-olefins; cyclobutene, cyclopentene, cyclohexene, 3,4-dimethylcyclopentene, 3-methylcyclohexene, 2-(2-methylbutyl)-1-cyclohexene, cyclooctene, 3a,5,6,7a-tetrahydro-4,7-methano-1H-indene, and other cycloolefins; 1,4-hexadiene, 4-methyl-1,4-hexadiene, 5-methyl-1,4-hexadiene, 1,7-octadiene, and other nonconjugated dienes, etc. may be mentioned.

These vinyl-based compounds may be used alone or in combinations of two or more types.

The method of polymerization and the method of hydrogenation of the norbornene-based monomer or the norbornene-based monomer and copolymerizable vinyl-based compound are not particularly limited and may be based on known methods.

The ring-opening (co)polymer of a norbornene-based monomer may-be obtained by causing ring-opening (co) polymerization of a norbornene-based monomer in a solvent or without a solvent normally at a polymerization temperature of −50 to 100° C. and a polymerization pressure of 0 to 50 kg/cm$^2$ using as a ring-opening polymerization catalyst a catalyst system comprised of a halide, acetate, or acetylacetone compound of ruthenium, rhodium, palladium, osmium, iridium, platinum, and another metal and a reducing agent or a catalyst system comprised of a halide or acetylacetone compound of titanium, vanadium, zirconium, tungsten, molybdenum, or another metal and an organoaluminum compound.

The hydrogenated norbornene-based monomer may be obtained by the method of hydrogenating a ring-opening (co)polymer in the presence of a hydrogenation catalyst by an ordinary method.

The catalyst system may have added to it molecular oxygen, alcohol, ether, peroxide, carboxylate, an acid anhydride, acid chloride, ester, ketone, nitrogenous compound, sulfurous compound, halide compound, molecular iodine, or other Lewis acid or other tertiary component to enhance the polymerization activity or selectivity of the ring-opening polymerization.

The norbornene-based monomer or the addition copolymer of the norbornene-based monomer and copolymerizable vinyl-based compound may be obtained for example by the method of causing copolymerization of the monomer component in a solvent or without a solvent in the presence of a catalyst system comprised of a titanium, zirconium, or vanadium compound and organoaluminum compound normally at a polymerization temperature of −50 to 100° C. and a polymerization pressure of 0 to 50 kg/cm$^2$.

Further, as the addition polymer containing addition type repeating units of a tricyclic or higher norbornene-based monomer used for the "reflector" of the present invention, a tricyclic or higher norbornene-based monomer or an addition polymer of a tricyclic or higher norbornene-based monomer and another monomer copolymerizable monomer may be used.

As the tricyclic or higher norbornene-based monomer, for example, a tricyclic or higher norbornene-based monomer may be used, preferably a tricyclic or tetracyclic norbornene-based monomer may be used. The content of the tricyclic or higher norbornene-based monomer in the addition polymer may be suitably selected according to the object of use, but normally is at least 30 wt %, preferably at least 50 wt %, more preferably at least 70 wt %. At this time, a good balance of the impact resistance, heat resistance, and moldability is obtained.

The balance other than the tricyclic norbornene-based monomer in the addition polymer is not particularly limited so long as it is a copolymerizable monomer. For example, a bicyclic norbornene-based monomer, α-olefin, etc. may be used.

These norbornene-based monomers may be used alone or in combinations of two or more types. When a high surface smoothness is particularly required, a hydrogenate of a ring-opening polymer is suitably used. The hydrogenation rate at this time is normally at least 50%, preferably at least 70%, more preferably at least 90%.

(2) Monocyclic Cyclic Olefin-Based Polymers

As the monocyclic cyclic olefin-based polymer, for example, the addition polymers of cyclohexene, cycloheptene, cyclooctene, and other monocyclic cyclic olefin-based monomers disclosed in Japanese Unexamined Patent Publication (Kokai) No. 64-66216 may be used.

(3) Cyclic Conjugated Diene-Based Polymers

As the cyclic conjugated diene-based polymer, for example, the polymers obtained by 1,2- or 1,4-addition polymerization of cyclopentadiene, cyclohexadiene, or other cyclic conjugated diene-based monomers and their hydrogenates etc. disclosed in Japanese Unexamined Patent Publication (Kokai) No. 6-136057 or Japanese Unexamined Patent Publication (Kokai) No. 7-258318 may be used.

(4) Vinyl Alicyclic Hydrocarbon Polymers

As the vinyl alicyclic hydrocarbon polymer, for example, a polymer of a vinyl cyclohexene or vinyl cyclohexane or other vinyl alicyclic hydrocarbon monomer or its hydrogenate disclosed in Japanese Unexamined Patent Publication (Kokai) No. 51-59989, the hydrogenate of the aromatic ring portion of a polymer of a styrene or α-methylstyrene or other vinyl aromatic monomer disclosed in Japanese Unexamined Patent Publication (Kokai) No. 63-43910, Japanese Unexamined Patent Publication (Kokai) No. 64-1706, etc. may be used.

(5) Molecular Weight

The molecular weight of the thermoplastic resin containing an alicyclic structure used for the "reflector", "lamp cover", "lamp cap", and "light guide" of the present invention is suitably selected in accordance with the object of use, but is at least 5,000, preferably 5,000 to 500,000, more preferably 8,000 to 200,000, particularly preferably 10,000 to 100,000 in terms of weight average molecular weight (Mw) in a cyclohexane solution (when resin will not dissolve, toluene solution) converted to polyisoprene (converted to polystyrene in case of toluene solution) measured by gel permeation chromatography, at which time the mechanical strength and moldability are well balanced.

The molecular weight of the thermoplastic resin containing an alicyclic structure used in the "lens" of the present invention is normally, in terms of the same Mw as above, 1,000 to 200,000, preferably 2,000 to 150,000, more preferably 5,000 to 100,000, particularly preferably 10,000 to 80,000, at which time the balance of the mechanical strength and the moldability is maintained. Further, the distribution of the molecular weight is suitably selected in accordance with the object of use, but if expressed by the ratio (Mw/Mn) of the weight average molecular weight (Mw) and number average molecular weight (Mn) measured by GPC using cyclohexane as a solvent, is normally not more than 5.0, preferably not more than 4.0, more preferably not more than 3.0.

(6) Glass Transition Temperature

The glass transition temperature (Tg) of the thermoplastic resin containing an alicyclic structure used for the "reflector" and "lamp cover" of the present invention may be suitably selected in accordance with the object of use, but is preferably high in view of the usage environment and is normally 50 to 300° C., preferably 100 to 280° C., more preferably 150 to 250° C., at which time the heat resistance and the moldability are well balanced.

The Tg of the thermoplastic resin containing an alicyclic structure used for the "lens" of the present invention may be suitably selected in accordance with the object of use, but is normally 50 to 350° C., preferably 70 to 320° C., more preferably 90 to 300° C. The higher the Tg of the resin, the higher the heat resistance enabling the lens to withstand deformation due to the heat of the lamp at the time of use. The plastic lens will not deform even if used in close proximity to the lamp. If the Tg of the resin is too high, the temperature of heating the molding material at the time of molding will become high and therefore the material will be difficult to work. Therefore, when the Tg of the resin is in this range, the heat resistance and the moldability are well balanced.

The Tg of the thermoplastic resin containing an alicyclic structure used for the "lamp cap" of the present invention may be suitably selected in accordance with the object of use, but a higher one is preferable in view of the environment of use of the lamp cap and is normally 70 to 250° C., preferably 90 to 220° C., more preferably 120 to 180° C., most preferably 140 to 180° C., at which time the heat resistance and the fluidity when molding are well balanced.

The Tg of the thermoplastic resin containing an alicyclic structure used for the "light guide" of the present invention may be suitably selected in accordance with the object of use, but a higher one is preferable in view of the environment of use of the light guide and is normally at least 90° C., preferably at least 120° C., more preferably at least 140° C., at which time the heat resistance and the moldability are well balanced.

(7) Melt Flow Rate

The melt flow rate (MFR), measured by JIS-K6719 at a temperature of 280° C. and a load of 2.16 kgf, of the thermoplastic resin containing an alicyclic structure used for the "reflector" of the present invention is normally 4 to 100 g/10 min, preferably 10 to 50 g/10 min, more preferably 15 to 50 g/10 min.

The MFR of the thermoplastic resin containing an alicyclic structure used for the "lamp cover" and "light guide" of the present invention may be suitably selected in accordance with the object of use, but normally is in the range of 4 to 100 g/10 min, preferably 10 to 50 g/10 min. If the melt flow rate is too low, the temperature for heating the molding material at the time of molding becomes higher, so working becomes difficult in some cases, while if too high, burrs and other molding imperfections sometimes occur when molding.

The MFR of the thermoplastic resin containing an alicyclic structure used for the "lens" of the present invention may be suitably selected in accordance with the object of use, but normally is in the range of 1 to 100 g/10 min, preferably 2 to 70 g/10 min, more preferably 3 to 50 g/10 min, at which time the thickness and moldability of fine structures become optimal.

The melt flow rate (MFR), measured by JIS-K6719 at 300° C. and a load of 2.16 kgf, of the thermoplastic resin containing an alicyclic structure used for the "lamp cap" of the present invention may be suitably selected in accordance with the object of use, but normally is in the range of 4 to 100 g/10 min, preferably 0 to 50 g/10 min. If the melt flow rate is too low, the temperature for heating the molding material at the time of molding becomes higher, so working becomes difficult in some cases, while if too high, burrs and other molding imperfections sometimes occur when molding.

These thermoplastic resins containing an alicyclic structure may be used alone or in combinations of two or more types.

Other Components

In the present invention, the thermoplastic resin containing an alicyclic structure may according to need have the following types of compounding agents mixed in it alone or in combinations of two or more types.

(1) Partial Ether Compound of Polyhydric Alcohol and/or Partial Ester Compound of Polyhydric Alcohol The partial ether compound of a polyhydric alcohol is not particularly limited so long as it is an organic compound having at least one alcoholic hydroxyl group not a phenolic hydroxyl group and at least one ether bond unit in the molecule. For example, a partial ether compound of a polyhydric alcohol having one hydroxyl group etherified such as a bivalent or higher polyhydric alcohol, more preferably a trivalent or higher polyhydric alcohol, still more preferably a polyhydric alcohol having three to eight hydroxyl groups may be mentioned.

Further, the partial ester compound of the polyhydric alcohol is not particularly limited so long as it is an organic compound having at least one alcoholic hydroxyl group not a phenolic hydroxyl group and at least one ester bond unit in the molecule. For example, a partial ether compound of a polyhydric alcohol having one hydroxyl group esterified such as a bivalent or higher polyhydric alcohol, more preferably a trivalent or higher polyhydric alcohol, still more preferably a polyhydric alcohol having three to eight hydroxyl groups may be mentioned.

By blending these partial ether compounds of a polyhydric alcohol and/or partial ester compounds of a polyhydric alcohol, it is possible to prevent white turbidity under a high temperature, high humidity environment and maintain a high transparency.

As the bivalent or higher polyhydric alcohol, for example, polyethylene glycol, glycerol, trimethylolpropane, pentaerythritol, diglycerol, triglycerol, dipentaerythritol, 1,6,7-trihydroxy-2,2-di(hydroxymethyl)-4-oxoheptone, sorbitol, 2-methyl-1,6,7-trihydroxy-2-hydroxymethyl-4-oxoheptone, 1,5,6 -trihydroxy-3-oxohexanepentaerythritol, tris(2-hydroxyethyl)isocyanurate, etc. may be mentioned, but among these in particular a trivalent or higher polyhydric alcohol and further a polyhydric alcohol having three to eight hydroxyl groups is preferable. Further, when obtaining a partial ester compound of a polyhydric alcohol, glycerol, diglycerol, triglycerol, etc. enabling synthesis of a partial ester compound of the polyhydric alcohol including $\alpha,\beta$-diol are preferable.

As the partial ether compound of a polyhydric alcohol and/or partial ester compound of a polyhydric alcohol, specifically, for example, glyceryl monostearate, glyceryl monolaurate, glyceryl monobehenate, diglyceryl monostearate, glyceryl distearate, glyceryl dilaurate, pentaerythritol monosteareate, pentaerythritol distearate, pentaerythritol dilaurate, pentaerythritol tristearate, dipentaerythritol distearate, and other ethers and esters of polyhydric alcohols; 3-(octyloxy)-1,2-propanediol, 3-(decyloxy)-1,2-propanediol, 3-(lauryloxy)-1,2-propanediol, 3-(lauryloxy)-1,2-propanediol, 3-(4-nonylphenyloxy)-1,2-propanediol, 1,6-dihydroxy-2,2-di(hydroxymethyl)-7-(4-nonylphenyloxy)-4-oxoheptone, an ether compound obtained by a reaction of a condensate of p-nonylphenyl ether and formaldehyde with glycidol, an ether compound obtained by a reaction of a condensate of p-octylphenyl ether and formaldehyde with glycidol, an ether compound obtained by a reaction of a condensate of p-octylphenylether and dicyclopentagen with glycidol, etc. may be mentioned.

The molecular weight of the partial ether compound of a polyhydric alcohol and/or partial ester compound of a polyhydric alcohol is not particularly limited, but normally one of 500 to 2000, preferably 800 to 1500 is preferable since there is also little fall in transparency.

The partial ether compound of a polyhydric alcohol and/or partial ester compound of a polyhydric alcohol may be used alone or in combinations of two or more types.

(2) Soft Polymer

The soft polymer is not particularly limited so long as it can impart mechanical strength and flexibility when blended in a thermoplastic resin containing an alicyclic structure, but specifically means a polymer having a glass transition temperature of not more than 40° C., preferably not more than 30° C., for example, is a soft polymer having an amorphous (noncrystalline) domain having a nature which easily deforms by a constant strain at room temperature and returns to the original form upon removal of the strain, that is, having rubber-like elasticity. Even a polymer having several Tgs or a polymer having both a TG and a melting point (Tm) are included in the soft polymers if the lowest Tg is not more than 40° C., preferably not more than 30° C.

As such a soft polymer, (a) an olefin-based soft polymer comprised mainly of ethylene, propylene, or another α-olefin, (b) an isobutylene-based soft polymer comprised mainly of isobutylene, (c) a diene-based soft polymer comprised mainly of butadiene, isoprene, or other conjugated diene, (d) a cyclic olefin-based ring-opening polymer comprised mainly of norbornene, cyclopentene, or another cyclic olefin, (e) a soft polymer having a silicon-oxygen bond as a skeleton (organic polysiloxane), (f) a soft polymer comprised mainly of an α,β-unsaturated acid and its derivatives, (g) a soft polymer comprised mainly of an unsaturated alcohol and amine or their acyl derivatives or acetal, (h) a polymer of an epoxy compound, (i) another soft polymer, etc. may be mentioned.

As specific examples of these soft polymers, for example, as (a), liquid polyethylene, atactic polypropylene, 1-butene, 4-methyl-1-butene, 1-hexene, 1-octene, and 1-decene, and other homo polymers; ethylene-α-olefin copolymers, propylene-α-olefin copolymers, ethylene-propylene-diene copolymers (EPDM), ethylene-cyclic olefin copolymers, ethylene-propylene-styrene copolymers, and other copolymers may be mentioned;

as (b), polyisobutylene, isobutylene-isoprene rubber, isobutylene-styrene copolymers, etc. may be mentioned;

as (c), polybutadiene, polyisoprene, and other conjugated diene homo polymers; butadiene-styrene random copolymers, isoprene-styrene random copolymers, acrylonitrile-butadiene copolymers, hydrogenates of acrylonitrile-butadiene copolymers, acrylonitrile-butadiene-styrene copolymers, and other random copolymers of conjugated dienes; butadiene-styrene block copolymers, styrene-butadiene-styrene block copolymers, isoprene-styrene block copolymers, styrene-isoprene-styrene block copolymers, and other block copolymers of conjugated dienes and aromatic vinyl-based hydrocarbons, and hydrogenates of these block copolymers may be mentioned;

as (d), norbornene, vinylnorbornene, ethylidenenorbornene, and other norbornene-based monomers or cyclobutene, cyclopentene, cyclooctene, and other metathesis ring-opening polymers of monocyclic olefins and their hydrogenates may be mentioned;

as (e), dimethylpolysiloxane, diphenylpolysiloxane, dihydroxypolysiloxane, and other silicone rubbers etc. may be mentioned;

as (f), polybutylacrylate, polybutylmethacrylate, polyhydroxyethylmethacrylate, polyacrylamide, polyacrylonitrile, and other acryl monomer homo polymers; and butylacrylate-styrene copolymers and other copolymers of acryl monomers and other monomers may be mentioned;

as (g), polyvinyl alcohol, polyvinyl acetate, polyvinyl stearate, polyvinyl benzoate, polyvinyl maleate, and other (esterified) unsaturated alcohol homo polymers; vinyl acetate-styrene copolymers and other copolymers of (esterified) unsaturated alcohols and other monomers etc. may be mentioned;

as (h), polyethylene oxide, polypropylene oxide, epichlorohydrin rubber, etc. may be mentioned; and as (i), natural rubber, polypeptides, proteins, etc. may be mentioned.

These soft polymers may have cross-linked structures or may have functional groups introduced by modification.

In the present invention, from the viewpoint of preventing cracking due to screwing, among these soft polymers, the soft polymers of (a), (b), and (c) are preferable in that they are particular superior in rubber-like elasticity and are superior in mechanical strength and flexibility. Among these, soft polymers corresponding to (a), (b), and (c) which further have aromatic vinyl-based monomers in the polymer repeating units are more preferable in that they are superior in heat resistance and compatibility. As specific examples of these soft polymers, for example, ethylene-propylene-styrene copolymers, isobutylene-styrene copolymers, and other random copolymers and hydrogenates of these copolymers; butadiene-styrene block copolymers, styrene-butadiene-styrene block copolymers, isoprene-styrene block copolymers, styrene-isoprene-styrene block copolymers, and other block copolymers and hydrogenates of these copolymers; etc. may be mentioned. Among these, in particular, polymers which have no double bonds at all in their main chains or have only small amounts of the same (hydrogenates of the above polymers) are most preferable in view of the heat resistance and weather resistance.

These soft polymers may be used alone or in combinations of two or more types.

(3) Fillers

The filler is not particularly limited so long as it is one in general use in the polymer industry, but one which is used as a reinforcing agent, strengthener, etc. is preferable. As specific examples of such fillers, organic fillers or inorganic fillers may be mentioned.

The inorganic filler is not particularly limited, but for example light calcium carbonate, heavy or pulverized calcium, special calcium-based fillers, and other calcium carbonate powder; nepheline syenite fine powder, sintered clay, silane-modified clay, and other clays (aluminum silicate powder); talc; molten silica, crystalline silica, and other silica (silicon dioxide) powder; diatomaceous earth, silica sand, and other silicic acid containing compounds; pumice powder, pumice balloons, slate powder, mica powder, and other pulverized natural minerals; asbestos; alumina, alumina colloid (alumina sol), alumina white, aluminum sulfate, and other alumina-containing compounds; barium sulfate, lithopone, calcium sulfate, molybdenum disulfide, graphite, and other minerals; glass fiber, glass beads, glass flakes, foamed glass beads, and other glass-based compounds; fly ash globes, volcanic glass hollow bodies, synthetic inorganic hollow bodies, monocrystalline potassium titanate, carbon fiber, carbon hollow bodies, smokeless carbon powder, artificial kryolite, titanium oxide, magnesium oxide, basic magnesium carbonate, dowamite, potassium titanate, calcium sulfite, mica, asbestos, calcium silicate, montmorillonite, bentonite, graphite, aluminum powder, molybdenum sulfate, boron fiber, silicon carbide fiber, ceramic, etc. may be mentioned.

Among these inorganic fillers, fibrous fillers superior in reinforcement of high elasticity and high strength are preferable. Specifically, glass fiber, carbon fiber, boron fiber, silicon carbide fiber, monocrystalline potassium titanate, etc. may be mentioned.

The average particle size of the inorganic filler, in terms of the average particle size measured from the diameter of 3000 to 5000 particles by an electron microscope, is in the range of 0.05 to 50 $\mu$m, preferably 0.1 to 30 $\mu$m. Further, rather than needle particles, spherical particles with a ratio of the long side and short side of not more than 2 to 1 are preferred. When the size of the filler is in this range, a good balance between the transparency and the effect of prevention of white turbidity under a high temperature, high humidity environment is obtained.

As the organic filler, for example, polyethylene fiber, polypropylene fiber, polyester fiber, polyamide fiber, fluorine fiber, ebonite powder, heat curing resin hollow bodies, heat curing resin filler, epoxy resin filler, silicone-based filler, saran hollow bodies, wood powder, cork powder, polyvinyl alcohol fiber, cellulose powder, wood pulp, etc. may be mentioned.

Among these, in particular, from the viewpoint of superior heat resistance, mechanical characteristics, etc., epoxy resin filler, silicone-based filler, heat curing resin hollow bodies, fluorine fiber, etc. are preferable. A heat curing resin filler with a small coefficient of linear expansion is more preferable.

These fillers may be treated on their surface with epoxy silane, amino silane, titanate, aluminum chelate, zircoaluminate, and other silane coupling agents or silicone oil etc. for the purpose of improving the wettability and adhesion between the thermoplastic resin containing an alicyclic structure and filler.

These fillers may be used alone or in combinations of two or more types.

(4) Compounds Incompatible With Thermoplastic Resin Containing Alicyclic Structure The compound incompatible with the thermoplastic resin containing an alicyclic structure is not particularly limited so long as it is an incompatible component which does not completely dissolve in the thermoplastic resin containing an alicyclic structure. The "incompatible component" here means one by which at least one domain in a range of 2.0 mm×2.0 mm can be confirmed when viewing a composition, obtained by melting and mixing 5 parts of the compound in 100 parts by weight of a thermoplastic resin containing an alicyclic structure, enlarged 50,000× by an optical microscope.

As the incompatible compounds, for example, polyphenylene sulfide, polyphenylene ether, polyether sulfone polysulfone, and other ether-based polymers; liquid crystal plastic, aromatic polyester, polyarylate, polyethylene terephthalate, polybutylene terephthalate, polycarbonate, polyether ketone, and other polyester-based polymers; polyethylene, polypropylene, poly-4-methyl-pentene-1, cyclic olefin-based polymers, and other polyolefin-based polymers; polymethyl methacrylate, cyclohexyl methacrylate and methyl methacrylate copolymer, polyacrylonitrile styrene (AS resin), and other general use transparent plastics; and other alicyclic acryl resins; MS resins, etc. may be mentioned.

These compounds incompatible with the thermoplastic resin containing an alicyclic structure may be used alone or in combinations of two or more types.

(5) Crystalline Polymer

As the crystalline polymer, one having a melting point higher than the glass transition temperature Tg of the thermoplastic resin containing an alicyclic structure, preferably at least 20° C. higher, more preferably at least 40° C. higher, is preferable. By blending in a crystalline polymer having a high melting point, the heat deformation temperature of the reflector obtained becomes higher and the heat resistance is improved.

As the crystalline polymer able to be used in the present invention, polyethylene, polyacrylonitrile, polyamide, polypropylene, cellulose, acetal resin, chlorinated polyether, ethylene-vinyl acetate copolymer, fluororesins, ionomers, methyl pentene polymer, polysulfone, polybutylene terephthalate (PBT), polyethylene terephthalate (PET), polyphenylene sulfide (PPS), syndiotatic polystyrene, liquid crystal polymer (aromatic polycyclic condensation type polymers), etc. may be mentioned, but preferably a crystalline polymer having a melting point of at least 200° C., that is, PBT, PET, PPS, syndiotatic polystyrene, liquid crystal polymer, etc. may be used.

In the present invention, the crystalline polymer includes not only ones where the polymer as a whole is crystallized, but also ones which are partially crystallized. The degree of crystallization is not particularly limited, but is generally in the range of 10 to 90%.

These crystalline polymers may be used alone or in combinations of two or more types.

(6) UV Absorbents

The UV absorbent is not particularly limited so long as it is one in general use in the plastic industry. Specifically, it may be selected from metal complex salt-based, benzophenone-based, salicylic acid-based, benzotriazole-based, and acrylate-based UV absorbents. Among these, it is preferably selected from metal complex salt-based, benzophenone-based, and benzotriazole-based UV absorbents. It is preferable to use a metal complex salt-based UV absorbent alone or a metal salt-based UV absorbent in combination with another UV absorbent.

As specific examples of such UV absorbents, for example, 2-(2-hydroxy-5-methylphenyl)$_2$H-benzotriazole, 2-(3-t-butyl-2-hydroxy-5-methylphenyl)-5-chloro-2H-benzotriazole, 2-(3,5-di-t-butyl-2-hydroxyphenyl)-5-chloro-2H-benzotriazole, 2-(3,5-di-t-butyl-2-hydroxyphenyl)-2H-benzotriazole, 5-chloro-2-(3,5-di-t-butyl-2-hydroxyphenyl)-2H-benzotriazole, 2-(3,5-di-t-amyl-2-hydroxyphenyl)-2H-benzotriazole, and other benzotriazole-based UV absorbents;

4-t-butylphenyl-2-hydroxybenzoate, phenyl-2-hydroxybenzoate, 2,4-di-t-butylphenyl-3,5-di-t-butyl-4-hydroxybenzoate, hexadecyl-3,5-di-t-butyl-4-hydroxybenzoate, 2-(2H-benzotriazol-2-yl)-4-methyl-6-(3,4,5,6-tetrahydrophthalimidylmethyl)phenol, 2-(2-hydroxy-5-t-octylphenyl)-2H-benzotriazole, 2-(2-hydroxy-4-octylphenyl)-2H-benzotriazole, and other benzoate-based UV absorbents;

2,4-dihydroxybenzophenone, 2-hydroxy-4-methoxybenzophenone, 2-hydroxy-4- methoxybenzophenon-5-sulfonate trihydrate, 2-hydroxy-4-octyloxy-benzophenone, 4-dodecyloxy-2-hydroxybenzophenone, 4-benzyloxy-2-hydroxybenzophenone, 2,2',4,4'-tetrahydroxylbenzophenone, 2,2'-dihydroxy-4,4'-dimethoxybenzophenone, and other benzophenone-based UV absorbents; ethyl-2-cyano-3,3-diphenylacrylate, 2',-ethylhexyl-2-cyano-3,3-diphenylacrylate, and other acrylate-based UV absorbents; [2,2'-thiobis(4-t-octylphenolate)]-2-ethylhexylamine nickel and other metal complex-based UV absorbents etc. may be mentioned.

These UV absorbents may be used-alone or in combinations of two or more types.

(7) Light Stabilizers

The light stabilizer is not particularly limited so long as it is one in general use in the plastic industry, but a hindered amine-based light stabilizer is particularly preferably used.

Specifically, for example, 2,2,6,6-tetramethyl-4-piperidyl benzoate, bis(2,2,6,6-tetramethyl-4-piperidyl) sebacate, bis(1,2,2,6,6-pentamethyl-4-piperidyl)-2-(3,5-di-t-butyl-4-hydroxybenzyl)-2-n-butylmaronate, 4-(3-(3,5-di-t-butyl-4-hydroxyphenyl)propionyloxy)-1-(2-(3-(3,5-di-t-butyl-4-hydroxyphenyl)propionyloxy)ethyl)-2,2,6,6-tetramethylpiperidine, and other hindered amine-based light stabilizers may be mentioned.

These hindered amine-based light stabilizers may be used alone or in combinations of two or more types.

(8) Other Compounding Agents

The other compounding agents are not particularly limited so long as they are ones in general use in the plastic industry, but for example phenol-based, phosphate-based, thioether-based, and other antioxidants; aliphatic alcohols, alicyclic esters, aromatic esters, triglycerides, fluorine-based surfactants, higher fatty acid metal salts, and other mold release agents; other lubricants, anticlouding agents, plasticizers, pigments, near infrared absorbents, antistatic agents, etc. may be mentioned. These other compounding agents may each be used alone or in combinations of two or more types. The amount of the compounding agent used is suitably selected in a range not detrimental to the scope of the present invention.

(9) Preferable Compounding Agents

In particular, in a reflector, from the viewpoint of improving the durability under a high temperature and high humidity, it is preferable to blend in at least one type of compounding agent selected from (1) a partial ether compound of a polyhydric alcohol and/or a partial ester compound of a polyhydric alcohol, (2) a soft polymer, (3) a filler, and (4) a compound incompatible with a thermoplastic resin containing an alicyclic structure. Further, when transparency is required in the obtained molded article, the difference in refractive index between the thermoplastic resin containing an alicyclic structure and the at least one type of compounding agent selected from the group comprising (1) to (4) is preferably not more than 0.2, more preferably not more than 0.1, particularly preferably not more than 0.05. If one with a large difference of refractive index is mixed in, if a large amount is added, the molded article tends to become opaque. Further, by blending in at least one of the (1) partial ether compound of a polyhydric alcohol and/or partial ester compound of a polyhydric alcohol and (2) a soft polymer among the compounding agents of (1) to (4), the result is superior in transparency, heat resistance, and moldability, so this is more preferred. In such a case, the amount of the at least one type of compounding agent selected from the group comprised of (1) to (4) is normally 0.01 to 5 parts by weight, preferably 0.05 to 3 parts by weight with respect to 100 parts by weight of the thermoplastic resin containing an alicyclic structure. The amount blended is suitably determined by the combination of the thermoplastic resin containing an alicyclic structure and the compounding agents (1) to (4), but in general if the amount blended is too large, the glass transition temperature of the composition drops dramatically and the result becomes unsuitable for use as a reflector for a lighting equipment. Further, if the amount blended is too small, the durability at a high temperature and high humidity tends to fall. If the amount blended is in the above range, the heat resistance of the molded article and the durability in a high temperature, high humidity environment are well balanced. When blending in (2) a soft polymer or (4) a compound incompatible with the thermoplastic resin containing an alicyclic structure as the compounding agent, in most cases microdomains are formed and dispersed. When forming microdomains, the average particle size of the domains observed under an electron microscope is 0.001 to 0.5 $\mu$m, preferably 0.005 to 0.3 $\mu$m, particularly preferably 0.01 to 0.2 $\mu$m. When the particle size is in this range, the transparency of the molded article and the durability under a high temperature, high humidity environment are well balanced.

Further, in particular, from the viewpoint of giving resistance to cracks etc. and facilitating the screwing in of the reflector, it is preferable to blend in a (2) soft polymer. The amount of the soft polymer blended in this case is preferably one by which the ratio by weight between the thermoplastic resin containing an alicyclic structure and the soft polymer becomes preferably 5:95 to 95:5, more preferably 10:90 to 90:10. In addition, to further improve the strength with respect to cracking when screwing, it is more preferable to blend in a (3) filler along with the (2) soft polymer. The amount of the filler blended in this case is normally 1 to 300 parts by weight, preferably 2 to 200 parts by weight, most preferably 5 to 100 parts by weight with respect to 100 parts by weight of the thermoplastic resin containing an alicyclic structure, at which time the strength of the reflector with respect to cracking due to screwing and the surface smoothness are well balanced.

Further, in particular, from the viewpoint of improving the heat resistance in the reflector, it is preferable to blend in a (5) crystalline polymer. The amount of the crystalline polymer blended in this case is preferably one by which the ratio by weight of the thermoplastic resin containing an alicyclic structure and crystalline polymer becomes preferably 95:5 to 5:95, more preferably 10:90 to 90:10.

Further, from the viewpoint of improving the effect of prevention of white turbidity under a high temperature, high humidity environment without causing a reduction in the transparency, low hygroscopicity, heat resistance, mechanical strength, and other characteristics in the lens (outer lens and inner lens), it is preferable to blend in at least one type of compounding agent selected from the group comprised of (1) a partial ether compound of a polyhydric alcohol and/or a partial ester compound of a polyhydric alcohol, (2) a soft polymer, (3) a filler, and (4) a compound incompatible with the thermoplastic resin containing an alicyclic structure. By blending in the white turbidity preventing agent, in particular, at least one of the (1) partial ether compound of a polyhydric alcohol and/or partial ester compound of a polyhydric alcohol and (2) a soft polymer, the transparency, heat resistance, moldability, and effect of prevention of white turbidity under a high temperature, high humidity environment can be well balanced. The refractive index of the white turbidity preventing agent used in the present invention may be suitably selected in accordance with the object of use, but one with a difference with the refractive index of the thermoplastic resin containing an alicyclic structure of normally not more than 0.5, preferably not more than 0.2, more preferably not more than 0.1 is suitable in that the transparency and the effect of preventing white turbidity under a high temperature, high humidity environment are well balanced. The amount of the white turbidity preventing agent blended may be suitably selected from the range in which the effect of prevention of white turbidity can be exhibited, but is normally 0.01 to 10 parts by weight, preferably 0.05 to 5 parts by weight, more preferably 0.1 to 2 parts by weight with respect to 100 parts by weight of the thermoplastic resin containing an alicyclic structure, at which time the heat resistance, transparency, and effect of prevention of white turbidity under a high temperature, high humidity environment are well balanced.

Further, in the lamp cover (outer lens), since the UV transmittance of the polymer resin containing an alicyclic structure is high, the resistance to deterioration due to the absorption of UV light by the resin is superior. To further improve the resistance to deterioration, it is preferable to include a UV absorbent. The amount of the UV absorbent blended in this case is not particularly limited, but is normally 0.0001 to 5.0 part by weight, preferably 0.001 to 1.0 part by weight, more preferably 0.01 to 0.5 part by weight with respect to 100 parts by weight of the thermoplastic resin containing an alicyclic structure, at which time the UV resistance, transparency, and heat resistance of the thermoplastic resin containing the alicyclic structure are well balanced.

Further, in the lamp cover (outer lens) to improve the UV resistance characteristic more, it is also possible to include a light stabilizer in addition to the UV absorbent. The light stabilizer is not particularly limited so long as it is one in general use in the plastic industry, but a hindered amine type light stabilizer is particularly preferably used. The amount of the light stabilizer blended in this case is normally 0.0001 to 5.0 parts by weight, preferably 0.001 to 1.0 part by weight, more preferably 0.01 to 0.5 part by weight with respect to 100 parts by weight of the thermoplastic resin containing an alicyclic structure.

Process of Production of Reflector

The substrate comprising the reflector of the present invention may be obtained by molding the thermoplastic resin containing an alicyclic structure alone or a resin composition comprised of the thermoplastic resin containing an alicyclic structure to which are added the above compounding agents according to need.

The method of blending is not particularly limited so long as it is a method which sufficiently disperses these compounding agents in the thermoplastic resin containing an alicyclic structure. For example, there are the method of kneading the resin in a molten state by a mixer, single-screw mixer, twin-screw mixer, roll, Brabender, extruder, etc., the method of dissolving the resin in a suitable solvent to disperse it, then coagulate it, the method of casting, or the method of removing the solvent by direct drying.

When kneading, sufficient shear is given at a resin temperature of Tg+20° C. to Tg+150° C. where the glass transition temperature of the resin is Tg. If the resin temperature is too low, the viscosity becomes higher and the kneading becomes difficult, while if too high, the resin and compounding agents deteriorate and the two cannot be kneaded well due to the difference in viscosities or melting points.

When using a twin-screw mixer, after kneading, usually the resin is extruded in a molten state into rods and the rods are cut into suitable lengths by a strand cutter to form pellets.

The method of molding may be according to a conventional known method. For example, injection molding, press molding, extrusion blowing, injection blow molding, multilayer blowing, connection blowing, double-wall blowing, draw blowing, vacuum forming, rotational molding, and other molding methods may be mentioned. Among these, the injection molding method and press molding method are preferable from the viewpoint of the molding accuracy. The melting temperature of the resin at the time of molding differs according to the type of the thermoplastic resin containing an alicyclic structure, but normally is 100 to 400° C., preferably 200 to 350° C.

When forming on the substrate a reflecting layer comprised of a metal film using aluminum, nickel, gold, silver, platinum, copper, rhodium, or other metal with a high reflectance (preferably aluminum or silver), a reflectance of at least 70% is obtained. The method of forming the reflecting layer is not particularly limited and may be according to known methods. For example, an ordinary vapor deposition method, that is, vacuum deposition, sputtering, ion plating, etc. may be mentioned.

The conditions at the time of forming the reflecting layer comprised of a metal film are not particularly limited, but for example the following conditions are preferable when vacuum depositing aluminum to form the reflecting layer. That is, it is possible to vapor deposit an aluminum film fine in detail and superior in bonding when the vacuum is 0.1 to 1000 Pa, preferably 1 to 100 Pa. The film may also be formed while heating the molded article. If forming the film in a range of the surface-temperature of the molded article of ordinary temperature to 100° C., the bonding power becomes higher.

To improve the adhesion of the reflector and reflecting layer comprised of the above metal film, it is also possible to modify and/or prime the surface of the reflector. As an example of the surface modification, corona discharge, plasma treatment, electron beam irradiation, UV irradiation, and other energy irradiation or chemical treatment bringing the surface into contact with a solution of potassium bichromate or another aqueous solution of an oxidant may be mentioned. Note that in the present invention, since the reflector is comprised of the thermoplastic resin containing an alicyclic structure, it is possible to form the metal film well even without such surface treatment.

The reflector and the reflecting layer may be provided with a protective film on the surface of the reflecting layer comprised of a metal film in accordance with need to prevent scratches and dirt. As the protective film, a silicon oxide film of preferably 1 to 300 nm, particularly preferably 10 to 100 nm etc. may be illustrated.

The method of forming the protective film is not particularly limited. For example, the method of coating a UV curing type resin or heat curing type resin on the surface of the molded article by spin coating, spray coating, dipping, flow coating, and other methods, then curing it may be mentioned.

Process of Production of Lens

The lens of the present invention may be obtained by molding a resin composition comprising the thermoplastic resin containing an alicyclic structure into which a white turbidity preventing agent and other compounding agents are added according to need.

The method of molding the lens may be according to an ordinary method. For example, injection molding, press molding, extrusion blowing, injection blow molding, multilayer blowing, connection blowing, double-wall blowing, draw blowing, vacuum forming, rotational molding, and other molding methods may be mentioned. Among these, the injection molding method and press molding method are suitable in that they enable the variations in plane of the optical characteristics to be reduced and the moldability of thin, fine surface structures is superior. As the press molding method, for example, the method of heating and pressing a sheet or film prepared by a melt extrusion method in a mold of the shape of the lens desired to be obtained may be mentioned. The molding conditions differ according to the molding method and the type of the thermoplastic resin containing an alicyclic structure used, but the resin temperature is normally 100 to 400° C., preferably 200 to 350° C., the pressure is normally 1 to 1000 kgf/cm$^2$, preferably 5 to 500 kgf/cm$^2$, and the heating time is normally several seconds to tens of minutes.

Process of Production of Lamp Cover

The lamp cover of the present invention may be obtained by molding a molding material comprised of the thermoplastic resin containing an alicyclic structure into which preferably a UV absorbent is added.

The method of blending the compounding agents is similar to the case of the above reflector. The lamp cover of the present invention is obtained by molding the above molding material. The method of molding, in the same way as with the above reflector, may be according to a conventional, known molding method.

Process of Production of Lamp Cap

The lamp cap of the present invention may be obtained by molding a molding material comprised of the thermoplastic resin containing an alicyclic structure into which a compounding agent is added according to need.

The method of blending the compounding agents is similar to the case of the above reflector. The lamp cap of the present invention is obtained by molding the above molding material. The method of molding, in the same way as with the above reflector, may be according to a conventional, known molding method, it is possible to suitably color the lamp cap in accordance with the application of the lighting equipment or safety standards. The lamp cap may be colored by mixing a coloring agent into the thermoplastic resin containing an alicyclic structure at the time of molding or separately forming a colored film after molding the lamp cap.

As the coloring agent, it is possible to use either a dye or a pigment.

The dye is not particularly limited so long as it uniformly disperses and dissolves in a polymer resin containing an alicyclic structure explained later, but wide use is made of an oil-soluble dye superior in compatibility with a thermoplastic resin containing an alicyclic structure explained later (various C.I solvent dyes). As the oil soluble dues, for example, mention may be made of the various types of C.I. solvent dyes listed in the Color Index, vol. 3, published by the Society of Dyes and Colourists.

As the pigment, for example, Pigment Red 38 and other diarylide-based pigments; Pigment Red 48:2, Pigment Red 53, Pigment Red 57:1, and other azo lake-based pigments; Pigment Red 144, Pigment Red 166, Pigment Red 220, Pigment Red 221, Pigment Red 248, and other condensation azo-based pigments; Pigment Red 171, Pigment Red 175, Pigment Red 176, Pigment Red 185, Pigment Red 208, and other benzimidazolone-based pigments; Pigment Red 122 and other quinacridone-based pigments; Pigment Red 149, Pigment Red 178, Pigment Red 179, and other perillene-based pigments; and Pigment Red 177 and other anthraquinone-based pigments may be mentioned.

These dyes and pigments may be used alone or mixed in combinations of two or more types. The percentages are suitably selected in a range not detracting from the objects of the present invention. The amounts blended are suitably selected in a range not detracting from the objects of the present invention, but the amount is normally 0.001 to 5 parts by weight, preferably 0.01 to 1 part by weight, with respect to 100 parts by weight of the later mentioned polymer component.

A dispersant may also be used so as to enable the coloring agent to be uniformly dispersed. As the dispersant, calcium stearate, sodium stearate, and other stearates; polyoxyethylene lauryl ether, polyoxyethylene stearyl ether, and other polyoxyethylene alkyl ethers; sodium alkylnaphthalenesulfonate and other alkylnaphthalenesulfonates; etc. may be mentioned. These dispersants may be used alone or in combinations of two or more types. The amount blended is normally 1 to 1,000 parts by weight, preferably 10 to 500 parts by weight, more preferably 20 to 200 parts by weight, particularly preferably 30 to 150 parts by weight. When the amount of the dispersant blended is in this range, the transmittance is superior.

On the other hand, the colored film in the case when not mixing the above coloring agent at the time of molding and forming a colored film separately after molding is not particularly limited and may be suitably colored in accordance with the application of the lighting equipment. For example, it is possible to prepare a colored film coating comprised of an alcohol-based solvent, a ketone-based solvent, an alcohol/ketone mixed solvent, an ether-based solvent, or other solvent into which is dissolved or dispersed an acryl-based resin, halogenated polyolefin-based resin, maleated polyolefin-based resin, or other binder resin and the above dye and/or pigment and, as desired, the above dispersant and to form a colored film on the lamp cap by this by a known coating method such as a spray method, dipping method, etc.

The thickness of the colored film is not particularly limited, but is preferably 0.1 to 500 $\mu$m, more preferably 0.5 to 300 $\mu$m, most preferably 1 to 200 $\mu$m. The thickness was made preferably in the range of 0.1 to 500 $\mu$m so as to suitably color the light emitted from the light source and not to lower the transparency.

To improve the adhesion of the lamp cap and colored film, it is also possible to modify and/or prime the surface of the lamp cap. As an example of the surface modification, corona discharge, plasma treatment, electron beam irradiation, UV irradiation, and other energy irradiation or chemical treatment bringing the surface into contact with a solution of potassium bichromate or another aqueous solution of an oxidant may be mentioned.

The lamp cap and the colored film may be provided with a protective film in accordance with need to prevent scratches and dirt. The method of formation of the protective film is not particularly limited. For example, the spray method, dipping method, and other known methods may be mentioned.

Process of Production of Light Guide

The light guide of the present invention may be obtained by molding a molding material comprised of a thermoplastic resin containing an alicyclic structure in which is added compounding agents in accordance with need.

The method of blending the compounding agents is similar to the case of the above reflector. The light guide of the present invention is obtained by molding the above molding material. The molding method may be in accordance with the conventional known molding methods in the same way as the above reflector.

BEST MODE FOR WORKING THE INVENTION

Embodiments of the present invention will be explained below based on the drawings, but these embodiments are given for facilitating understanding of the present invention and are not given to limit the present invention.

Below, an explanation will be given with reference to the example of a vehicular lighting equipment as an example of this kind of lighting equipment.

First Embodiment

Figure 1:
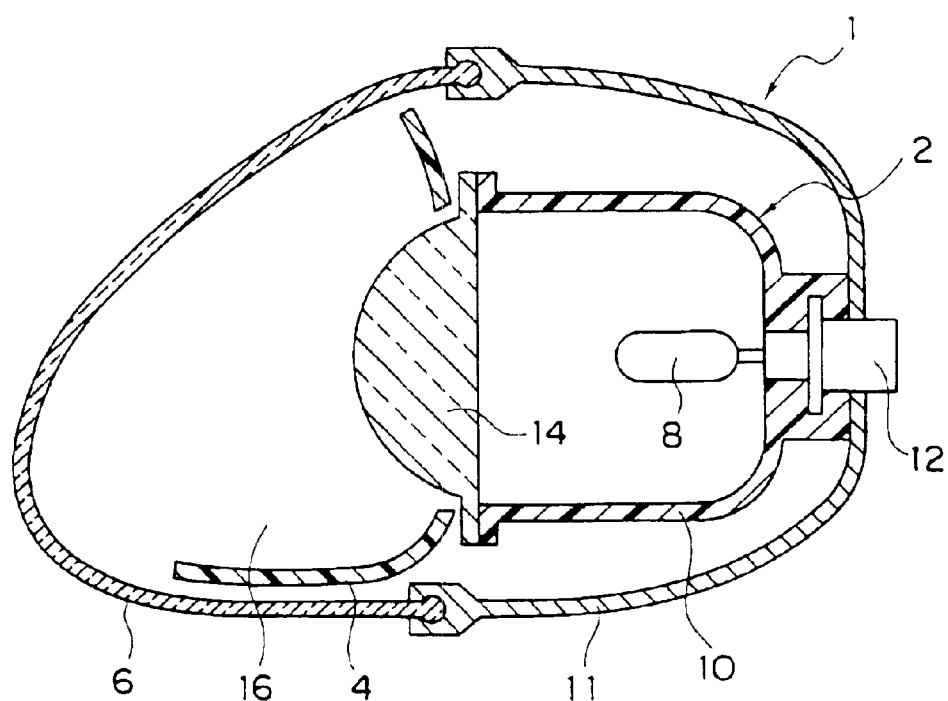
FIG. 1 is a sectional view of principal parts of a vehicular lighting equipment according to an embodiment of the present invention.

The vehicle lighting equipment 1 in the present embodiment, as shown in FIG. 1, is a headlight for a passenger car and is provided with a lighting equipment body 11, a lamp unit 2, an extension reflector 4, and a lamp cover (outer lens) 6. Note that FIG. 1 shows the headlight of the left side of the vehicle. The one of the right side of the vehicle is symmetrical in shape with this about the center line in the longitudinal direction of the vehicle.

The lighting equipment body 11 is molded from a resin not allowing passage of light. The lamp unit 2 is provided inside this lighting equipment body 11. The lamp unit 2 has for example an HID (high intensity discharge) lamp 8 as a light source. The HID lamp 8 can emit high intensity light with a low power consumption. The HID lamp 8 is for example supported by a connector socket 12 at the bottom of an oval shaped main reflector 10. At the front part of the main reflector 10, a condensing lens (lens in the present invention) functioning as the inner lens 14 is held by a means such as bonding or screwing via an approximately cylindrical sleeve (lens holder), not shown, attached in accordance with need.

The lamp unit 2 can give a required light distribution characteristic by the lamp unit alone by the reflection characteristics of the main reflector 10 and the condensing characteristics of the condensing lens functioning as the inner lens 14. The extension reflector 4 provided at the front of the lamp unit 2 prevents the inside surface of the lighting equipment body, positioned at the rear when viewing the lighting equipment 1 from the front outside, from being seen through and improves the appearance by making the light chamber 16 as a whole appear to have a single mirror finish so as to thereby enhance the product value. Note that the vehicle lighting equipment 1 of the present embodiment has only one lamp unit, but the invention is not limited to this. For example, it is also possible to provide a first lamp unit comprising a high beam lamp of the headlight and a second lamp unit comprising the low beam lamp at the outside of the vehicle.

Figure 2:
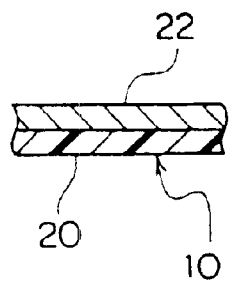
FIG. 2 is a sectional view of principal parts of a reflector shown in FIG. 1.

In the present embodiment, as shown in FIG. 2, the substrates 20 comprising the main reflector 10 and the extension reflector 4 or the not shown sleeve (lens holder) are each comprised of a thermoplastic resin containing an alicyclic structure such as a norbornene-based polymer, monocyclic cyclic olefin-based polymer, cyclic conjugated diene-based polymer, vinyl alicyclic hydrocarbon polymer, and their hydrogenates. The surface of the substrate 20 (surface on lamp 8 side) has a metal film 22 comprised of aluminum vapor deposited on it to form a reflection surface. This gives a reflectance of at least 70%. Note that in accordance with need the surface of the metal film may have a protective film formed on it.

Further, the substrates 20 comprising the main reflector 10 and the extension reflector 4 may be comprised of a resin composition containing a thermoplastic resin containing an alicyclic structure and at least one compounding agent selected from the group comprising a partial ether compound of a polyhydric alcohol and/or a partial ester compound of a polyhydric alcohol, a soft polymer, a filler, and a compound incompatible with the thermoplastic resin having an alicyclic structure.

Further, the substrates 20 comprising the main reflector 10 and the extension reflector 4 may be comprised from a resin composition comprised of a thermoplastic resin containing an alicyclic structure to which is blended a soft polymer having a glass transition temperature of not more than 30° C.

Further, the substrates 20 comprising the main reflector 10 and the extension reflector 4 may be comprised from a resin composition comprised of a thermoplastic resin composition containing an alicyclic structure in which is blended a crystalline polymer.

In this way, as the thermoplastic resin containing an alicyclic structure comprising the substrate 20, it is particularly preferable to use one having an amount of repeating units containing polar groups of 50 wt %, preferably 30 wt %, more preferably not more than 10 wt %. Further, as the thermoplastic resin containing an alicyclic structure, it is preferable to use one having a melt flow rate, measured by JIS-K6719 at a temperature of 280° C. and a load of 2.16 kgf, of 4 to 100 g/10 min. Further, as the thermoplastic resin containing an alicyclic structure, it is preferable to use one having repeating units comprised of ring structures other than norbornene rings.

Note that in the first embodiment, the main reflector 10 and the extension reflector 4 are connected by screws, bolts, or other fastening devices, but in the present invention it is also possible to mold all or part of these integrally by the thermoplastic resin containing an alicyclic structure. Further, it is also possible to form the condensing lens serving as the inner lens 14 integrally with the extension reflector 4 or the main reflector 10 by the above thermoplastic resin containing an alicyclic structure. In this case, however, since the condensing lens 14 is required to have transparency, it is necessary to mask the lens portion and vapor deposit a metal film of aluminum etc. on the inner surface of the extension reflector 4 or the main reflector 10 to form the reflection surface. Further, the type of the condensing lens serving as the inner lens 14 is not particularly limited and may be a Fresnel lens as well.

By integrally forming the condensing lens serving as the inner lens 14, the step of assembling a separate part of a condensing lens to the extension reflector 4 or the main reflector 10 becomes unnecessary. In addition, by forming the condensing lens serving as the inner lens 14 by a thermoplastic resin containing an alicyclic structure explained above, the effect of a smaller birefringence and smaller deformation with respect to environmental changes compared with an ordinary plastic lens can be expected. Further, the moldability is good and the surface accuracy is superior.

Further, the specific structure of the vehicular lighting equipment to which the reflector according to the present invention is applied is not limited to the one shown in FIG. 1 and may be modified in various ways. For example, it is possible to attach a member, that is, a shade, for forming a cutoff line of meeting beam at the front surface of the main reflector 8.

Further, the reflector of the present invention may also be used for taillights and another vehicular lighting equipments in addition to headlights and used for other than vehicular applications.

Second Embodiment

The overall configuration of the vehicle lighting equipment in this embodiment is similar to the lighting equipment 1 shown in FIG. 1 according to the first embodiment.

In this embodiment, the inner lens 14 is comprised of a resin composition including a thermoplastic resin containing an alicyclic structure and at least one compounding agent selected from the group comprising a partial ether compound of a polyhydric alcohol and/or a partial ester compound of a polyhydric alcohol, a soft polymer, a filler, and a compound incompatible with the thermoplastic resin having an alicyclic structure.

Further, the shape of the inner lens 14 is not limited to the shape shown in FIG. 1 and may be suitably selected in accordance with the lighting equipment used. For example, when used as the inner lens as in the case of the present embodiment, the lens may be molded as disclosed in Japanese Unexamined Patent Publication (Kokai) No. 5-290606, Japanese Unexamined Patent Publication (Kokai) No. 6-176608, Japanese Unexamined Patent Publication (Kokai) No. 7-254302, Japanese Unexamined Patent Publication (Kokai) No. 8-96609, Japanese Unexamined Patent Publication (Kokai) No. 9-39653, Japanese Unexamined Patent Publication (Kokai) No. 9-45112, Japanese Unexamined Patent Publication (Kokai) No. 9-45113, Japanese Unexamined Patent Publication (Kokai) No. 9-185905, etc. Specifically, it may be a convex lens, fish-eye lens, curved lens, plate lens, etc. In most cases, a plurality of prism patterns or other lens cuts are formed on the surface. As the lens cuts, for example, there are a plurality of prism cut like patterns for converging or diffusing the emitted light, concentric circular refractive or reflective Fresnel cuts, and hologram portions formed with interference fringes at microintervals. The shapes of the prisms include wave shapes, pulse shapes, and combinations of the same. Further, a single lens may be formed with a Fresnel portion and a hologram portion.

Figure 3:
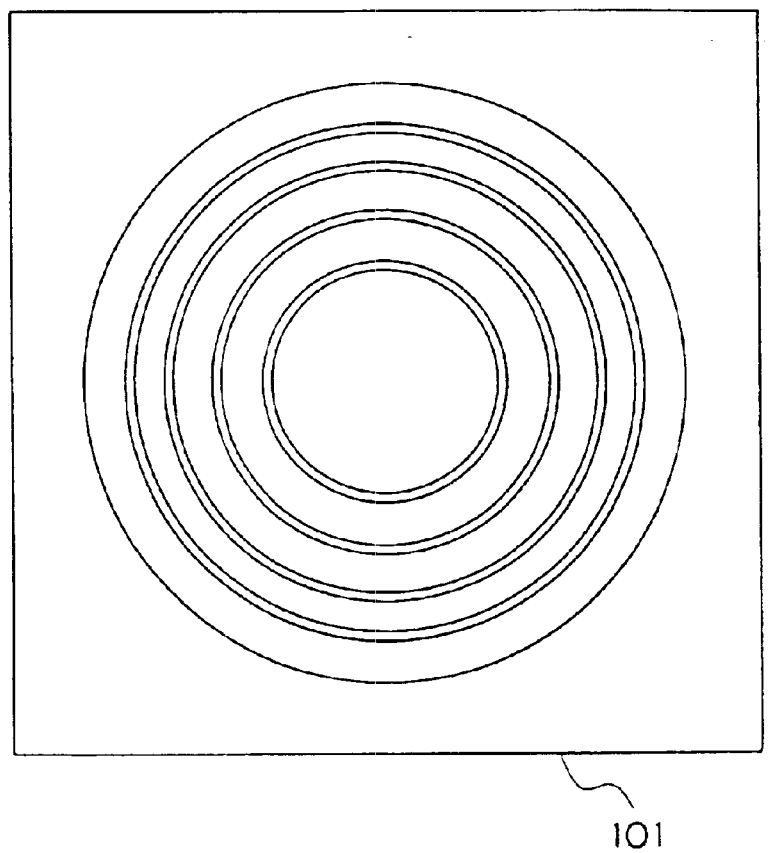
FIG. 3 is a front view of an example of an inner lens built into the vehicular lighting equipment of FIG. 1.
Figure 4:
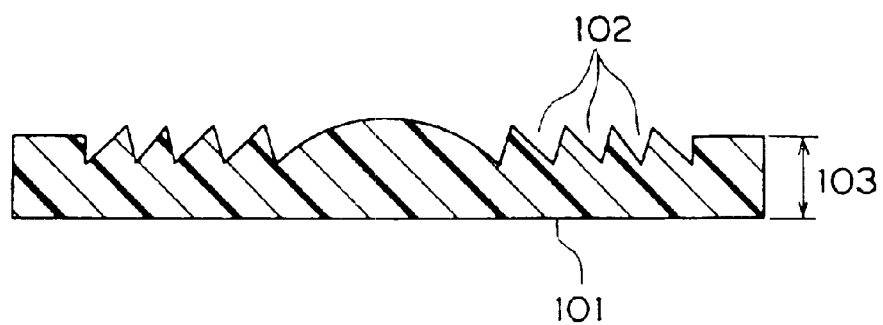
FIG. 4 is a sectional view of an inner lens of FIG. 3.

As an example of a specific shape, for example, there is the Fresnel lens shape shown in FIG. 3. This shape has a diameter of the lens surface (outermost circumference) of about 1 mm to 1000 mm and a number of divisions of the curved surface (the lens surface is divided into several parts, for example, in FIG. 3, the lens surface is divided into five concentric rings) of at least two with no particular upper limit. FIG. 4 is a sectional view of the Fresnel lens of FIG. 3. It shows that a Fresnel cut 102 is made in the direction of thickness 103 of the Fresnel lens 101.

Further, the inner lens 14 in the present embodiment may be provided with a protective layer to prevent the molded article from being scratched or dirtied in accordance with need. The method of forming the protective layer is not particularly limited. For example, the method of coating a UV curing type resin or heat curing type resin on the lens surface by spin coating, spray coating, dipping, flow coating, or other methods, then curing it may be mentioned. To improve the adhesion between the lens and the protective layer, the lens surface may also be modified and/or primed. As an example of the surface modification, corona discharge, plasma treatment, electron beam irradiation, UV irradiation, and other energy irradiation or chemical treatment bringing the surface into contact with a solution of potassium bichromate or another aqueous solution of an oxidant may be mentioned.

Third Embodiment

The overall configuration of the vehicle lighting equipment in this embodiment is similar to the lighting equipment 1 shown in FIG. 1 according to the first embodiment.

In this embodiment, the lamp cover 6 is preferably molded from a thermoplastic resin containing an alicyclic structure containing a UV absorbent and is superior in transparency. The thickness of the lamp cover 6 is not particularly limited, but is preferably 1.0 to 5.0 mm.

Since the lamp cover 6 of the present embodiment is formed by a thermoplastic resin containing an alicyclic structure, it is superior in light transmittance and gives little reduction in luminance when light from the HID lamp 8 passes through the lamp cover 6. Therefore, it is particularly suitable as a lamp cover for a lighting equipment. Further, the thermoplastic resin containing an alicyclic structure comprising the lamp cover 6 easily passes infrared light, so there is little rise in temperature of the lamp cover 6. Further, the thermoplastic resin containing an alicyclic structure comprising the lamp cover 6 itself is superior in heat resistance, so there is also little heat deformation.

In particular, the lamp cover 6 according to the present embodiment features little deterioration of the resin and little reduction in the impact resistance and light transmittance even when using as the light source an HID lamp 8 or other lamp emitting high intensity light by a low power consumption, but emitting light containing a large amount of ultraviolet light.

Further, the thermoplastic resin containing an alicyclic structure is superior in heat resistance and can be molded without breaking down even at a high temperature and is superior in fluidity at the time of melting, so enables the easy molding of a thin, large-sized, and complicated shape lamp cover 6 without causing molding imperfections. The lamp cover according to the present embodiment is preferably applied as a part for a lighting equipment which is complicated, large in size, and desirably light in weight.

Note that the specific structure of the vehicular lighting equipment to which the lamp cover according to the present embodiment is applied is not limited to that shown in FIG. 1 and may be modified in various ways. Further, the lamp cover of the present invention may be used for a taillight or other vehicular lighting equipment in addition to a headlight and may also be used for applications other than vehicles. Further, the lamp cover may be comprised from a resin composition containing a thermoplastic resin containing an alicyclic structure and at least one compounding agent selected from the group comprising a partial ether compound of a polyhydric alcohol and/or a partial ester compound of a polyhydric alcohol, a soft polymer, a filler, and a compound incompatible with the thermoplastic resin having an alicyclic structure.

Fourth Embodiment

In the present embodiment, the explanation will be given taking as an example the case where the lamp cap according to the present invention is built into a vehicular lighting equipment, in particular, a turn signal light.

Figure 5:
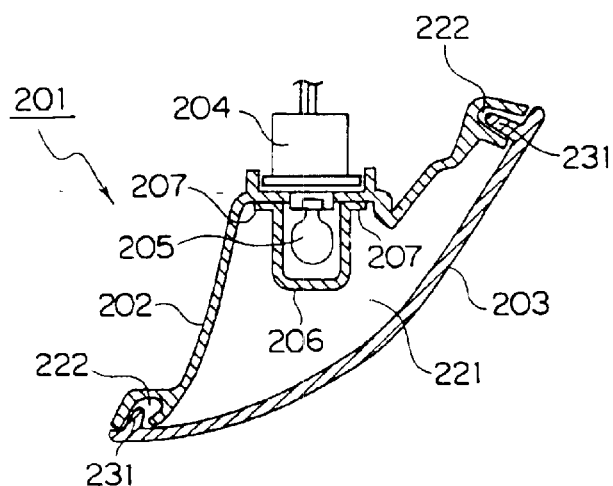
FIG. 5 is a longitudinal sectional view of a vehicular lighting equipment according to an embodiment of the present invention.

The vehicular lighting equipment of the present embodiment, as shown in FIG. 5, is a turn signal light 201 for a passenger car and is attached at the two sides of the front of the vehicle.

This turn signal light 201 is provided with a housing 202 affixed to a body, a lamp cover 203, a lamp socket 204, a lamp 205, a lamp cap 206, and a fastening screw 207. Note that FIG. 5 shows the turn signal light at the left side of the vehicle. The one at the right side of the vehicle is symmetrical in shape with this about the center line in the longitudinal direction of the vehicle.

The housing 202 is formed at its front surface with an opening 221 and is bent in shape along the line of the front side of the body. This housing 202 is molded from a resin not allowing the passage of light and is not particularly limited in material.

The lamp cover 203 is provided so as to close off the front opening 221 of the housing by engagement of the engagement legs 231 formed at the periphery with the engagement groove 222 formed at the rim of the front opening 221 of the housing.

The lamp 205 is held at the housing 202 via the lamp socket 204.

The lamp cap 206 is made of a material coloring and passing light emitted from the lamp 205, covers the lamp 205 in a manner surrounding it, and is fixed to the housing 202 through the fastening screw 207.

Figure 6:
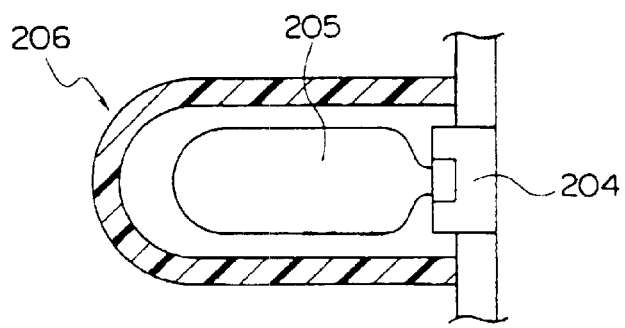
FIG. 6 is a sectional view of principal parts of a lamp cap built into the vehicular lighting equipment of FIG. 5.
Figure 7:
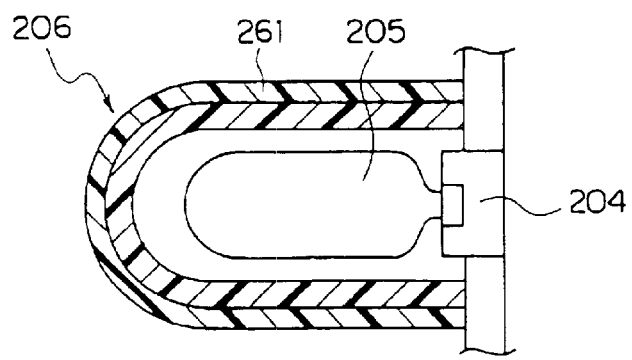
FIG. 7 is a sectional view of principal parts of another embodiment of a lamp cap built into the vehicular lighting equipment of FIG. 5.
Figure 8:
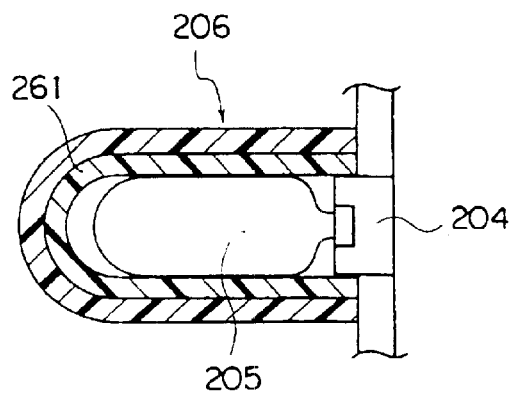
FIG. 8 is a sectional view of principal parts of another embodiment of a lamp cap built into the vehicular lighting equipment of FIG. 5.

The lamp cap 206 may be one formed by molding a resin in which a coloring agent is mixed as shown in FIG. 6. Further, as shown in FIG. 7, a resin may be molded into a cap first and then a colored film 261 may be provided on its outer surface. Further, as shown in FIG. 8, a resin may be molded into a cap first and then a colored film 261 may be provided on its inner surface. Whatever the case, the light of the lamp 205 passing through the lamp cap 206 is given a yellow tinge.

The lamp cap 206 according to the present embodiment is molded from a thermoplastic resin containing an alicyclic structure such as a norbornene-based polymer, a monocyclic cyclic olefin-based polymer, a cyclic conjugated diene-based polymer, a vinyl alicyclic hydrocarbon polymer, and hydrogenates of the same.

The lamp cap 206 of the present embodiment is superior in transparency and heat resistance and is superior in light resistance, that is, will not yellow or otherwise change along with time even if exposed to the heat from the lamp over a long period. Further, the resin will not break down or hydrolyze due to heat at the time of molding, so the resin will not bubble and is superior in transparency as a molded article. Further, it is superior in fluidity when melted, so can easily be molded into a thin article without causing molding imperfections. Therefore, it is preferable for use for a lamp cap 206 of a vehicular lighting equipment for which reduction of the size of the lighting equipment as a whole is desirable.

Note that the lamp cap 206 does not necessarily have to cover the lamp 205 with a clearance as shown in FIGS. 5 to 7 and may also cover it tightly. Further, the lamp cap 206, as shown in FIG. 5, does not have to be fixed to the housing 202 by the fastening screw 207. The lamp 205 may also be fitted to the lamp 205 in a state attached to the lamp socket 204. The point is that it can color the light emitted from the lamp 205.

Further, the lamp cap of the present invention may also be used for lighting equipments other than a turn signal light such as side marker lights, foglights, taillights, stoplights, headlights, high mount stoplights, cornering lights, backup lights, and other vehicular lighting equipments and also as the lamp caps used for flashlights and other general lighting equipments.

Fifth Embodiment

Figure 9:
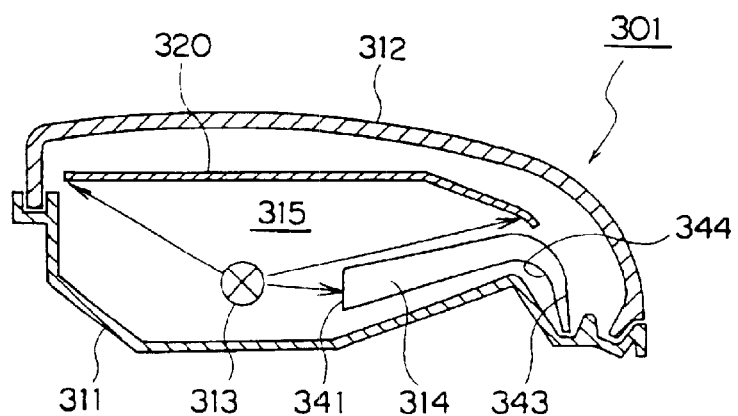
FIG. 9 is a lateral sectional view of a vehicular lighting equipment according to an embodiment of the present invention.

As shown in FIG. 9, the vehicular lighting equipment 301 of the present embodiment is a combination taillight for a passenger car and serves as a taillight, stoplight, and turn signal light. In particular, since the lighting equipment 301 of the present embodiment is a combination light serving also as a turn signal light, it is molded to widely wrap around the corner up to the side surface of the body.

Figure 10:
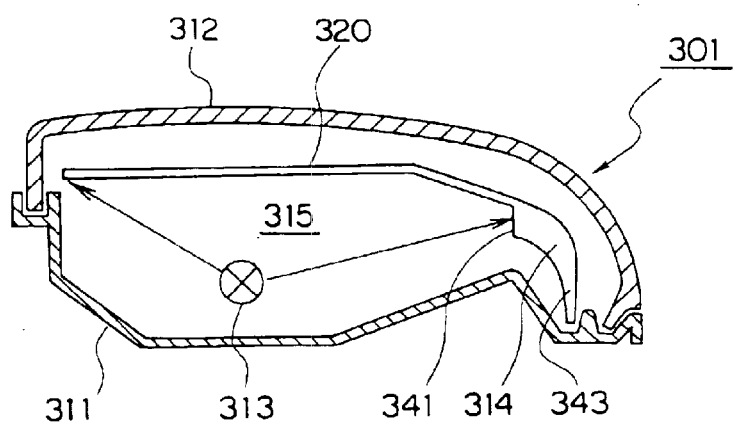
FIG. 10 is a lateral sectional view of a modification of FIG. 9.

The lighting equipment 301, as shown in FIG. 9 and FIG. 10, is comprised of a light chamber 315 formed by a back case 311 and a front case 312 inside of which are provided a lamp 313 serving as a source of blinking light, a light guiding plate (the "light guide" referred to in the present invention) 314, and an inner race 320. Note that FIG. 9 and FIG. 10 show the taillight of the left side of the vehicle. The one at the right side of the vehicle is symmetrical in shape with this about the centerline in the longitudinal direction of the vehicle. Further, in the figures, the turn signal light is not shown.

The light from the lamp 313 comprising the source of blinking light is led by the not shown reflector to the front case 312 side and is emitted to the outside through an inner lens 320 formed by a Fresnel lens etc.

Further, the lighting equipment 301 of the present embodiment has a light guiding plate 314 provided with an incident face 341 at a position not interfering with the inner lens 320 and having one end molded to widely wrap around the body side along the shape of the lighting equipment 301. The light guiding plate 314 has an emission face 343 for guiding the light striking the light guiding plate 314 from the incident face 341 toward the body side and is given prism cuts 344 for making the light passing into the light guiding plate 314 from the incident face 341 be emitted uniformly.

The vehicular lighting equipment 301 shown in FIG. 10 is formed with the inner lens 320 and the light guiding plate 314 shown in FIG. 9 integrally formed, so even with this lighting equipment 301, the light striking the incident face 341 of the light guiding plate 314 from the lamp 313 is guided in the light guiding plate 314 to the emission face 343 where it is emitted toward the body side.

In this vehicular lighting equipment 301, by suitably adjusting the position of the incident face 341 of the light guiding plate 314 etc., the amount of light emitted from the emission face 343 of the light guiding plate 314 can be controlled. Due to this, it is possible to adjust it so that the brightness of the rear part of the body and the brightness of the body side part become equal when viewed from the front case 312.

The light guiding plate 314 according to the present embodiment is molded from a thermoplastic resin containing an alicyclic structure such as a norbornene-based-polymer, a monocyclic cyclic olefin-based polymer, a cyclic conjugated diene-based polymer, a vinyl alicyclic hydrocarbon polymer, and hydrogenates of the same. In particular, in the embodiment shown in FIG. 10, the inner lens 320 is also molded from a thermoplastic resin containing an alicyclic structure.

The light guiding plate 314 of the present embodiment is superior in optical characteristics, i.e., is superior in transparency, has a small birefringence, and has a small hygroscopic deformation under a high temperature, high humidity environment, and further is superior in impact resistance and light resistance. Further, the thermoplastic resin containing an alicyclic structure is superior in heat resistance and therefore can be molded without breaking down even under a high temperature and is superior in fluidity when melted, so can easily be molded into a high precision light guide, even a thin, large sized, and complicated shape light guiding plate, without causing molding imperfections.

Further, in the vehicular lighting equipment 301 shown in FIG. 10, since the light guiding plate 314 and the inner lens 320 are integrally molded, the step of attaching a separate part of an inner lens 320 becomes unnecessary. In addition, by molding the inner lens 320 by the above thermoplastic resin containing an alicyclic structure, the optical characteristics become superior, that is, the birefringence is small and there is small deformation with respect to changes in the environment, and further the moldability is good and the surface accuracy is superior as well.

Next, an explanation will be given of examples describing the embodiments of the present invention in further detail. The present invention, however, is not limited to these examples. Further, in the following examples and reference examples, the "parts" and "%" are based on weight unless otherwise indicated.

The hydrogenation rate of the main chain and the "hydrogenation rate (nuclear hydrogenation rate)" of the aromatic rings were measured by $^1$H-NMR.

The "glass transition temperature (Tg)" is a value measured based on JIS-K7121.

The "molecular weights" of the number average molecular weight (Mn) and weight average molecular weight (Mw) are values measured by the gel permeation chromatography (GPC) method in a siloxane solution (toluene solution when resin will not dissolve) converted to polyisoprene (converted to polystyrene in the case of a toluene solution) unless otherwise indicated.

The "melt flow rate (MFR)" was measured by JIS-K6719 at a temperature of 280° C. and a load of 2.16 kg.

The "specific gravity" is made a value measured based on JIS-K7112-Method A.

Reflector

The various evaluations in the following Examples 1 to 5, 5-1, 5-2 and Reference Example 1 were conducted as follows:

The "accuracy of the test piece surface" was judged as being "good" when the maximum height Rmax was less than 10 μm and as being "poor" when it was more than 10 μm.

The "appearance of the test piece" was judged as "good" when visually observing for sink marks, warping, silver streaking, scorching and coloring and not finding these imperfections and "poor" when finding these imperfections.

The "heat resistance test 1" was conducted by fitting a test piece at one surface of a stainless steel box of a length of 200 mm, a width of 100 mm, and a depth of 400 mm so that the vapor deposited surface faced the inside of the box, placing a 100W incandescent lamp in the center of the box, and keeping the lamp lit for 24 hours, then visually observing the warping of the test piece. A test piece with warping after the test compared with before the test of less than 0.3 mm was judged as "good, while one with warping more than 0.3 mm was judged as "poor".

The "mechanical strength 1" was judged by the impact resistance. The impact resistance was judged as being "good" when allowing a missile-shaped weight (weight of 50 g) with a radius of ¾ inch to naturally drop on to a test piece from a height of 1.5 m and not finding any cracks or fractures and judged as "poor" when finding cracks or fractures.

The "reflectance" was measured in accordance with JIS-5705. A test piece with a reflectance of at least 70% was judged as "good", while one of less than 70% was judged as "poor".

The various evaluations in Examples 6 to 9 were conducted as follows:

The "accuracy of the test piece surface" and "appearance of the test piece" were evaluated in the same way as in the case of the above Examples 1 to 5, 5-1, and 5-2.

The "heat resistance test 2" was conducted by placing a test piece on a horizontal plate, heating and holding this for 48 hours in a 120° C. gear oven, then examining warping of the test piece, changes in appearance, and adhesion of the film. For the "warping", the test piece was judged to be "good" when the warping of the test piece after heating as compared with before heating was less than 0.3 mm and as "poor" when it was more than 0.3 mm. For the "change in appearance", the test piece was judged to be "good" when there was no change in the appearance of the vapor deposited film compared with before the heat resistance test and judged to be "poor" when clouding of the mirror finish, poor reflectance, blisters of the film, discoloration, etc. occurred. The "adhesion of the vapor deposited film" after the heat resistance test was judged by a cross-cut test. The cross-cut test was performed by cutting the vapor deposited film formed on the surface of the molded article 11 times at intervals of 1 mm in the vertical and horizontal directions to make a lattice of 100 1 mm square portions, adhering cellophane tape (made by Sekisui Chemical), peeling it off quickly, and counting the number of squares of vapor deposited film peeled off. A test piece was judged as "good" when there were less than 10 and as "poor" when there were more than 10.

The "high temperature, high humidity test" was conducted by holding a test piece for 500 hours in a high temperature, high humidity tank set to 85° C. and a relative humidity of 90%, then examining for changes in the impact resistance and changes in the reflectance of the test piece before and after. For the "change in the impact resistance", a test piece was judged as "good" when allowing a missile-shaped weight (weight of 100 g) with a radius of ¾ inch to naturally drop on to the test piece from a height of 1 m and not finding any cracks or fractures and judged as "poor" when finding cracks or fractures. The "change in reflectance" was measured by the direct measurement method in accordance with JIS-D5705. A test piece with a value of (reflectance after high temperature, high humidity test/ reflectance before test)×100 (%) of more than 95% was judged as "good", while one of less than 95% was judged as "poor".

The various evaluations in Examples 10 to 14 were conducted as follows:

The "accuracy of the test piece surface" and "appearance of the test piece" were evaluated in the same way as in the case of the above Examples 1 to 5, 5-1, and 5-2.

The "heat resistance test 2", was conducted in the same way as the case of the above Examples 6 to 9.

The "screwing resistance characteristic test" was conducted by screwing a screw of an outer diameter of 4 mm and a length of 28 mm into a test piece B and examining for cracks of the test piece. A test piece with no cracks was judged as "good", while one with cracks was judged as "poor".

The various evaluations in Examples 15 to 18 were conducted as follows:

The "accuracy of the test piece surface" and "appearance of the test piece" were evaluated in the same way as in the case of the above Examples 1 to 5, 5-1, and 5-2.

The "heat resistance test 3" was conducted by placing a test piece on a horizontal plate, heating and holding this for 72 hours in a 130° C. gear oven, then examining warping of the test piece, changes in appearance, and adhesion of the film. The "warping of the test piece", the "change in appearance", and the "adhesion of the film" were evaluated in the same way as the case of the above Examples 6 to 9. A heat test was conducted by supporting the test piece in a cantilever fashion, heating and holding it for 20 minutes in a 150° C. gear oven, the examining for deflection due to the weight of the free end. A test piece with deflection of less than 2 mm was judged as "good", while one with more than 2 mm was judged as "poor".

The various evaluations in Examples 19 to 22 and Reference Examples 2 and 3 were conducted as follows:

The "deflection temperature under load" was made the value measured with a bending strain of 18.5 kgf/cm$^2$ based on JIS-K7207-Method A.

The "adhesion of aluminum vapor deposited film" was evaluated in the same way as the "adhesion of vapor deposited film" in the above Examples 6 to 9.

PRODUCTION EXAMPLE 1

400 parts of dehydrated toluene, 0.68 part of 1-hexene, 0.25 part of isopropyl ether, 0.18 part of isobutyl alcohol, 0.48 part of isobutyl aluminum, and 42 parts of a 0.77% toluene solution of tungsten hexachloride were charged into a polymerization reactor and mixed at room temperature in a nitrogen atmosphere, then 120 parts of 1,4-methano-1,4,4a,9a-tetrahydrofluorene (hereinafter also referred to as MTF), 80 parts of tetracyclo[4.4.0.1$^{2,5}$.1$^{7,10}$]dodeca-3-ene (hereinafter also referred to as tetracyclododecene or TCD), and 25 parts of a 0.77% toluene solution of tungsten hexachloride were continuously added at 45° C. over 2 hours for the polymerization.

300 parts of the polymerization reaction solution was transferred to an autoclave equipped with a stirrer, then 9 parts of an alumina-carried nickel catalyst was added and a reaction caused at 190° C. and 45 kgf/cm$^2$ for 8 hours. The solution was filtered by filter paper with a pore size of 1 μm using diatomaceous earth as a filter aid. The obtained reaction solution was poured into 2000 parts of isopropyl alcohol while stirring to cause the hydrogenated resin to precipitate. This was recovered by filtration. The resin was washed by 500 parts of acetone, then dried for 24 hours in a vacuum drier set to less than 1 torr and 100° C. to obtain the ring-opening polymer hydrogenate. The copolymerization ratio of the norbornenes in the polymer was calculated from the composition of residual norbornenes in the solution after polymerization (by gas chromatography method) and was found to be MTF/TCD=60/40 or substantially equal to the charged composition.

The hydrogenation rate of the main chain of the ring-opening polymer hydrogenate was 100%, while the hydrogenation rate of the six-member ring of the side chain was 99.9%. From high pressure liquid chromatography (converted to polyisoprene) using cyclohexane as the mobile phase, the number average molecular weight (Mn) of the obtained polymer was 25,900, the weight average molecular weight (Mw) was 53,400, and the distribution of molecular weight (Mw/Mn) was 2.06. Further, the glass transition temperature of the ring-opening polymer hydrogenate was 160° C., and the melt flow rate (MFR) was 15 g/10 min. The amount of the repeating units containing polar groups was 0%, and the content of repeating units comprised of ring structures other than norbornene rings was 60%.

PRODUCTION EXAMPLE 2

500 parts of dehydrated cyclohexane, 0.56 part of 1-hexene, 0.11 part of dibutyl ether, and 0.22 part of triisobutyl aluminum were charged into a reactor and mixed at room temperature in a nitrogen atmosphere, then, while holding the temperature at 45° C., 200 parts of 8-methyl-tetracyclo[4.4.0.1$^{2,5}$.1$^{7,10}$]dodeca-3-ene and 30 parts of a 0.70% toluene solution of tungsten hexachloride were continuously added over 2 hours for the polymerization.

The number average molecular weight (Mn) of the obtained polymer was 18,000, the weight average molecular weight (Mw) was 36,200, and the distribution of molecular weight (Mw/Mn) was 2.01.

The obtained polymerization reaction solution was transferred to a pressure resistant hydrogenation reactor, added with 10 parts of a diatomaceous earth-carried nickel catalyst (made by Nissan Gardler, G-96D, nickel carrying rate 58%) and 200 parts of cyclohexane, and allowed to react at 180° C. and a hydrogen pressure of 45 kgf/cm$^2$ for 10 hours. The solution was filtered by a filter provided with a stainless steel mesh using diatomaceous earth as a filter aid to remove the catalyst. The obtained reaction solution was poured into 3000 parts of isopropyl alcohol while stirring to cause the hydrogenate to precipitate. This was recovered by filtration. The resin was washed by 500 parts of acetone, then dried for 24 hours in a vacuum drier set to less than 1 torr and 100° C. to obtain 190 parts of a ring-opening polymer hydrogenate.

The hydrogenation rate of the main chain of the ring-opening polymer hydrogenate was 99.9%, the number average molecular weight (Mn) was 20,400, the weight average molecular weight (Mw) was 41,200, and the distribution of molecular weight (Mw/Mn) was 2.02. The melt flow rate (MFR) at 280° C. was 20 g/10 min, the glass transition temperature was 140° C., and the specific gravity was 1.01. The amount of the repeating units containing polar groups was 0%, and the content of repeating units comprised of ring structures other than norbornene rings was 0%.

PRODUCTION EXAMPLE 3

A cyclohexane solution of tetracyclododecene (TCD) was continuously supplied from the top of a 1 m$^3$ polymerization reactor provided with a stirrer to give a concentration of supplied TCD in the polymerization reactor of 60 kg/m$^3$. As the catalyst, a cyclohexane-based solution of VO(O—C$_2$H$_5$)Cl$_2$ was continuously supplied into the polymerization reactor from the top of the polymerization reactor to give a concentration of vanadium in the polymerization reactor of 0.9 mol/m$^3$ and a cyclohexane solution of ethyl aluminum sesquichloride (Al(C$_2$H$_5$)$_{1.5}$Cl$_{1.5}$) was continuously supplied to give a concentration of aluminum in the polymerization reactor of 7.2 mol/m³. Further, the polymerization system was supplied with ethylene at a rate of 85 m³/hour, nitrogen at a rate of 45 m³/hour, and hydrogen at a rate of 6 m³/hour using a bubbling tube.

A copolymerization reaction was performed while holding the polymerization system, comprised of the polymerization reactor, a jacket provided at its outside, and a heat medium circulating through the jacket, at 10° C. The polymerization solution of the copolymer produced by the above copolymerization reaction was continuously removed from the top of the polymerization reactor so that the polymerization solution in the polymerization reactor was always 1 m³ (that is, so that the average residence time was 0.5 hour). A mixture of cyclohexane/isopropyl alcohol (1:1) was added to the removed polymerization solution to cause the polymerization reaction to stop. Next, the solution was brought into contact with an aqueous solution obtained by adding 5 liters of concentrated hydrochloric acid to 1 m³ of water in a 1:1 ratio with vigorous stirring to cause the catalyst residue to move to the aqueous phase. The contact mixture was allowed to stand, then the aqueous phase was separated and removed. The result was washed with water twice, then the polymerization solution phase was purified and separated.

Next, the purified and separated polymerization solution was brought into contact with 3 volumes of acetone under vigorous stirring to cause the copolymer to precipitate, then the solid (copolymer) was obtained by filtration and fully washed by acetone. Further, to extract the unreacted monomer present in the polymer, the solid was charged into acetone to a concentration of 40 kg/m³, then extracted under conditions of 60° C. for 2 hours. After the extraction, the solid was obtained by filtration and dried under a flow of nitrogen at 130° C. and 350 mmHg for 12 hours.

The thus obtained ethylene-TCD copolymer had an intrinsic viscosity ($\eta$) in a decalin solution at 130° C. of 0.42 dl/g and a Tg of 140° C. The content of TCD was 31 mol %. The amount of repeating units containing polar groups was 0%, while the content of repeating units comprised of ring structures other than norbornene rings was 0%.

PRODUCTION EXAMPLE 4

Bicyclo[2.2.1]hept-2-ene (hereinafter referred to as "NB") (118 kg) was added to a reaction vessel charged with 258 liters of cyclohexane at ordinary temperature under a flow of nitrogen and was stirred for 5 minutes. Further, triisobutyl aluminum was added to give a concentration in the system of 1.0 ml/liter. Next, while stirring, ethylene was circulated at ordinary temperature to make the system an ethylene atmosphere. The temperature inside the autoclave was held at 70° C. and ethylene was used to raise the inside pressure to 6 kg/cm² by gauge pressure. The solution was stirred for 10 minutes, then 5.0 liters of a previously prepared toluene solution containing isopropylidene (cyclopentadienyl)(isodenyl)zirconium dichloride and methylalloxan was added to the system so as to cause the copolymerization reaction of the NB to start. The concentration of the catalyst at this time was 0.015 mmol/liter of isopropylidene (cyclopentadienyl)(isodenyl)zirconium dichloride and 7.5 mmol/liter of methylalloxan with respect to the entire system.

By continuously supplying ethylene into the system during the polymerization, the temperature was held at 70° C. and the internal pressure as held at 6 kg/cm² by gauge pressure. After 60 minutes, isopropyl alcohol was added to stop the polymerization reaction. The pressure was released, then the polymer solution was taken out. The solution was then brought into contact, with vigorous stirring, with an aqueous solution obtained by adding 5 liters of concentrated hydrochloric acid to 1 m³ of water in a 1:1 ratio to make the catalyst residue move to the aqueous phase. The contact mixture was allowed to stand, then the aqueous phase was separated and removed. The result was washed with water twice, then the polymerization solution phase was purified and separated.

Next, the purified and separated polymerization solution was brought into contact with 3 volumes of acetone under vigorous stirring to cause the copolymer to precipitate, then the solid (copolymer) was obtained by filtration and fully washed by acetone. Further, to extract the unreacted monomer present in the polymer, the solid was charged into acetone to a concentration of 40 kg/m³, then extracted under conditions of 60° C. for 2 hours. After the extraction, the solid was obtained by filtration and dried under a flow of nitrogen at 130° C. and 350 mmHg for 12 hours to thus obtain an ethylene-NB copolymer.

The thus obtained ethylene-NB copolymer had an intrinsic viscosity ($\eta$) in a decalin solution at 130° C. of 0.60 dl/g and a Tg of 140° C. The content of NB was 53 mol %. The amount of repeating units containing polar groups was 0%, while the content of repeating units comprised of ring structures other than norbornene rings was 0%.

PRODUCTION EXAMPLE 5

500 parts of dehydrated bicyclo[4.3.0]nonene, 0.56 part of 1-hexene, 0.11 part of dibutyl ether, and 0.22 part of triisobutyl aluminum were charged into a reactor and mixed at room temperature in a nitrogen atmosphere, then, while holding the temperature at 45° C., 200 parts of 8,9-benzotricyclo[4.3.0.1$^{2,5}$]-deca-3-ene and 30 parts of a 0.70% toluene solution of tungsten hexachloride were continuously added over 2 hours for the polymerization. From high pressure liquid chromatography (converted to polystyrene) using toluene as the mobile phase, the number average molecular weight (Mn) of the obtained polymer was 20,500, the weight average molecular weight (Mw) was 38,200, and the distribution of molecular weight (Mw/Mn) was 1.86.

The obtained polymerization reaction solution was transferred to a pressure resistant hydrogenation reactor, added with 10 parts of a diatomaceous earth-carried nickel catalyst (made by Nissan Gardler, G-96D, nickel carrying rate 58%) and 200 parts of bicyclo[4.3.0]nonene, and allowed to react at 180° C. and a hydrogen pressure of 45 kgf/cm² for 10 hours. The solution was filtered by a filter provided with a stainless steel mesh using diatomaceous earth as a filter aid to remove the catalyst. The obtained reaction solution was poured into 3000 parts of isopropyl alcohol while stirring to cause the hydrogenate to precipitate. This was recovered by filtration. The resin was washed by 500 parts of acetone, then dried for 48 hours in a vacuum drier set to less than 1 torr and 100° C. to obtain 195 parts of a ring-opening polymer hydrogenate.

The hydrogenation rate of the main chain of the ring-opening polymer hydrogenate was 100%, the hydrogenation rate of the six-member ring of the side chain was 99.9%, the number average molecular weight (Mn) was 25,400, the weight average molecular weight (Mw) was 46,200, and the distribution of molecular weight (Mw/Mn) was 1.82. The melt flow rate (MFR) at 280° C. was 10 g/10 min, the glass transition temperature was 166° C., and the specific gravity was 1.01. The amount of the repeating units containing polar groups was 0%, and the content of repeating units comprised of ring structures other than norbornene rings was 100%.

PRODUCTION EXAMPLE 6

500 parts of dehydrated cyclohexane, 0.60 part of 1-hexene, 0.11 part of dibutyl ether, and 0.22 part of triisobutyl aluminum were charged into a reaction vessel and mixed at room temperature in a nitrogen atmosphere, then, while holding the temperature at 45° C., 100 parts of 8,9-benzotricyclo[4.4.0.1$^{2,5}$]-deca-3-ene, 100 parts of tetracyclo[4.4.0.1$^{2,5}$.1$^{7,10}$]dodeca-3-ene, and 30 parts of a 0.70% toluene solution of tungsten hexachloride were continuously added over 2 hours for the polymerization. From high pressure liquid chromatography (converted to polystyrene) using toluene as the mobile phase, the number average molecular weight (Mn) of the obtained polymer was 20,300, the weight average molecular weight (Mw) was 43,600, and the distribution of molecular weight (Mw/Mn) was 2.15.

In the same way as Production Example 5, the polymerization reaction solution was transferred to a pressure resistant hydrogenation reactor, added with 10 parts of a diatomaceous earth-carried nickel catalyst and 200 parts of cyclohexane, and allowed to react at 180° C. and a hydrogen pressure of 45 kgf/cm$^2$ for 10 hours. The solution was processed in the same way as Production Example 5 to obtain 190 parts of a ring-opening polymer hydrogenate.

The hydrogenation rate of the main chain of the ring-opening polymer hydrogenate was 100%, the hydrogenation rate of the six-member ring of the side chain was 99.9%, the number average molecular weight (Mn) was 25,800, the weight average molecular weight (Mw) was 52,200, and the distribution of molecular weight (Mw/Mn) was 2.02. The melt flow rate (MFR) at 280° C. was 7 g/10 min, the glass transition temperature was 164° C., and the specific gravity was 1.01. The amount of the repeating units containing polar groups was 0%, and the content of repeating units comprised of ring structures other than norbornene rings was 50%.

PRODUCTION EXAMPLE 7

500 parts of dehydrated cyclohexane, 0.55 part of 1-hexene, 0.11 part of dibutyl ether, and 0.22 part of triisobutyl aluminum were charged into a reaction vessel and mixed at room temperature in a nitrogen atmosphere, then, while holding the temperature at 45° C., 120 parts of tetracyclo[4.4.0.1$^{2,5}$.1$^{7,10}$]dodeca-3-ene, 80 parts of 8-ethyl-tetracyclo-[4.4.0.1$^{2,5}$.1$^{7,10}$]dodeca-3-ene, and 30 parts of a 0.70% toluene solution of tungsten hexachloride were continuously added over 2 hours for the polymerization. From high pressure liquid chromatography (converted to polystyrene) using toluene as the mobile phase, the number average molecular weight (Mn) of the obtained polymer was 24,100, the weight average molecular weight (Mw) was 48,900, and the distribution of molecular weight (Mw/Mn) was 2.03.

In the same way as Production Example 5, the polymerization reaction solution was transferred to a pressure resistant hydrogenation reactor, added with 10 parts of a diatomaceous earth-carried nickel catalyst and 200 parts of cyclohexane, and allowed to react at 150° C. and a hydrogen pressure of 45 kgf/cm$^2$ for 5 hours. The solution was processed in the same way as Production Example 5 to obtain 192 parts of a ring-opening polymer hydrogenate.

The hydrogenation rate of the main chain of the ring-opening polymer hydrogenate was 100%, the hydrogenation rate of the six-member ring of the side chain was 99.9%, the number average molecular weight (Mn) was 30,600, the weight average molecular weight (Mw) was 58,300, and the distribution of molecular weight (Mw/Mn) was 1.91. The melt flow rate (MFR) at 280° C. was 9 g/10 min, the glass transition temperature was 153° C., and the specific gravity was 1.01. The amount of the repeating units containing polar groups was 0%, and the content of repeating units comprised of ring structures other than norbornene rings was 0%.

PRODUCTION EXAMPLE 8

500 parts of dehydrated cyclohexane, 0.70 part of 1-hexene, 0.11 part of dibutyl ether, and 0.22 part of triisobutyl aluminum were charged into a reactor and mixed at room temperature in a nitrogen atmosphere, then, while holding the temperature at 45° C., 100 parts of tetracyclo [4.4.0.1$^{2,5}$.1$^{7,10}$]dodeca-3-ene, 100 parts of tricyclo [4.3.0.1$^{2,5}$]deca-3-ene, and 30 parts of a 0.70% toluene solution of tungsten hexachloride were continuously added over 2 hours for the polymerization. From high pressure liquid chromatography (converted to polystyrene) using toluene as the mobile phase, the number average molecular weight (Mn) of the obtained polymer was 21,600, the weight average molecular weight (Mw) was 40,400, and the distribution of molecular weight (Mw/Mn) was 1.87.

In the same way as Production Example 5, the polymerization reaction solution was transferred to a pressure resistant hydrogenation reactor, added with 10 parts of a diatomaceous earth-carried nickel catalyst and 200 parts of cyclohexane, and allowed to react at 150° C. and a hydrogen pressure of 45 kgf/cm$^2$ for 5 hours. The solution was processed in the same way as Production Example 5 to obtain 192 parts of a ring-opening polymer hydrogenate.

The hydrogenation rate of the main chain of the ring-opening polymer hydrogenate was 100%, the number average molecular weight (Mn) was 27,300, the weight average molecular weight (Mw) was 48,200, and the distribution of molecular weight (Mw/Mn) was 1.77. The melt flow rate (MFR) at 280° C. was 16 g/10 min, the glass transition temperature was 130° C., and the specific gravity was 1.01. The amount of the repeating units containing polar groups was 0%, and the content of repeating units comprised of ring structures other than norbornene rings was 50%.

PRODUCTION EXAMPLE 8-1

1.5 kg of 8-methyl-8-methoxycarbonyltetracyclo [4.4.0.1$^{2,5}$.1$^{7,10}$]dodeca-3-ene, 8.5 kg of tetracyclo [4.4.0.1$^{2,5}$.1$^{7,10}$]dodeca-3-ene, 6 kg of 1,2-dimethoxymethane, 24 kg of cyclohexane, 0.9 kg of 1-hexene, and 0.34 liter of a toluene solution of 0.96 mole/liter of diethyl aluminum chloride were charged into a reaction vessel. On the other hand, 2 liters of a 1,2-dimethoxymethane solution of 0.05 mol/liter of tungsten hexachloride and 1 liter of a 1,2-dimethoxymethane solution of 0.1 mole/liter of para-aldehyde were mixed in a separate vessel. 0.49 liter of the mixture was added to the mixture in the reaction vessel. The mixture was heated to 80° C. and stirred for 3 hours. A mixed solvent of 1,2-dimethoxymethane and cyclohexane in a ratio of 2/8 (ratio by weight) was added to the obtained polymer solution to give a ratio of polymer/solvent of 1/10 (ratio by weight), then 2 kg of triethanolamine was added and the solution stirred for 10 minutes. 50 kg of methanol was added to this polymerization solution, then the solution was stirred for 30 minutes and then allowed to stand. Of the two layers separated into, the top layer was removed, then methanol was further added, the solution stirred and allowed to stand, then the top layer again removed. The same operation was further performed two times. The obtained bottom layer was suitably diluted by cyclohexane and 1,2-dimethoxymethane to obtain a cyclohexane-1,2-dimethoxymethane solution with a 10% polymer concentration. 2 kg of palladium/silica magnesia (made by Nikki Chemical, palladium content: 5%) was added to this solution, then the solution was allowed to react in an autoclave at a hydrogen pressure of 40 kg/cm$^2$ for 4 hours. The solution was filtered by a filter provided with a stainless steel mesh using diatomaceous earth as a filter aid so as to remove the catalyst. This polymer hydrogenate solution was poured into a large amount of methanol while stirring to cause the hydrogenate to precipitate. This was then recovered by filtration. Further, the filtrate was washed by methanol, then dried for 48 hours in a vacuum drier set to not more than 1 torr and 100° C. to obtain the ring-opening polymer hydrogenate.

The ratio of the ring-opening polymer hydrogenate obtained was confirmed to be similar to the charged ratio since gas chromatography showed there was no residual monomer. The Mw of the ring-opening polymer hydrogenate was 36,000, the hydrogenation rate was 99.5%, the Tg was 162° C., and the MFR was 13 g/10 min. Further, the amount of repeating units containing polar groups was 15%, and the content of repeating units comprised of ring structures other than norbornene structures was 0%.

EXAMPLE 1

0.1 part of an antioxidant (made by Ciba-Geigy, Irganox 1010, tetrakis[methylene-3-(3',5'-di-tert-butyl-4'-hydroxyphenyl)propionate]methane) was added to 100 parts of the MTF-TCD ring-opening polymer hydrogenate prepared in Production Example 1, then the mixture was kneaded by a twin-screw mixer and pelletized. The pellets were injection molded at a resin temperature of 320° C. and a mold temperature of 120° C. using a mold of a thickness of 1 mm, length of 200 mm, and width of 100 mm given a mirror finish on one surface to thereby prepare a test piece A. An aluminum reflecting layer of a thickness of 400 nm was formed on the mirror finish surface of the test piece A by a vacuum deposition method to prepare a test piece B.

EXAMPLE 2

An analogous procedure was performed as in Example 1 for pelletization, injection molding, and vapor deposition of aluminum film to prepare test pieces A and B using the ring-opening polymer hydrogenate prepared in Production Example 2 instead of the MTF-TCD ring-opening polymer hydrogenate of Production Example 1.

EXAMPLE 3

An analogous procedure was performed as in Example 1 for pelletization, injection molding, and vapor deposition of aluminum film to prepare test pieces A and B using the ethylene-TCD-based copolymer prepared in Production Example 3 instead of the MTF-TCD ring-opening polymer hydrogenate of Production Example 1.

EXAMPLE 4

An analogous procedure was performed as in Example 1 for pelletization, injection molding, and vapor deposition of aluminum film to prepare test pieces A and B using the ethylene-NB-based copolymer prepared in Production Example 4 instead of the MTF-TCD ring-opening polymer hydrogenate of Production Example 1.

EXAMPLE 5

An analogous procedure was performed as in Example 1 for pelletization and injection molding to prepare test piece A using the ethylene-NB-based copolymer prepared in Production Example 4 instead of the MTF-TCD ring-opening polymer hydrogenate of Production Example 1. Further, a $TiO_2$ layer of a thickness of 100 nm, an aluminum reflecting layer layer of a thickness of 200 nm, an $SiO_2$ layer of a thickness of 300 nm, and an aluminum reflecting layer layer of a thickness of 200 nm were successively stacked on the mirror finish side of the test piece A by the vacuum deposition method to prepare the test piece B.

EXAMPLE 5-1

An MTF-TCD ring-opening polymer hydrogenate with a Mw of 58,100, a Mw/Mn of 2.04, and an MFR of 3 g/10 min was produced by changing the amount of 1-hexene to 0.54 part in Production Example 1. An analogous procedure was performed as in Example 1 on the MTF-TCD ring-opening polymer hydrogenate for pelletization, injection molding, and vapor deposition of aluminum film to prepare test pieces A and B.

EXAMPLE 5-2

An analogous procedure was performed as in Example 1 to prepare test pieces A and B except for making the thickness of the aluminum reflecting layer layer 3,000 nm.

REFERENCE EXAMPLE 1

An analogous procedure was performed as in Example 1 for pelletization and injection molding to prepare test piece A using the ethylene-NB-based copolymer prepared in Production Example 4 instead of the MTF-TCD ring-opening polymer hydrogenate of Production Example 1. Further, a $TiO_2$ layer of a thickness of 100 nm and an $SiO_2$ layer of a thickness of 300 nm were stacked on the mirror finish side of the test piece A by the vacuum deposition method to prepare the test piece B.

The test pieces A prepared in Examples 1 to 5, 5-1, 5-2 and Reference Example A were used to evaluate the smoothness of the surface of the samples, the appearance, and the impact resistance, while the test pieces B were used to evaluate the heat resistance and the reflectance. The results are shown in Table 1.

TABLE 1

| | Surface smoothness | Appearance | Impact resistance | Heat resistance | Reflectance |
|---|---|---|---|---|---|
| Ex. 1 | Good | Good | Good | Good | Good |
| Ex. 2 | Good | Good | Good | Good | Good |
| Ex. 3 | Good | Good | Good | Good | Good |
| Ex. 4 | Good | Good | Good | Good | Good |
| Ex. 5 | Good | Good | Good | Good | Good |
| Ex. 5-1 | Good | Good | Good | Good | Good |
| Ex. 5-2 | Good | Good | Good | Good | Good |
| Ref. Ex. 1 | Good | Good | Good | Good | Poor |

In the evaluation of the reflectance shown in Table 1, Examples 1 to 5, 5-1, and 5-2 exhibited reflectances of at least 70% (92% in Example 1, 90% in Example 2, 85% in Example 3, 86% in Example 4, 88% in Example 5, 78% in Example 5-1, and 73% in Example 5-2), while Reference Example 1 exhibited a reflectance of less than 70% (65%). From these results, it is learned that the reflector comprised of a substrate comprised of a thermoplastic resin containing an alicyclic structure provided with a metal reflecting layer according to the present invention is superior in reflection characteristics compared with a reflector comprised of a thermoplastic resin containing an alicyclic structure provided with a dielectric film.

EXAMPLE 6

0.1 part of an antioxidant (made by Ciba-Geigy, Irganox 1010, tetrakis[methylene-3-(3',5'-di-tert-butyl-4'-hydroxyphenyl)propionate]methane) and 0.2 part of hydrogenated styrene-butadiene-styrene block copolymer hydrogenate (made by Asahi Chemical Industry, Tuftec H1051D) were added to 100 parts of the ethylene-NB-based copolymer prepared in Production Example 4. These were kneaded by a twin-screw mixer and pelletized. The pellets were injection molded at a resin temperature of 320° C. and a mold temperature of 120° C. using a mold of a thickness of 1 mm, length of 200 mm, and width of 100 mm given a mirror finish on one side to prepare the test piece A. Further, an aluminum reflecting layer of a thickness of 400 nm was formed on the mirror finish side of the test piece A by the vacuum deposition method to prepare the test piece B.

EXAMPLE 7

An analogous procedure was performed as in Example 6 for pelletization, injection molding, and vapor deposition of aluminum film to prepare test pieces A and B using the ethylene-TCD-based copolymer prepared in Production Example 3 instead of the ethylene-NB-based copolymer prepared in Production Example 4.

EXAMPLE 8

An analogous procedure was performed as in Example 6 for pelletization, injection molding, and vapor deposition of aluminum film to prepare test pieces A and B using the ring-opening polymer hydrogenate prepared in Production Example 2 instead of the ethylene-NB-based copolymer prepared in Production Example 4.

EXAMPLE 9

An analogous procedure was performed as in Example 6 for pelletization, injection molding, and vapor deposition of aluminum film to prepare test pieces A and B blending 0.5 part of nonylphenyl glycidyl ether instead of the styrene-butadiene-styrene block copolymer hydride of Example 6.

EXAMPLE 9-1

An analogous procedure was performed as in Example 6 for pelletization, injection molding, and vapor deposition of aluminum film to prepare test pieces A and B using a ring-opening polymer hydrogenate having repeating units containing polar groups prepared in Production Example 8-1.

The test pieces A prepared in Examples 6 to 9 and 9-1 were used to evaluate the smoothness of the surface of the test pieces and the appearance, while the test pieces B were used for the heat resistance test. The results are shown in Table 2.

TABLE 2

| | Glass transition temperature (° C.) | Surface smoothness | Appearance | Heat resistance test | | |
|---|---|---|---|---|---|---|
| | | | | Warping | Change in appearance | Adhesion (no. of pieces peeled off) |
| Ex. 6 | 140 | Good | Good | Good | Good | Good (5) |
| Ex. 7 | 140 | Good | Good | Good | Good | Good (4) |
| Ex. 8 | 140 | Good | Good | Good | Good | Good (5) |
| Ex. 9 | 140 | Good | Good | Good | Good | Good (2) |
| Ex. 9-1 | 162 | Good | Good | Good | Good | Good (5) |

The test pieces B prepared in Examples 6 to 9 and 9-1 were used for a high temperature, high humidity test. The results are shown in Table 3.

TABLE 3

| | Impact resistance | | |
|---|---|---|---|
| | Before high temperature, high humidity test | After high temperature, high humidity test | Reflectance (change) |
| Ex. 6 | Good | Good | Good (98%) |
| Ex. 7 | Good | Good | Good (98%) |
| Ex. 6 | Good | Good | Good (98%) |
| Ex. 9 | Good | Good | Good (98%) |
| Ex. 9-1 | Good | Good | Good (95%) |

In the evaluation of the moldability shown in Table 2, Examples 6 to 9 and 9-1 exhibited good results for the moldability and heat resistance (however, in Example 9-1, the adhesion of the reflecting layer fell somewhat (8 pieces peeled off)).

In the evaluation of the impact resistance after the high temperature, high humidity test and the reflectance shown in Table 3 as well, good results were obtained for the impact resistance after the test and the reflectance (however, in Example 9-1, the change in the reflectance after the high temperature, high humidity test fell somewhat (95%)). That is, it was confirmed that a reflector comprised of a resin composition including a thermoplastic resin containing an alicyclic structure and an incompatible compounding agent or organic compound having at least one ether bond or ester bond had substantially the same moldability, surface accuracy of the molded article, and heat resistance as the above Examples 1 to 5, 5-1, and 5-2 not containing the same, did not exhibit a decline in the impact resistance after the high temperature, high humidity test, and had a superior performance free from any decline in the reflection characteristics.

EXAMPLE 10

0.1 part of an antioxidant (made by Ciba-Geigy, Irganox 1010, tetrakis[methylene-3-(3',5'-di-tert-butyl-4'-hydroxyphenyl)propionate]methane) and 20 parts of hydrogenated styrene-butadiene-styrene block copolymer hydrogenate (made by Kuraray, Septon 4055) were added to 100 parts of the ethylene-NB-based copolymer prepared in Production Example 4. These were kneaded by a twin-screw mixer and pelletized. The pellets were injection molded at a resin temperature of 320° C. and a mold temperature of 120° C. using a mold of a thickness of 1 mm, length of 200 mm, and width of 100 mm given a mirror finish on one side to prepare the test piece A. Further, an aluminum reflecting layer of a thickness of 400 nm was formed on the mirror finish side of the test piece A by the vacuum deposition method to prepare the test piece B.

EXAMPLE 11

An analogous procedure was performed as in Example 10 for pelletization, injection molding, and vapor deposition of aluminum film to prepare test pieces A and B using the ethylene-TCD-based copolymer prepared in Production Example 3 instead of the ethylene-NB-based copolymer.

EXAMPLE 12

An analogous procedure was performed as in Example 10 for pelletization, injection molding, and vapor deposition of aluminum film to prepare test pieces A and B using the ring-opening polymer hydrogenate prepared in Production Example 2.

EXAMPLE 13

An analogous procedure was performed as in Example 10 for pelletization, injection molding, and vapor deposition of aluminum film to prepare test pieces A and B except for blending 20 parts of polyethylene (melting point 160° C.) instead of the styrene-butadiene-styrene block copolymer hydrogenate of Example 10.

EXAMPLE 14

An analogous procedure was performed as in Example 10 to prepare test pieces A and B except for adding 30 parts of PAN-based carbon fiber (made by Toray, Torayca).

The test pieces A prepared in Examples 10 to 14 were used to evaluate the smoothness of the surface of the test pieces and the appearance, while the test pieces B were used for the heat resistance test. The results are shown in Table 4.

TABLE 4

| | Glass transition temperature | Surface smoothness | Appearance | Heat resistance test | | |
| --- | --- | --- | --- | --- | --- | --- |
| | | | | Warping | Change in appearance | Adhesion |
| Ex. 10 | 140° C. | Good | Good | Good | Good | Good |
| Ex. 11 | 140° C. | Good | Good | Good | Good | Good |
| Ex. 12 | 140° C. | Good | Good | Good | Good | Good |
| Ex. 13 | 140° C. | Good | Good | Good | Good | Good |
| Ex. 14 | 140° C. | Good | Good | Good | Good | Good |

The test pieces B prepared in Examples 10 to 14 were used to measure the screwing resistance. The results are shown in Table 5.

TABLE 5

| | Screwing resistance test |
| --- | --- |
| Ex. 10 | Good |
| Ex. 11 | Good |
| Ex. 12 | Good |
| Ex. 13 | Good |
| Ex. 14 | Good |

In the evaluation of the moldability shown in Table 4, Examples 10 to 14 exhibited good results for the moldability and the heat resistance.

In the evaluation of the screwing resistance shown in Table 5 as well, Examples 10 to 14 exhibited good results. In particular, in Example 14, since a filler was added, the strength with respect to screwing was improved much more. That is, it was confirmed that a reflector comprised of a thermoplastic resin containing an alicyclic structure and a soft polymer had substantially the same moldability, surface accuracy of the molded article, and heat resistance as those of the above Examples 1 to 5, 5-1, and 5-2 not containing the same and further did not suffer from cracks or crazing even when the molded article was screwed in.

EXAMPLE 15

0.1 part of an antioxidant (made by Ciba-Geigy, Irganox 1010, tetrakis[methylene-3-(3',5'-di-tert-butyl-4'-hydroxyphenyl)propionate]methane) and 20 parts of polybutylene terephthalate (made by Kuraray, Houza R115) were added to 100 parts of the ethylene-NB-based copolymer prepared in Production Example 4. These were kneaded by a twin-screw mixer and pelletized. The pellets were injection molded at a resin temperature of 320° C. and a mold temperature of 120° C. using a mold of a thickness of 1 mm, length of 200 mm, and width of 100 mm given a mirror finish on one side to prepare the test piece A. Similarly, a mold of a thickness of 2 mm, length of 150 mm, and width of 25 mm was used to prepare the test piece C. Further, an aluminum reflecting layer of a thickness of 400 nm was formed on the mirror finish side of the test piece A by the vacuum deposition method to prepare the test piece B.

EXAMPLE 16

An analogous procedure was performed as in Example 15 for pelletization, injection molding, and vapor deposition of aluminum film to prepare test pieces A, B, and C using the ethylene-TCD-based copolymer prepared in Production Example 3 instead of the ethylene-NB-based copolymer.

EXAMPLE 17

An analogous procedure was performed as in Example 15 for pelletization, injection molding, and vapor deposition of aluminum film to prepare test pieces A, B, and C using the ring-opening polymer hydrogenate prepared in Production Example 2.

EXAMPLE 18

An analogous procedure was performed as in Example 15 for pelletization, injection molding, and vapor deposition of aluminum film to prepare test pieces A, B, and C blending 20 parts of polyphenylene sulfide (made by Polyplastic, Photron 1140A1) instead of the polybutylene terephthalate of Example 17.

The test pieces A prepared in Examples 15 to 18 were used to evaluate the smoothness of the surface of the test pieces and the appearance. The results are shown in Table 6.

TABLE 6

| | Surface smoothness | Appearance |
| --- | --- | --- |
| Ex. 15 | Good | Good |
| Ex. 16 | Good | Good |
| Ex. 17 | Good | Good |
| Ex. 16 | Good | Good |

The test pieces B prepared in Examples 15 to 18 were used to measure the heat resistance, while the test pieces C were used for the heat test. The results are shown in Table 7.

TABLE 7

| | Heat resistance test | | | |
|---|---|---|---|---|
| | Warping | Change in appearance | Adhesion | Heat cycle test |
| Ex. 15 | Good | Good | Good | Good |
| Ex. 16 | Good | Good | Good | Good |
| Ex. 17 | Good | Good | Good | Good |
| Ex. 18 | Good | Good | Good | Good |

In the evaluation of the moldability shown in Table 6, Examples 15 to 18 exhibited good results for the moldability.

In the evaluations of the heat resistance test and the heat test shown in Table 7 as well, there was no warping of the test pieces and the adhesion of the vapor deposited films were good as well. Further, there was no deflection due to the inherent weight of the test pieces. That is, it was confirmed that a reflector comprised of a resin composition containing a thermoplastic resin containing an alicyclic structure and a crystalline polymer had substantially the same moldability and surface accuracy of the molded article as those of the above Examples 1 to 5, 5-1, and 5-2 not containing the same and further was superior in heat resistance.

EXAMPLE 19

0.1 part of an antioxidant (made by Ciba-Geigy, Irganox 1010, tetrakis[methylene-3-(3',5'-di-tert-butyl-4'-hydroxyphenyl)propionate]methane) and 0.2 part of hydrogenated styrene-butadiene-styrene block copolymer hydrogenate (made by Asahi Chemical Industry, Tuftec H1051D) were added to 100 parts of the ring-opening polymer hydrogenate prepared in Production Example 5. These were kneaded by a twin-screw mixer and pelletized. The pellets were injection molded at a resin temperature of 320° C. and a mold temperature of 120° C. using a mold of a thickness of 1 mm, length of 200 mm, and width of 100 mm given a mirror finish on one side to prepare the test piece A. Further, an aluminum reflecting layer of a thickness of 400 nm was formed on the mirror finish side of the test piece A by the vacuum deposition method to prepare the test piece B. Further, a mold of 3 mm×12 mm×120 mm was used for injection molding under the same conditions to prepare the test piece C.

EXAMPLE 20

An analogous procedure was performed as in Example 19 for pelletization, injection molding, and vapor deposition of aluminum film to prepare test pieces A, B, and C using the ring-opening polymer hydrogenate prepared in Production Example 6.

EXAMPLE 21

An analogous procedure was performed as in Example 19 for pelletization, injection molding, and vapor deposition of aluminum film to prepare test pieces A, B, and C using the ring-opening polymer hydrogenate prepared in Production Example 7.

EXAMPLE 22

An analogous procedure was performed as in Example 19 for pelletization, injection molding, and vapor deposition of aluminum film to prepare test pieces A, B, and C using the ring-opening polymer hydrogenate prepared in Production Example B.

REFERENCE EXAMPLE 2

An analogous procedure was performed as in Example 19 for injection molding and vapor deposition of aluminum film to prepare test pieces A, B, and C using polybutylene terephthalate (PBT) (made by Kuraray, R1300). The melt flow rate (MFR) of the PBT at 280° C. was 0.6 g/10 min and the specific gravity was 1.53.

REFERENCE EXAMPLE 3

An analogous procedure was performed as in Example 19 for injection molding and vapor deposition of aluminum film to prepare test pieces A, B, and C using polycarbonate (PC) (made by Teijin Chemicals, Panlite 122). The melt flow rate (MFR) of the PC at 280° C. was 1.5 g/10 min and the specific gravity was 1.20.

TABLE 8

| | Deflection temperature under load (° C.) | Melt flow rate (g/10 min) | Specific gravity | Surface smoothness | Appearance |
|---|---|---|---|---|---|
| Ex. 19 | 151 | 10 | 1.01 | Good | Good |
| Ex. 20 | 149 | 7 | 1.01 | Good | Good |
| Ex. 21 | 137 | 9 | 1.01 | Good | Good |
| Ex. 22 | 114 | 16 | 1.01 | Good | Good |
| Ref. Ex. 2 | 216 | 0.6 | 1.53 | Poor | Poor |
| Ref. Ex. 3 | 132 | 1.5 | 1.20 | Poor | Poor |

Next, the test pieces B prepared in the above Examples 19 to 22 and Reference Examples 2 to 3 were tested for heat resistance. The results are shown in Table 9.

The heat resistance test was conducted matched with the temperature conditions to which an extension reflector is exposed due to the light source. That is, each test piece B was placed on a horizontal plate and heated and held in a gear oven at 120° C. for 48 hours.

A test piece having a warping of less than 0.3 mm after the heat resistance test as compared with before the test was judged as "good", while one of more than 0.3 mm was judged as "poor".

Further, a test piece with no change in appearance of the vapor deposited film as compared with before the heat resistance test was judged as "good", while one with clouding of the mirror finish, poor reflectance, swelling of the film, discoloration, or other changes in appearance was judged as "poor". Further, the adhesion of the vapor deposited film after the heat resistance test was also evaluated.

TABLE 9

| | Warping | Change in appearance | Adhesion |
|---|---|---|---|
| Ex. 19 | Good | Good | Good |
| Ex. 20 | Good | Good | Good |
| Ex. 21 | Good | Good | Good |
| Ex. 22 | Good | Good | Good |
| Ref. Ex. 2 | Poor | Good | Good |
| Ref. Ex. 3 | Good | Poor | Good |

In the evaluation of the moldability shown in Table 8, Reference Example 2 exhibited a roughening of the surface of the molded article and also a large warping, while Reference Example 3 exhibited silver streaking and sink marks at the surface. Further, in the evaluation of the heat resistance shown in Table 9, Reference Example 2 exhibited a susceptibility to heat deformation, while Reference Example 3 had a vapor deposited film becoming partially semitransparent after the heat resistance test and exhibited a drop in the reflectance.

From the results of Tables 8 and 9, it was learned that the reflector comprised of a thermoplastic resin containing an alicyclic structure of the present invention is superior in moldability of a thin, long flow length molded article and surface accuracy of the molded article compared with a conventional material. Simultaneously, it was learned that the heat resistance was also good.

Lens

The various evaluations in Examples 23 to 30 and Reference Examples 4 to 6 given below were conducted as follows:

The "transparency" was evaluated by measuring the light transmittance (%) of the test piece to visible light by a spectrophotometer (made by JASCO), Model No. U-30) while continuously changing the wavelength in the range of 400 to 900 nm and judging by the following criteria:

Very good: Light transmittance of visible light of at least 92%

Good: Light transmittance of visible light of at least 90% and less than 92%

Poor: Light transmittance of visible light of less than 90%

The "moldability" was evaluated by examining the state of grooves on the surface of the test piece by a microscope to look for voids, cracks, cutouts, and other imperfections. The evaluation criteria were as follows:

Very good: 0 out of 10 test pieces with imperfections

Good: 1 to 3 out of 10 test pieces with imperfections

Fair: 4 to 6 out of 10 test pieces with imperfections

Poor: 7 or more out of 10 test pieces with imperfections

The "mechanical strength 2" was evaluated by the impact resistance according to a drop test. A missile-shaped weight (weight of 100 g) of a radius of ¾ inch was allowed to naturally drop on a test piece from a height of 1 m and then cracks or fractures were examined for. The following criteria were used for the evaluation:

Very good: 0 out of 10 test pieces with cracks or fractures

Good: 1 to 3 out of 10 test pieces with cracks or fractures

Fair: 4 to 6 out of 10 test pieces with cracks or fractures

Poor: 7 or more out of 10 test pieces with cracks or fractures

The "hygroscopic deformation 1" was evaluated by allowing a test piece to stand in a constant temperature and humidity tank set to a temperature of 23° C. and a relative humidity of 90% for 1000 hours and examining for hygroscopic deformation (warping) of the test piece. The following criteria were used for the evaluation:

Very good: Magnitude of warping of less than 0.2 mm

Good: Magnitude of warping of 0.2 mm to less than 0.4 mm

Fair: Magnitude of warping of 0.4 mm to less than 0.6 mm

Poor: Magnitude of warping of 0.6 mm or more

The "heat resistance test 4" was conducted by allowing a test piece to stand in a constant temperature and humidity tank set to a temperature of 80° C. and a relative humidity of 20% for 1000 hours and examining for hygroscopic deformation (warping) of the test piece. The following criteria were used for the evaluation:

Very good: Magnitude of warping of less than 0.2 mm

Good: Magnitude of warping of 0.2 mm to less than 0.4 mm

Fair: Magnitude of warping of 0.4 mm to less than 0.6 mm

Poor: Magnitude of warping of 0.6 mm or more

The "high temperature, high humidity environment durability test" was conducted by allowing a test piece to stand in a constant temperature and humidity tank set to a temperature of 80° C. and a relative humidity of 90% for 1000 hours, quickly taking it out into a room temperature environment (outside test device), and examining for white turbidity after the elapse of several minutes (change in light transmittance). The light transmittance at 700 nm was measured by a visible/UV spectrophotometer and the value of (light transmittance after test/light transmittance directly after molding)×100 was calculated. The following criteria were used for the evaluation:

Very good: Value of 98% or more

Good: Value of 96% to less than 98%

Fair: Value of 94% to less than 96%

Poor: Value of less than 94%

PRODUCTION EXAMPLE 9

400 parts of dehydrated toluene, 0.68 part of 1-hexene, 0.25 part of isopropyl ether, 0.18 part of isobutyl alcohol, 0.48 part of isobutyl aluminum, and 42 parts of a 0.77% toluene solution of tungsten hexachloride were charged into a polymerization reactor and mixed at room temperature in a nitrogen atmosphere, then 100 parts of 1,4-methano-1,4,4a,9a-tetrahydrofluorene, 100 parts of tetracyclo-[$4.4.0.1^{2,5}.1^{7,10}$]dodeca-3-ene, and 25 parts of a 0.77% toluene solution of tungsten hexachloride were continuously added at 45° C. over 2 hours for the polymerization.

300 parts of the polymerization reaction solution was transferred to an autoclave equipped with a stirrer, then 9 parts of an alumina carried nickel catalyst was added and a reaction caused at 190° C. and 45 kgf/cm$^2$ for 8 hours. The solution was filtered by filter paper with a pore size of 1 μm using diatomaceous earth as a filter aid. The obtained reaction solution was poured into 2000 parts of isopropyl alcohol while stirring to cause the hydrogenated resin to precipitate. This was recovered by filtration. The resin was washed by 500 parts of acetone, then dried for 24 hours in a vacuum drier set to less than 1 torr and 100° C. to obtain the ring-opening polymer hydrogenate.

The hydrogenation rate of the main chain of the ring-opening polymer hydrogenate was 100%, while the hydrogenation rate of the six-member ring of the side chain was 99.9%. The number average molecular weight (Mn) of the obtained polymer was 25,900, the weight average molecular weight (Mw) was 53,400, and the distribution of molecular weight (Mw/Mn) was 2.06. Further, the glass transition temperature of the ring-opening polymer hydrogenate was 160° C., and the melt flow rate (MFR) was 15 g/10 min.

PRODUCTION EXAMPLE 2

100 parts of 8-methyl-8-methoxycarbonyltetracyclo [$4.4.0.1^{2,5}.1^{7,10}$]dodeca-3-ene, 60 parts of 1,2-dimethoxymethane, 240 parts of cyclohexane, 9 parts of 1-hexene, and 34 ml of a toluene solution of 0.96 mole/liter of diethyl aluminum chloride were charged into a 1 liter volume autoclave. On the other hand, 20 ml of a 1,2-dimethoxymethane solution of 0.05 mol/liter of tungsten hexachloride and 10 ml of a 1,2-dimethoxymethane solution of 0.1 mole/liter of para-aldehyde were mixed in a separate flask. 4.9 ml of the mixture was added to the mixture in the autoclave. The autoclave was sealed, then the mixture was heated to 80° C. and stirred for 3 hours.

A mixed solvent of 1,2-dimethoxymethane and cyclohexane in a ratio of 2/8 (ratio by weight) was added to the obtained polymer solution to give a ratio of polymer/solvent of 1/10 (ratio by weight), then 20 parts of triethanolamine was added and the solution stirred for 10 minutes. 500 parts of methanol was added to this polymerization solution, then the solution was stirred for 30 minutes and then allowed to stand. Of the two layers separated-into, the top layer was removed, then methanol was further added, the solution stirred and allowed to stand, then the top layer again removed. The same operation was further performed two times. The obtained bottom layer was suitably diluted by cyclohexane and 1,2-dimethoxymethane to obtain a cyclohexane-1,2-dimethoxymethane solution with a 10% polymer concentration. 20 parts of palladium/silica magnesia (made by Nikki Chemical, palladium content: 5%) was added to this solution, then the solution was allowed to react in an autoclave at a hydrogen pressure of 40 kg/cm$^2$ and temperature of 165° C. for 4 hours. The hydrogenation catalyst was removed by filtration to obtain a hydrogenated polymer solution. An antioxidant, that is, pentaerythritol tetrakis[3-(3,5-di-t-butyl-4-hydroxyphenyl)propionate], was added to the hydrogenated polymer solution in an amount of 0.1% with respect to the hydrogenated polymer, then the solvent was removed at 380° C. under reduced pressure.

The number average molecular weight (Mn) of the obtained polymer hydrogenate was 17,000, the weight average molecular weight (Mw) was 46,000, and the distribution of molecular weight was 2.71. The glass transition temperature of the polymer hydrogenate was 168° C., and the melt flow rate (MFR) was 13 g/10 min.

EXAMPLE 23

0.2 part of a soft polymer (made by Asahi Chemical Industry, Tuftec H1052, glass transition temperature of less than 0° C.) and 0.1 part of an antioxidant (made by Ciba-Geigy, Irganox 1010) were added to 100 parts of the ring-opening polymer hydrogenate obtained in Production Example 9. The mixture was kneaded by a twin-screw mixer (made by Toshiba Machine, TEM-35B, screw diameter 37 mm, L/D=32, screw speed 250 rpm, resin temperature 240° C., feed rate 10 kg/hour), extruded, and pelletized.

The obtained pellets were heated and kneaded in an extruder, then melt extruded at a resin temperature of 220° C. and cooled to obtain a substrate of 300×300×3 mm. Next, the obtained substrate was placed in a Fresnel lens mold and hot pressed at a molding temperature of 150° C., molding pressure of 30 kg/cm$^2$, and molding time of 10 min, then cooled for 10 minutes to obtain a molded article (lens). The shape of the Fresnel lens part was a diameter of the outermost periphery of 200 mm and a spherical curved surface divided into 20 sections. The results are shown in Table 10.

EXAMPLE 24

An analogous procedure was followed as in Example 23 to produce pellets except that 0.5 part of poly(oxy-2-hydroxyltrimethylene)nonylphenyl ether reacting at a ratio of two molecules of glycidol with respect to 1 molecule of nonylphenyl ether was added instead of the 0.2 part of the soft polymer (made by Asahi Chemical Industry, Tuftec H1052) of Example 23. These were injection molded under analogous conditions to prepare a lens having a Fresnel lens part. The results are shown in Table 10.

EXAMPLE 25

An analogous procedure was followed as in Example 23 to produce pellets except for using 170 parts of tricyclo[4.3.0.1$^{2,5}$]deca-3,7-diene (cyclopentadiene) and 30 parts of 8-methyl-tetracyclo-[4.4.0.1.$^{2,5}$.1$^{7,10}$]dodeca-3-ene as the monomer in Example 23. These were injection molded under analogous conditions to prepare a lens having a Fresnel lens part. The results are shown in Table 10.

EXAMPLE 26

An analogous procedure was followed as in Example 23 to produce pellets except for using APEL made by Mitsui Petrochemical Industries as the thermoplastic resin containing an alicyclic structure. These were injection molded under analogous conditions to prepare a lens having a Fresnel lens part. The results are shown in Table 10.

EXAMPLE 27

An analogous procedure was followed as in Example 23 to produce pellets except for using TOPAS made by Mitsui Petrochemical Industries as the thermoplastic resin containing an alicyclic structure. These were injection molded under analogous conditions to prepare a lens having a Fresnel lens part. The results are shown in Table 10.

EXAMPLE 28

0.2 part of a soft polymer (made by Asahi Chemical Industry, Tuftec H1052, glass transition temperature of less than 0° C.) was added to 100 parts of the polymer hydrogenate obtained in Production Example 10. The mixture was kneaded by a twin-screw mixer (made by Toshiba Machine, TEM-35B, screw diameter 37 mm, L/D=32, screw speed 250 rpm, resin temperature 240° C., feed rate 10 kg/hour), extruded, and pelletized. The obtained pellets were used in the same way as in Example 23 to prepare a lens having a Fresnel lens part. The results are shown in Table 10.

EXAMPLE 29

An analogous procedure was followed as in Example 23 to produce pellets except for using 0.5 part of poly(4-methyl-1-pentene) (made by Mitsui Petrochemical Industries, TPX DX-820) instead of 0.2 part of a soft polymer as the white turbidity preventing agent. These were injection molded under analogous conditions to prepare a lens having a Fresnel lens part. The results are shown in Table 10.

EXAMPLE 30

An analogous procedure was followed as in Example 23 to produce pellets except for using 0.3 part of colloidal silica (made by Nippon Silica, R-972) instead of 0.2 part of soft polymer as the white turbidity preventing agent. These were injection molded under analogous conditions to prepare a lens having a Fresnel lens part. The results are shown in Table 10.

REFERENCE EXAMPLE 4

An analogous procedure was followed as in Example 23 to produce pellets except for using APEL made by Mitsui Petrochemical Industries as the thermoplastic resin containing an alicyclic structure and not adding a white turbidity preventing agent. These were injection molded under analogous conditions to prepare a lens having a Fresnel lens part. The results are shown in Table 10.

REFERENCE EXAMPLE 5

An analogous procedure was followed as in Example 23 to prepare a lens having a Fresnel part except for using polycarbonate (made by Teijin Chemicals, Panlite) as the plastic material. The results are shown in Table 10.

REFERENCE EXAMPLE 6

An analogous procedure was followed as in Example 23 to prepare a lens having a Fresnel lens part except for using polymethyl methacrylate (made by Mitsubishi Rayon, Acrylipet VH) as the plastic material. The results are shown in Table 10.

TABLE 10

| | Trans-parency | Mold-ability | Mechanical strength | Hygro-scopic deforma-tion | Heat resist-ance | High temper-ature, high humid-ity resist-ance |
|---|---|---|---|---|---|---|
| Ex. 23 | Very good | Very good | Very good | Very good | Very good | Very good |
| Ex. 24 | Very good | Very good | Very good | Very good | Very good | Very good |
| Ex. 25 | Very good | Very good | Very good | Very good | Good | Very good |
| Ex. 26 | Good | Very good | Good | Very good | Very good | Very good |
| Ex. 27 | Good | Good | Fair | Very good | Very good | Very good |
| Ex. 28 | Very good | Good | Good | Good | Very good | Very good |
| Ex. 29 | Good | Very good | Very good | Very good | Very good | Very good |
| Ex. 30 | Very good | Very good | Very good | Very good | Very good | Very good |
| Ref. Ex. 4 | Good | Very good | Good | Very good | Very good | Poor |
| Ref. Ex. 5 | Poor | Fair | Very good | Fair | Very good | Poor |
| Ref. Ex. 6 | Very good | Good | Poor | Poor | Good | Poor |

As clear from the results of Table 10, it is learned that the lens for a vehicular lighting equipment of the present invention (Examples 23 to 30) is remarkably improved in resistance to high temperature, high humidity (effect of prevention of white turbidity) while maintaining transparency, moldability, mechanical strength, moisture resistance, heat resistance, and other various properties.

Lamp Cover

The various evaluations in Examples 31 to 35 and Reference Example 7 were conducted as follows:

The "accuracy of the test piece surface" and "appearance of the test piece" were evaluated in the same way as in the case of the above Examples 1 to 5, 5-1, and 5-2.

The "heat resistance test 2" was conducted by an analogous method as the above Examples 6 to 9 to evaluate the "warping" and "change in appearance".

The "UV irradiation test" was conducted by irradiating a test piece with UV carbon arc light having a peak at 390 nm by an output of an arc voltage of 135V and an arc current of 16A for 500 hours and examining the change in the impact resistance of the test piece and the change in the light transmittance before and after. The "change in impact resistance" was evaluated in the same way as the case of the above Examples 6 to 9. The "change in light transmittance" was evaluated by measuring the total light transmittance (%) by a spectrophotometer (made by JASCO, Model No. U-30) while continuously changing the wavelength in the range of 400 to 900 nm and judging a test piece with a value of the (light transmittance after UV irradiation test/light transmittance before test)×100 (5) of more than 95% as "good" and ones of less than 95% as "poor".

PRODUCTION EXAMPLE 11

100 parts of 8-ethyltetracyclo[$4.4.0.1^{2,5}.1^{7,10}$]-dodeca-3-ene (hereinafter referred to as ETCD) was polymerized in a known metathesis ring-opening polymerization catalyst system in a flow of nitrogen, then was hydrogenated by a known method to obtain an ETCD ring-opening polymer hydrogenate.

The number average molecular weight Mn of the ETCD ring-opening polymer hydrogenate was 28,000. This ETCD ring-opening polymer hydrogenate was dried by a known method. The hydrogenation rate found by comparison by the proton NMR method before and after the hydrogenation reaction was at least 99.8%, the Tg measured by DSC was 140° C., and the refractive index at 25° C. was 1.53 (based on ASTM-D542).

PRODUCTION EXAMPLE 12

An analogous procedure was followed as in Production Example 11 to obtain an ETCD/DCP ring-opening copolymer hydrogenate except for using 15 parts of ETCD and 85 parts of tricyclo[$4.3.0.1^{2,5}$]deca-3,7-diene (dicyclopentadiene, hereinafter referred to as DCP) instead of 100 parts of ETCD and not using a hydrated styrene-butadiene-styrene block copolymer. The copolymerization ratio of the norbornenes in the polymer was calculated from the composition of residual norbornenes in the solution after polymerization (by gas chromatography) and was found to be ETCD/DCP=15/85 or substantially equal to the charged composition.

The ETCD/DCP ring-opening polymer hydrogenate had an Mn of 27,000, a hydrogenation rate of at least 99.8%, a Tg of 104° C., and a refractive index of −1.53.

PRODUCTION EXAMPLE 13

An analogous procedure was followed as in Production Example 11 to obtain a TCD/MTF ring-opening copolymer hydrogenate except for using 50 parts of tetracyclo[$4.4.0.1^{2,5}.1^{7,10}$]-dodeca-3-ene (also known as 1,4:5,8-dimethano-1, 4,4a,5,6,7,8,8a-octahydronaphthalene, hereinafter referred to as TCD) and 50 parts of tetracyclo[$7.4.0.1^{10,13}.0^{2,7}$] dodeca-2,4,6,11-tetraene (also known as 1,4-methano-1,4, 4a,9a-tetrahydrofluorene, hereinafter referred to as MTF) (total 100 parts) instead of 100 parts of ETCD. The copolymerization ratio of the norbornenes in the polymer was calculated from the composition of residual norbornenes in the solution after polymerization (by gas chromatography) and was found to be TCD/MTF=50/50 or substantially equal to the charged composition.

The TCD/MTF ring-opening polymer hydrogenate had an Mn of 31,000, a hydrogenation rate of at least 99.9%, a Tg of 155° C., and a refractive index of 1.53.

EXAMPLE 31

0.2 part of a phenol-based antioxidant pentaerythritol-tetrakis(3-(3,5-di-t-butyl-4-hydroxyphenyl)propionate) and 0.4 part of hydrated styrene-butadiene-styrene block copolymer (made by Asahi Chemical Industry, Tuftec H1051, crumbs, refractive index at 30° C. of 1.52) were mixed into 100 parts of the ETCD ring-opening polymer hydrogenate prepared in Preparation Example 11. The mixture was kneaded by a twin-screw mixer and the strands (rod shaped molten resin) were passed through a strand cutter to obtain a pellet-shaped molding material. The pellets were molded into a sheet of 20 mm×15 mm×3.0 mm thickness by a hot press (resin temperature 200° C., 300 kgf/cm$^2$, 3 minutes). The sheet was transparent and had a light transmittance at 400 to 700 nm of not less than 90.0%.

The pellets were injection molded at a resin temperature of 320° C. and a mold temperature of 120° C. using a mold having a cavity of a thickness of 1 mm, length of 200 mm, and width of 100 mm given a mirror finish on one surface to thereby prepare test pieces A, B, and C.

Further, the pellets were placed in a lamp cover mold and hot pressed at a molding temperature of 150° C. and a molding pressure of 30 kg/cm$^2$ for a molding time of 10 minutes, then the result was water cooled for 10 minutes to obtain the molded article (lamp cover).

EXAMPLE 32

An analogous procedure was followed as in Example 31 for pelletization, injection molding, and preparation of test pieces A, B, and C except for using the ETCD/DCP ring-opening polymer hydrogenate prepared in Production Example 12.

Further, the same pellets were placed in a mold for producing a lamp cover and press molded in the same way as Example 31 to obtain a molded article (lamp cover).

EXAMPLE 33

An analogous procedure was followed as in Example 31 for pelletization, injection molding, and preparation of test pieces A, B, and C except for using the TCD/MTF ring-opening polymer hydrogenate prepared in Production Example 13.

Further, the same pellets were placed in a mold for producing a lamp cover and press molded in the same way as Example 31 to obtain a molded article (lamp cover).

EXAMPLE 34

An analogous procedure was followed as in Example 31 for pelletization, injection molding, and preparation of test pieces A, B, and C except for using the ethylene-TCD copolymer prepared in Production Example 13.

Further, the same pellets were placed in a mold for producing a lamp cover and press molded in the same way as Example 31 to obtain a molded article (lamp cover).

EXAMPLE 35

An analogous procedure was followed as in Example 31 for pelletization, injection molding, and preparation of test pieces A, B, and C except for adding 2-(2'-hydroxy-t-butyl-5'-methylphenyl)-5-chloro-benzotriazole (made by Nisseki Calcium, SEESORB 703) to 100 parts of the ETCD ring-opening polymer hydrogenate prepared in Production Example 11.

Further, the same pellets were placed in a mold for producing a lamp cover and press molded in the same way as Example 31 to obtain a molded article (lamp cover).

REFERENCE EXAMPLE 7

An analogous procedure was followed as in Example 31 for pelletization, injection molding, and preparation of test pieces A, B, and C except for using polycarbonate (made by Teijin Chemicals, Panlite 122) and changing the resin temperature at the time of injection molding 320° C. and the mold temperature 110° C.

Further, the same pellets were placed in a mold for producing a lamp cover and press molded in the same way as Example 31 to obtain a molded article (lamp cover).

Test

The test pieces A prepared in Examples 31 to 35 were used to evaluate the surface smoothness and appearance, while the test pieces B were used for the heat resistance test. The results are shown in Table 11.

TABLE 11

| | Glass transition temperature | Surface smoothness | Appearance | Heat resistance test Warping | Change in appearance |
|---|---|---|---|---|---|
| Ex. 31 | 140° C. | Good | Good | Good | Good |
| Ex. 32 | 105° C. | Good | Good | Good | Good |
| Ex. 33 | 160° C. | Good | Good | Good | Good |
| Ex. 34 | 140° C. | Good | Good | Good | Good |
| Ex. 35 | 105° C. | Good | Good | Good | Good |
| Ref. Ex. 7 | 140° C. | Good | Good | Good | Good |

The test pieces C prepared in Examples 31 to 35 and Reference Example 11 were used to evaluate the change in impact resistance and change in reflectance before and after ultraviolet (UV) irradiation. The tests are shown in Table 12. Further, the test pieces C were used to evaluate the change in transmittance before and after UV irradiation. The results are also shown in Table 12.

TABLE 12

| | Impact resistance | | Transmission | |
|---|---|---|---|---|
| | Before UV irradiation | After UV irradiation | Before UV irradiation | After UV irradiation |
| Ex. 31 | Good | Good | Good | Good |
| Ex. 32 | Good | Good | Good | Good |
| Ex. 33 | Good | Good | Good | Good |
| Ex. 34 | Good | Good | Good | Good |
| Ex. 35 | Good | Good | Good | Good |
| Ref. Ex. 7 | Good | Poor | Poor | Poor |

In the evaluation of the moldability shown in Table 11, it was confirmed that there was no difference in moldability and heat resistance in Examples 31 to 35 and Reference Example 11. In the evaluation of the impact resistance, reflectance, and transmittance after UV irradiation shown in Table 12, it was confirmed that there was less of a change in impact resistance, change in reflectance, and change in transmittance after UV irradiation in Examples 31 to 35 compared with Reference Example 11. That is, it was confirmed that the lamp cover comprised of the thermoplastic resin containing an alicyclic structure as in Examples 31 to 35 had an equivalent moldability and surface accuracy of the molded article as a lamp cover comprised of polycarbonate and further was superior in heat resistance, did not exhibit a decline in impact resistance and transmittance after UV irradiation, and had a superior performance.

Lamp Cap

The various evaluations in Examples 36 to 37 and Reference Examples 8 to 11 shown below were conducted as follows:

The "deflection temperature under load" was evaluated by an analogous method as in the above Examples 19 to 22.

The "transparency" was evaluated by an analogous method as in the above Examples 23 to 30 and using the following criteria. A test piece with a light transmittance of more than 92% was judged as "very good", one of 90% to less than 92% as "good", one of 88% to less than 90% as "fair", and one of less than 88% as "poor".

The "light resistance 1", was evaluated by measuring the yellow index (YI) using a color difference meter Color Analyzer. The larger the value, the more the piece yellowed and became colored.

The "heat resistance test 5" was conducted by measuring the deformation and coloring due to changes in the environment (changes in temperature). A lamp cap is normally attached to a lamp for a long period of time, so tends to often suffer from problems of deformation or coloring due to temperature. Therefore, as representative characteristics, the change in dimensions after holding the test pieces obtained in the following examples and reference examples in a gear oven at 100° C. for 24 hours was measured and the presence of coloring was examined. A test piece with a warping after the heat resistance test as compared with before the test of less than 0.3 was judged as "good", while one with over 0.3 mm was judged as "poor". Further, the existence of discoloring (yellowing) was checked for.

PRODUCTION EXAMPLE 14

500 parts of dehydrated bicyclo[4.3.0]nonene, 0.56 part of 1-hexene, 0.11 part of dibutyl ether, and 0.22 part of triisobutyl aluminum were charged into a reactor and mixed at room temperature in a nitrogen atmosphere, then, while holding the temperature at 45° C., 200 parts of 8,9-benzotricyclo[4.3.0.1$^{2,5}$]-deca-3-ene and 30 parts of a 0.70% toluene solution of tungsten hexachloride were continuously added over 2 hours for the polymerization. From high pressure liquid chromatography (converted to polystyrene) using toluene as the mobile phase, the number average molecular weight (Mn) of the obtained polymer was 20,500, the weight average molecular weight (Mw) was 38,200, and the distribution of molecular weight (Mw/Mn) was 1.86. The obtained polymerization reaction solution was transferred to a pressure resistant hydrogenation reactor, added with 10 parts of a diatomaceous earth-carried nickel catalyst (made by Nissan Gardler, G-96D, nickel carrying rate 58%) and 200 parts of bicyclo[4.3.0]nonene, and allowed to react at 180° C. and a hydrogen pressure of 45 kgf/cm$^2$ for 10 hours. The solution was filtered by a filter provided with a stainless steel mesh using diatomaceous earth as a filter aid to remove the catalyst. The obtained reaction solution was poured into 3000 parts of isopropyl alcohol while stirring to cause the hydrogenate to precipitate. This was recovered by filtration. The resin was washed by 500 parts of acetone, then dried for 48 hours in a vacuum drier set to less than 1 torr and 100° C. to obtain 195 parts of a ring-opening polymer hydrogenate.

The hydrogenation rate of the main chain of the ring-opening polymer hydrogenate was 100%, the hydrogenation rate of the six-member ring of the side chain was 99.9%, the number average molecular weight (Mn) was 25,400, the weight average molecular weight (Mw) was 46,200, and the distribution of molecular weight (Mw/Mn) was 1.82. The melt flow rate (MFR) at 300° C. was 10 g/10 min, the glass transition temperature was 166° C., and the specific gravity was 1.01.

EXAMPLE 36

0.05 part of a coloring agent (made by Mitsui Toatsu Chemical, OrangeGG), 0.1 part of a lubricant (made by Kao, Kaowax 85P), 0.1 part of an antioxidant (made by Ciba-Geigy, Irganox 1010, tetrakis[methylene-3-(3',5'-di-tert-butyl-4'-hydroxyphenyl)-propionate]methane), and 0.2 part of a hydrogenated styrene-butadiene-styrene block copolymer hydrogenate (made by Asahi Chemical Industry, Tuftec H1051) were added to 100 parts of the ring-opening polymer hydrogenate of Production Example 14, then the mixture was kneaded by a twin-screw mixer and pelletized. The pellets were injection molded at a resin temperature of 310° C. and a mold temperature of 80° C. using a mold of a thickness of 1 mm, length of 200 mm, and width of 100 mm given a mirror finish on one surface to thereby prepare a molded-article (lamp cap) colored yellow and having a thickness of approximately 3 mm. Bubbles on the surface of the molded article were checked for visually, whereupon the surface was found to be free of bubbles and good in appearance. The molded article was used to measure the transparency, light resistance, and heat resistance. The results are shown in Table 13.

EXAMPLE 37

An analogous procedure was followed as in Example 36 to obtain a transparent molded article except for omitting the coloring agent after making the ring-opening polymer hydrogenate in the same way as Example 36. A colored film coating comprised of 10 parts of a coating use acryl binder and 0.005 part of the coloring agent used in Example 36 dissolved in 100 parts of a mixed solvent of ethyl acetate/methylethylketone in a weight ratio of 50/50 was coated on the outside surface of the molded article by spray coating and dried at 80° C. for 1 hour to obtain a molded article (lamp cap) having a colored film of transparent yellow color and a total thickness of about 3 mm. Bubbles on the surface of the molded article were checked for visually, whereupon the surface was found to be free of bubbles and good in appearance. The molded article was used to measure the transparency, light resistance, and heat resistance. The results are shown in Table 13.

REFERENCE EXAMPLE 8

An analogous procedure was followed as in Example 36 to prepare pellets except for using polycarbonate (PC) (made by Teijin Chemicals, Panlite 122). The pellets were injection molded using a similar mold as in Example 36 at a resin temperature of 310° C. and a mold temperature of 80° C. to prepare a yellow colored molded article (lamp cap) as shown in FIG. 6, that is, to prepare a yellow colored molded article (lamp cap) of a thickness of approximately 3 mm as shown in FIG. 6. Bubbles on the surface of the molded article were checked for visually, whereupon the surface was found to exhibit silver streaking.

The molded article was used to measure the transparency, light resistance, and heat resistance. The results are shown in Table 13. Note that the melt flow rate (MFR) at 300° C. of this PC was 8 g/10 min and the specific gravity was 1.20.

REFERENCE EXAMPLE 9

An analogous procedure was followed as in Example 36 to prepare pellets except for using polyacrylate (PAR) (made by Unitika, U-Polymer, P1001). The pellets were injection molded using a similar mold as in Example 36 at a resin temperature of 310° C. and a mold temperature of 80° C. to prepare a yellow colored molded article (lamp cap) as shown in FIG. 6.

The obtained molded article was checked for thickness imperfections due to partial poor filling in the mold.

Bubbles on the surface of the molded article were checked for visually, whereupon the surface was found to be free of bubbles and good in appearance. The molded article was used to measure the transparency, light resistance, and heat resistance. The results are shown in Table 13.

Note that the melt flow rate (MFR) at 300° C. of this PAR was 1.1 g/10 min and the specific gravity was 1.53.

REFERENCE EXAMPLE 10

An analogous procedure was followed as in Example 36 to prepare pellets except for using heat resistant polycarbonate (made by Bayer, Apec HT KUI9343). The pellets were injection molded using a similar mold as in Example 36 at a resin temperature of 350° C. and a mold temperature of 80° C. to prepare a yellow colored molded article (lamp cap) as shown in FIG. 6.

The obtained molded article was checked for thickness imperfections due to partial poor filling in the mold.

Bubbles on the surface of the molded article were checked for visually, whereupon the surface was found to be free of bubbles and good in appearance. The molded article was used to measure the transparency, light resistance, and heat resistance. The results are shown in Table 13.

Note that the melt flow rate (MFR) at 300° C. of this heat resistant polycarbonate was 4.5 g/10 min and the specific gravity was 1.53.

REFERENCE EXAMPLE 11

An analogous procedure was followed as in Reference Example 9 to obtain a yellow colored molded article (lamp cap) as shown in FIG. 6 except for making the resin temperature in the injection molding 350° C. Bubbles on the surface of the molded article were checked for visually, whereupon the surface was found to be free of bubbles and good in appearance. The molded article was used to measure the transparency, light resistance, and heat resistance. The results are shown in Table 13.

TABLE 13

| | Transparency | Light resistance | Heat resistance (deformation) | Heat resistance (yellowing) |
|---|---|---|---|---|
| Ex. 36 | Very good | Good | Good | Good |
| Ex. 37 | Very good | Good | Good | Good |
| Ref. Ex. 8 | Fair | Poor | Fair | Good |
| Ref. Ex. 9 | Poor | Fair | Very good | Fair |
| Ref. Ex. 10 | Poor | Poor | Good | Poor |
| Ref. Ex. 11 | Poor | Fair | Very good | Fair |

From the results of Table 13, it was learned that compared with Reference Examples 8 to 9, Examples 36 to 37 were superior in all of the transparency, light resistance, and heat resistance of the molded article since they use the thermoplastic resin containing an alicyclic structure.

Examples 36 to 37 gave molded articles (lamp caps) of a thin approximately 3 mm with a good accuracy of thickness and gave molded articles superior in all of the characteristics of heat resistance, transparency, and light resistance since they use the thermoplastic resin containing an alicyclic structure. Compared with this, Reference Example 9 was poor in fluidity of the resin at the time of molding and exhibited thickness imperfections in the obtained molded article, while Reference Example 8 exhibited deformation due to heat hysteresis and poor light resistance due to the insufficient heat resistance of the PC used (glass transition temperature). Reference Example 10 exhibited poor appearance of the molded article obtained and a decline in the light resistance, heat resistance (discoloring resistance), and transparency. Reference Example 11 exhibited a decline in the transparency.

Light Guide

The various evaluations in Examples 38 to 44 and Reference Examples 12 to 13 given below were conducted as follows:

The "transparency" was evaluated by an analogous method as in the above Examples 36 to 37.

The "hygroscopic deformation 2" was evaluated by allowing a test piece to stand in a constant temperature and humidity tank set to a temperature of 80° C. and a relative humidity of 20% for 1000 hours and examining for hygroscopic deformation (warping) of the test piece. The evaluation criteria were the same as the case of the above Examples 23 to 30.

The "mechanical strength 2" was evaluated by an analogous method as in the above Examples 23 to 30.

The "moldability" was evaluated by an analogous method as in the above Examples 23 to 30.

The "light resistance 2" was evaluated by measuring the total light transmittance of a test piece irradiated by UV light by a fadometer (black panel temperature 63° C. for 720 hours). A test piece with a value of "total light transmittance after test/total light transmittance before test)×100 of more than 98% was judged as "very good", one of more than 96% as "good", one of more than 94% as "fair", and one of less than 94% as "poor".

PRODUCTION EXAMPLE 15

500 parts of dehydrated cyclohexane, 0.55 part of 1-hexene, 0.11 part of dibutyl ether, and 0.22 part of triisobutyl aluminum were charged into a reaction vessel and mixed at room temperature in a nitrogen atmosphere, then, while holding the temperature at 45° C., 200 parts of tricyclo[4.3.0.1$^{2,5}$]deca-3-ene (hereinafter referred to as DCP) and 30 parts of a 0.70% toluene solution of tungsten hexachloride were continuously added over 2 hours for the polymerization.

The obtained polymerization reaction solution was transferred to a pressure resistant hydrogenation reactor, added with 10 parts of a diatomaceous earth-carried nickel catalyst (made by Nissan Gardler, G-96D, nickel carrying rate 58%) and 200 parts of cyclohexane, and allowed to react at 150° C. and a hydrogen pressure of 45 kgf/cm$^2$ for 8 hours. The solution was filtered by a filter provided with a stainless steel mesh using diatomaceous earth as a filter aid to remove the catalyst. The obtained reaction solution was poured into 3000 parts of isopropyl alcohol while stirring to cause the hydrogenate to precipitate. This was recovered by filtration. The resin was washed by 500 parts of acetone, then dried for 48 hours in a vacuum drier set to less than 1 torr and 100° C. to obtain 190 parts of a ring-opening polymer hydrogenate.

The hydrogenation rate of the main chain of the ring-opening polymer hydrogenate was 99.9%, the weight average molecular weight (Mw) was 33,300, and the glass transition temperature was 97° C.

PRODUCTION EXAMPLE 16

An analogous procedure was followed as in Production Example 15 except for changing the monomer to 100 parts of 8,9-benzotricyclo[4.3.0.1$^{2,5}$]-deca-3-ene and 100 parts of DCP.

The hydrogenation rate of the main chain of the ring-opening polymer hydrogenate was 100%, the hydrogenation rate of the six-member ring of the side chain was 99.9%, the weight average molecular weight (Mw) was 42,200, and the glass transition temperature was 130° C.

PRODUCTION EXAMPLE 17

An analogous procedure was followed as in Production Example 15 except for changing the monomer to 100 parts of tetracyclo[$4.4.0.1^{2,5}.1^{7,10}$]dodeca-3-ene (hereinafter referred to as TCD) and 100 parts of DCP.

The hydrogenation rate of the main chain of the ring-opening polymer hydrogenate was 100%, the weight average molecular weight (Mw) was 48,200, and the glass transition temperature was 130° C.

PRODUCTION EXAMPLE 18

10 kg of 8-methyl-8-methoxycarbonyltetracyclo[$4.4.0.1^{2,5}.1^{7,10}$]dodeca-3-ene, 6 kg of 1,2-dimethoxymethane, 24 kg of cyclohexane, 0.9 kg of 1-hexene, and 0.34 liter of a toluene solution of 0.96 mole/liter of diethyl aluminum chloride were charged into a reactor. On the other hand, 2 liters of a 1,2-dimethoxymethane solution of 0.05 mol/liter of tungsten hexachloride and 1 liter of a 1,2-dimethoxymethane solution of 0.1 mole/liter of para-aldehyde were mixed in a separate vessel. 0.49 liter of the mixture was added to the mixture in the reactor. The mixture was heated to 80° C. and stirred for 3 hours. A mixed solvent of 1,2-dimethoxymethane and cyclohexane in a ratio of 2/8 (ratio by weight) was added to the obtained polymer solution to give a ratio of polymer/solvent of 1/10 (ratio by weight), then 2 kg of triethanolamine was added and the solution stirred for 10 minutes. 50 kg of methanol was added to this polymerization solution, then the solution was stirred for 30 minutes and then allowed to stand. Of the two layers separated into, the top layer was removed, then methanol was further added, the solution stirred and allowed to stand, then the top layer again removed. The same operation was further performed two times. The obtained bottom layer was suitably diluted by cyclohexane and 1,2-dimethoxymethane to obtain a cyclohexane-1,2-dimethoxymethane solution with a 10% polymer concentration. 2 kg of palladium/silica magnesia (made by Nikki Chemical, palladium content: 5%) was added to this solution, then the solution was allowed to react in an autoclave at a hydrogen pressure of 40 kg/cm² for 4 hours. The solution was filtered by a filter provided with a stainless steel mesh using diatomaceous earth as a filter aid so as to remove the catalyst. This polymer hydrogenate solution was poured into a large amount of methanol while stirring to cause the hydrogenate to precipitate. This was then recovered by filtration. Further, the filtrate was washed by methanol, then dried for 48 hours in a vacuum drier set to not more than 1 torr and 100° C. to obtain the ring-opening polymer hydrogenate.

The hydrogenation rate of the main chain of the ring-opening polymer hydrogenate was 99.5% and the glass transition temperature was 168° C.

PRODUCTION EXAMPLE 19

An analogous procedure was followed as in Production Example 18 except for changing the monomer to 5 kg of 8-methyl-8-methoxycarbonyltetracyclo[$4.4.0.1^{2,5}.1^{7,10}$]dodeca-3-ene and 5 kg of 5-cyclohexylbicyclo[2.2.1]hept-2-ene.

The hydrogenation rate of the main chain of the ring-opening polymer hydrogenate was 99.7% and the glass transition temperature was 140° C.

PRODUCTION EXAMPLE 20

A cyclohexane solution of TCD was continuously supplied from the top of a 1 m³ polymerization reactor provided with a stirrer to give a concentration of supplied TCD in the polymerization reactor of 60 kg/m³. As the catalyst, a cyclohexane-based solution of VO (O—$C_2H_5$)$Cl_2$ was continuously supplied into the polymerization reactor from the top of the polymerization reactor to give a concentration of vanadium in the polymerization reactor of 0.9 mol/m³ and a cyclohexane solution of ethyl aluminum sesquichloride (Al($C_2H_5$)$1.5Cl_{1.5}$) was continuously supplied to give a concentration of aluminum in the polymerization reactor of 7.2 mol/m³. Further, the polymerization system was supplied with ethylene at a rate of 85 m³/hour, nitrogen at a rate of 45 m³/hour, and hydrogen at a rate of 6 m³/hour using a bubbling tube.

A copolymerization reaction was performed while holding the polymerization system, comprised of the polymerization reactor, a jacket provided at its outside, and a heat medium circulating through the jacket, at 10° C. The polymerization solution of the copolymer produced by the above copolymerization reaction was continuously removed from the top of the polymerization reactor so that the polymerization solution in the polymerization reactor was always 1 m³ (that is, so that the average time of residence was 0.5 hour).

A mixture of cyclohexane/isopropyl alcohol (1:1) was added to the removed polymerization solution to cause the polymerization reaction to stop. Next; the solution was brought into contact with an aqueous solution obtained by adding 5 liters of concentrated hydrochloric acid to 1 m³ of water in a 1:1 ratio with vigorous stirring to cause the catalyst residue to move to the aqueous phase. The contact mixture was allowed to stand, then the aqueous phase was separated and removed. The result was washed with water twice, then the polymerization solution phase was purified and separated.

Next, the purified and separated polymerization solution was brought into contact with 3 volumes of acetone under vigorous stirring to cause the copolymer to precipitate, then the solid (copolymer) was obtained by filtration and fully washed by acetone. Further, to extract the unreacted monomer present in the polymer, the solid was charged into acetone to a concentration of 40 kg/m³, then extracted under conditions of 60° C. for 2 hours. After the extraction, the solid was obtained by filtration and dried under a flow of nitrogen at 130° C. and 350 mmHg for 12 hours.

The thus obtained ethylene-TCD copolymer had an intrinsic viscosity ($\eta$) of 0.42 dl/g and a Tg of 136° C. The content of TCD was 41 mol %.

PRODUCTION EXAMPLE 21

Bicyclo[2.2.1]hept-2-ene (hereinafter referred to as "NB") (118 kg) was added to a reaction vessel charged with 258 liters of cyclohexane at ordinary temperature under a flow of nitrogen and was stirred for 5 minutes. Further, triisobutyl aluminum was added to give a concentration in the system of 1.0 ml/liter. Next, while stirring, ethylene was circulated at ordinary temperature to make the system an ethylene atmosphere. The temperature inside the autoclave was held at 70° C. and ethylene was used to raise the inside pressure to 6 kg/cm² by gauge pressure. The solution was stirred for 10 minutes, then 5.0 liter of a previously prepared toluene solution containing isopropylidene (cyclopentadienyl)(isodenyl)zirconium dichloride and methylalloxan was added to the system so as to cause the copolymerization reaction of the NB to start. The concentration of the catalyst at this time was 0.015 mmol/liter of isopropylidene(cyclopentadienyl)(isodenyl)zirconium dichloride and 7.5 mmol/liter of methylalloxan with respect to the entire system.

By continuously supplying ethylene into the system during the polymerization, the temperature was held at 70° C. and the internal pressure as held at 6 kg/cm$^2$ by gauge pressure. After 60 minutes, isopropyl alcohol was added to stop the polymerization reaction. The pressure was released, then the polymer solution was taken out. The solution was processed in the same way as in Production Example 20 to obtain an ethylene-NB copolymer.

The thus obtained ethylene-NB copolymer had an intrinsic viscosity ($\eta$) of 0.60 dl/g and a Tg of 140° C. The content of NB was 49 mol %.

EXAMPLE 38

0.1 part of an antioxidant (made by Ciba-Geigy, Irganox 1010, tetrakis[methylene-3-(3',5'-di-tert-butyl-4'-hydroxyphenyl)propionate]methane) was added to 100 parts of the polymer prepared in Production Example 15, then the mixture was kneaded by a twin-screw mixer and pelletized. The pellets were injection molded at a resin temperature of 280° C. and a mold temperature of 80° C. using a mold of a thickness of 1 mm, length of 200 mm, and width of 100 mm given a mirror finish on one surface to thereby prepare a test piece. The test piece was used to measure the transparency, hygroscopic deformation, moldability, impact resistance, and light resistance.

Further, the same pellets were placed in a mold for producing a light guide and injection molded to obtain a molded article (light guide). The results are shown in Table 14.

EXAMPLE 39

An analogous procedure was followed as in Example 38 for pelletization, injection molding, and preparation of a test piece except for using the polymer prepared in Production Example 16 and changing the resin temperature at the time of injection molding to 320° C. and the mold temperature to 110° C. The test piece was used to measure the transparency, hygroscopic deformation, moldability, impact resistance, and light resistance.

Further, the same pellets were placed in a mold for producing a light guide and injection molded to obtain a molded article (light guide). The results are shown in Table 14.

EXAMPLE 40

An analogous procedure was followed as in Example 38 for pelletization, injection molding, and preparation of a test piece except for using the polymer prepared in Production Example 17 and changing the resin temperature at the time of injection molding to 320° C. and the mold temperature to 110° C. The test piece was used to measure the transparency, hygroscopic deformation, moldability, impact resistance, and light resistance.

Further, the same pellets were placed in a mold for producing a light guide and injection molded to obtain a molded article (light guide). The results are shown in Table 14.

EXAMPLE 41

An analogous procedure was followed as in Example 38 for pelletization, injection molding, and preparation of a test piece except for using the polymer prepared in Production Example 18 and changing the resin temperature at the time of injection molding to 340° C. and the mold temperature to 130° C. The test piece was used to measure the transparency, hygroscopic deformation, moldability, impact resistance, and light resistance.

Further, the same pellets were placed in a mold for producing a light guide and injection molded to obtain a molded article (light guide). The results are shown in Table 14.

EXAMPLE 42

An analogous procedure was followed as in Example 38 for pelletization, injection molding, and preparation of a test piece except for using the polymer prepared in Production Example 19 and changing the resin temperature at the time of injection molding to 320° C. and the mold temperature to 110° C. The test piece was used to measure the transparency, hygroscopic deformation, moldability, impact resistance, and light resistance.

Further, the same pellets were placed in a mold for producing a light guide and injection molded to obtain a molded article (light guide). The results are shown in Table 14.

EXAMPLE 43

An analogous procedure was followed as in Example 38 for pelletization, injection molding, and preparation of a test piece except for using the polymer prepared in Production Example 20 and changing the resin temperature at the time of injection molding to 320° C. and the mold temperature to 110° C. The test piece was used to measure the transparency, hygroscopic deformation, moldability, impact resistance, and light resistance.

Further, the same pellets were placed in a mold for producing a light guide and injection molded to obtain a molded article (light guide). The results are shown in Table 14.

EXAMPLE 44

An analogous procedure was followed as in Example 38 for pelletization, injection molding, and preparation of a test piece except for using the polymer prepared in Production Example 21 and changing the resin temperature at the time of injection molding to 320° C. and the mold temperature to 110° C. The test piece was used to measure the transparency, hygroscopic deformation, moldability, impact resistance, and light resistance.

Further, the same pellets were placed in a mold for producing a light guide and injection molded to obtain a molded article (light guide). The results are shown in Table 14.

REFERENCE EXAMPLE 12

An analogous procedure was followed as in Example 38 for injection molding and preparation of a test piece except for using polycarbonate (made by Teijin Chemicals, Panlite 122) and changing the resin temperature at the time of injection molding to 320° C. and the mold temperature to 110° C. The test piece was used to measure the transparency, hygroscopic deformation, moldability, impact resistance, and light resistance. The results are shown in Table 14.

REFERENCE EXAMPLE 13

Polymethyl methacrylate (made by Mitsubishi Rayon, Acrylipet VH) was used for injection molding in the same way as Example 38 to prepare a test piece. The test piece was used to measure the transparency, hygroscopic deformation, moldability, impact resistance, and light resistance. The results are shown in Table 14.

TABLE 14

|  | Trans-parency | Hygroscopic deformation | Mold-ability | Impact resistance | Glass transition temperature (° C.) | Light resistance |
|---|---|---|---|---|---|---|
| Ex. 38 | Very good | Very good | Very good | Very good | 97 | Very good |
| Ex. 39 | Very good | Very good | Very good | Very good | 130 | Very good |
| Ex. 40 | Very good | Very good | Very good | Very good | 130 | Good |
| Ex. 41 | Very good | Fair | Good | Good | 168 | Good |
| Ex. 42 | Very good | Good | Very good | Good | 140 | Very good |
| Ex. 43 | Good | Very good | Good | Fair | 136 | Good |
| Ex. 44 | Good | Very good | Good | Fair | 148 | Good |
| Ref. Ex. 12 | Poor | Fair | Fair | Very good | 145 | Fair |
| Ref. Ex. 13 | Very good | Poor | Good | Poor | 95 | Very good |

In the evaluation of the moldability shown in Table 14, Reference Example 12 exhibited silver streaking and sink marks at the surface of the molded article and had a low light transmittance. Further, warping was observed after the hygroscopicity test and a fall in the light transmittance was confirmed after the light resistance test. Reference Example 13 also exhibited a low impact resistance and warping after the hygroscopicity test. From the results of Table 14, it was found that a light guide of a vehicular lighting equipment comprised of a thermoplastic resin containing an alicyclic structure of the present invention is superior in moldability of a thin, long flow length molded article and transparency of the molded article as compared with a conventional material. Simultaneously, it was found that it was good in mechanical strength, low hygroscopic deformation, and light resistance.

What is claimed is:

1. A lighting equipment comprising
   a reflector further comprising a substrate comprised of a thermoplastic resin containing an alicyclic structure selected from the group consisting of: a ring-opening polymer of a norbornene-based monomer, a ring-opening polymer hydrogenate of a norbornene-based monomer, an addition polymer of a norbornene-based monomer, an addition polymer of a norbornene-based monomer and vinyl compound, and a vinyl alicyclic hydrocarbon polymer; and
   a metal film provided on the substrate.

2. The lightning equipment as set forth in claim 1, further comprising a lens for condensing light of a light source reflected by said reflector.

3. The lightning equipment as set forth in claim 1, further comprising a lamp cover allowing passage of light of a light source reflected by said reflector.

4. The lightning equipment as set forth in claim 2, further comprising a lamp cap covering part or all of a light source.

5. A lighting equipment, comprising:
   a reflector further comprising a substrate comprised of a thermoplastic resin containing an alicyclic structure selected from the group consisting of: a ring-opening polymer of a norbornene-based monomer, a ring-opening polymer hydrogenate of a norbornene-based monomer, an addition polymer of a norbornene-based monomer, an addition polymer of a norbornene-based monomer and vinyl compound, and a vinyl alicyclic hydrocarbon polymer;
   a metal film provided on the substrate;
   a light guide, having a light incident face to which is introduced at least one type of light selected from the group of light from a light source and light source reflected by the reflector; and
   an emission face emitting the incident light introduced from the incident face to the outside.

6. A light equipment comprising:
   a reflector having a substrate comprised of a thermoplastic resin containing an alicyclic structure on which is formed a reflecting layer with a reflectance of at least 70%,
   a lens for condensing light of a light source reflected by the reflector,
   a lamp cover allowing a passage of light of the light source reflected by the reflector,
   a lamp cap covering part or all of the light source, and
   a light guide having an incident face to which is introduced at least one type of light selected from light from the light source and light from the light source reflected by the reflector and an emission face emitting the incident light introduced from the incident face to the outside.

7. A reflector for a lightning equipment comprising:
   a substrate comprised of a thermoplastic resin containing an alicyclic structure selected from the group consisting of: a ring-opening polymer of a polymer of a norbornene-based monomer, a ring-opening polymer hydrogenate of a norbornene-based monomer, an addition polymer of a norbornene-based monomer, an addition polymer of a norbornene-based monomer and vinyl compound, and a vinyl alicyclic hydrocarbon polymer; and
   a metal layer provided on the substrate.

8. A reflector for a lightning equipment, comprising:
   a substrate comprised of a thermoplastic resin containing an alicyclic structure selected from the group consisting of: a ring-opening polymer of a polymer of a norbornene-based monomer, a ring-opening polymer hydrogenate of a norbornene-based monomer, an addition polymer of a norbornene-based monomer, an addition polymer of a norbornene-based monomer and vinyl compound, and a vinyl alicyclic hydrocarbon polymer; and
   a metal layer provided on the substrate, comprised of a reflecting layer with a reflectance of at least 70%;
   wherein said reflecting layer has a thickness of 5 to 10,000 nm.

9. A reflector for a lightning equipment, comprising:
   a substrate comprised of a thermoplastic resin containing an alicyclic structure selected from the group consisting of: a ring-opening polymer of a polymer of a norbornene-based monomer, a ring-opening polymer hydrogenate of a norbornene-based monomer, an addition polymer of a norbornene-based monomer, an addition polymer of a norbornene-based monomer and vinyl compound, and a vinyl alicyclic hydrocarbon polymer; and
   a metal layer provided on the substrate, comprised of a reflecting layer with a reflectance of at least 70%; and wherein said reflecting layer is provided by vapor deposition.

10. A reflector for a lightning equipment, comprising:
a substrate comprising: of a thermoplastic resin containing an alicyclic structure selected from the group consisting of: a ring-opening polymer of a polymer of a norbornene-based monomer, a ring-opening polymer hydrogenate of a norbornene-based monomer, an addition polymer of a norbornene-based monomer, an addition polymer of a norbornene-based monomer and vinyl compound, and a vinyl alicyclic hydrocarbon polymer; and at least one compounding agent selected from the group consisting of a partial ether compound of a polyhydric alcohol, a soft polymer, a filler, and a compound incompatible with the thermoplastic resin having an alicyclic structure; and
a metal layer provided on the substrate.

11. A reflector for a lightning equipment, comprising:
a substrate comprising: of a thermoplastic resin containing an alicyclic structure selected from the group consisting of: a ring-opening polymer of a polymer of a norbornene-based monomer, a ring-opening polymer hydrogenate of a norbornene-based monomer, an addition polymer of a norbornene-based monomer, an addition polymer of a norbornene-based monomer and vinyl compound, and a vinyl alicyclic hydrocarbon polymer, and a blended soft polymer having a glass transition temperature of not more than 30° C.; and
a metal layer provided on the substrate.

12. A reflector for a lightning equipment, comprising:
a substrate comprising: of a thermoplastic resin containing an alicyclic structure selected from the group consisting of: a ring-opening polymer of a polymer of a norbornene-based monomer, a ring-opening polymer hydrogenate of a norbornene-based monomer, an addition polymer of a norbornene-based monomer, an addition polymer of a norbornene-based monomer and vinyl compound, and a vinyl alicyclic hydrocarbon polymer, and a blended crystalline polymer; and
a metal layer provided on the substrate.

13. A reflector for a lightning equipment, comprising:
a substrate comprised of a thermoplastic resin containing an alicyclic structure selected from the group consisting of: a ring-opening polymer of a polymer of a norbornene-based monomer, a ring-opening polymer hydrogenate of a norbornene-based monomer, an addition polymer of a norbornene-based monomer, an addition polymer of a norbornene-based monomer and vinyl compound, and a vinyl alicyclic hydrocarbon polymer; and
a metal layer provided on the substrate;
wherein the amount of repeating units containing polar groups in the thermoplastic resin containing the alicyclic structure is not more than 50 wt %.

14. A reflector for a lightning equipment, comprising:
a substrate comprised of a thermoplastic resin containing the alicyclic structure selected from the group consisting of: a ring opening polymer of a polymer of a norbornene-based monomer, a ring-opening polymer hydrogenate of a norbornene-based monomer, an addition polymer of a norbornene-based monomer, an addition polymer of a norbornene-based monomer and vinyl compound, and a vinyl alicyclic hydrocarbon polymer; and
a metal layer provided on the substrate;
wherein the thermoplastic resin containing an alicyclic structure has a melt flow rate, measured by JIS-K6719 at a temperature os 280° C. and a load of 2.16 kgf, of 4 to 100 g/10 min.

15. A reflector for a lightning equipment, comprising:
a substrate comprised of a thermoplastic resin containing an alicyclic structure selected from the group consisting of: a ring-opening polymer of a polymer of a norbornene-based monomer, a ring-opening polymer hydrogenate of a norbornene-based monomer, an addition polymer of a norbornene-based monomer, an addition polymer of a norbornene-based monomer and vinyl compound, and a vinyl alicyclic hydrocarbon polymer; and
a metal layer provided on the substrate;
wherein the thermoplastic resin containing the alicyclic structure has repeating units comprised of ring structures other than norbornene rings.

16. A lens for a lighting equipment with a resin composition comprising:
a thermoplastic resin containing an alicyclic structure selected from the group consisting of a ring-opening polymer of a norbornene-based monomer, a ring-opening polymer hydrogenate of a norbornene-based monomer, an addition polymer of a norbornene-based monomer, an addition polymer of a norbornene-based monomer and vinyl alicyclic hydrocarbon polymer, and
at least one compounding agent selected from the group consisting of a partial ether compound of a polyhydric alcohol, a partial ester compound of a polyhydric alcohol, a soft polymer, a filler, and a compound incompatible with the thermoplastic resin having an alicyclic structure.

17. A lamp cover for a lighting equipment provided in front of a light source and allowing passage of light of the light source, said lamp cover for a lighting equipment comprised of a thermoplastic resin containing an alicyclic structure selected from the group consisting of a ring-opening polymer of a norbornene-based monomer, a ring-opening polymer hydrogenate of a norbornene-based, an addition polymer of a norbornene-based monomer, an addition polymer of a norbornene-based monomer and vinyl compound, and a vinyl alicyclic hydrocarbon polymer.

18. A lamp cap for a lighting equipment covering part of all of the light source, said lamp cap comprised of a thermoplastic resin containing an alicyclic structure selected from the group consisting of a ring-opening polymer of a norbornene-based monomer, a ring-opening polymer hydrogenate of a norbornene-based monomer, an addition polymer of a norbornene-based monomer, an addition polymer of a norbornene-based monomer and vinyl compound, and a vinyl alicyclic hydrocarbon polymer.

19. A light guide for a lighting equipment provided in a light chamber of the lighting equipment and having a light incident face to which is introduced at least one type of light selected from the group of light from a light source and light from a light source reflected by a reflector and an emission face emitting the incident light introduced from the incident surface to the outside, said light guide for a lighting equipment comprised of a thermoplastic resin containing an alicyclic structure having a glass resin containing an alicyclic structure having a glass transition temperature of at least 90° C. selected from the group consisting of a ring-opening polymer of a norbornene-based monomer, a ring-opening polymer hydrogenate of a norbornene-based monomer, an addition polymer of a norbornene-based monomer, an addition polymer of a norbornene-based monomer and vinyl compound, and a vinyl alicyclic hydrocarbon polymer.

20. The lens for a lighting equipment as set forth in claim 16, in which the thermoplastic resin containing the alicyclic structure is selected from the group consisting of a ring-opening polymer of a norbornene-based monomer, a ring-opening polymer hydrogenate of a norbornene-based monomer, an addition polymer of a norbornene-based monomer, and an addition polymer of a norbornene-based monomer and vinyl compound.

21. The lamp cover for a lighting equipment as set forth in claim 17, in which the thermoplastic resin containing the alicyclic structure is selected from the group consisting of a ring-opening polymer of a norbornene-based monomer, a ring-opening polymer hydrogenate of a norbornene-based monomer, an addition polymer of a norbornene-based monomer, and an addition polymer of a norbornene-based monomer and vinyl compound.

22. The lamp cap for a lighting equipment as set forth in claim 18, in which the thermoplastic resin containing the alicyclic structure is selected from the group consisting of a ring-opening polymer of a norbornene-based monomer, a ring-opening polymer hydrogenate of a norbornene-based monomer, an addition hydrogenate of a norbornene-based monomer, an addition polymer of a norbornene-based monomer, and an addition polymer of a norbornene-based monomer and vinyl compound.

23. The light guide for a lighting equipment as set forth in claim 19, in which the thermoplastic resin containing the alicyclic structure is selected from the group consisting of a ring-opening polymer of a norbornene-based monomer, a ring-opening polymer of a norbornene-based monomer, a ring-opening polymer hydrogenate of a norbornene-based monomer, an addition polymer of a norbornene-based monomer, and an addition polymer of a norbornene-based monomer and vinyl compound.

24. A lighting equipment comprising:
a reflector having a substrate on which is formed a reflecting layer with a reflectance of at least 70%,
a lens comprised of a thermoplastic resin containing an alicyclic structure for condensing light of a light source reflected by the reflector,
a lamp cover allowing a passage of light of the light source reflected by the reflector,
a lamp cap covering part or all of the light source, and
a light guide having an incident face to which is introduced at least one type of light selected from light form the light source and light from the light source reflected by the reflector and an emission face emitting the incident light introduced from the incident face to the outside.

25. A lighting equipment comprising:
a reflector having a substrate on which is formed a reflecting layer with a reflectance of at least 70%,
a lens for condensing light of a light source reflected by the reflector,
a lamp cover comprised of a thermoplastic resin containing an alicyclic structure allowing a passage of light of the light source reflected by the reflector,
a lamp cap covering part or all of the light source, and
a light guide having an incident face to which is introduced at least one type of light selected from light form the light source and light from the light source reflected by the reflector and an emission face emitting the incident light introduced from the incident face to the outside.

26. A lighting equipment comprising:
a reflector having a substrate on which is formed a reflecting layer with a reflectance of at least 70%,
a lens for condensing light of a light source reflected by the reflector,
a lamp cover allowing a passage of light of the light source reflected by the reflector,
a lamp cap comprised of a thermoplastic resin containing an alicyclic structure covering part or all of the light source, and
a light guide having an incident face to which is introduced at least one type of light selected from light from the light source and light from the light source reflected by the reflector and an emission face emitting the incident light introduced from the incident face to the outside.

27. A lighting equipment comprising:
a reflector having a substrate on which is formed a reflecting layer with a reflectance of at least 70%,
a lens for condensing light of a light source reflected by the reflector,
a lamp cover allowing a passage of light of the light source reflected by the reflector,
a lamp cap covering part or all of the light source, and
a light guide comprised of a thermoplastic resin containing an alicyclic structure having an incident face to which is introduced at lest one type of light selected from the light source and light from the light source reflected by the reflector and an emission face emitting the incident light introduced from the incident face to the outside.

28. The lighting equipment as set forth in claim 1, characterized in that said metal film is comprised of a reflecting layer with a reflectance of at least 70%.

29. The reflector for a lighting equipment as set forth in claim 7, characterized in that said metal film is comprised of a reflecting layer with a reflectance of at least 70%.

* * * * *

UNITED STATES PATENT AND TRADEMARK OFFICE
CERTIFICATE OF CORRECTION

PATENT NO. : 6,883,938 B1 Page 1 of 1
DATED : April 26, 2005
INVENTOR(S) : Kohara et al.

It is certified that error appears in the above-identified patent and that said Letters Patent is hereby corrected as shown below:

<u>Title page,</u>
Item [30], Foreign Application Priority Data, change
"Mar. 23, 1998 (JP) 10-044037" to be
-- Mar. 23, 1998 (JP) 10-094037 --.

Signed and Sealed this

Eleventh Day of October, 2005

JON W. DUDAS
*Director of the United States Patent and Trademark Office*